US012764137B2

(12) United States Patent
Demjanenko et al.

(10) Patent No.: US 12,764,137 B2
(45) Date of Patent: Oct. 13, 2026

(54) SYSTEMS AND METHODS FOR AUTOMATICALLY CORRELATING DIGITAL EVENTS FOR ACTOR ATTRIBUTION ACROSS DISPARATE DIGITAL PLATFORMS

(71) Applicant: Permiso Security Inc., McClean, VA (US)

(72) Inventors: Stephen Demjanenko, San Francisco, CA (US); Wei Quan, San Jose, CA (US); Jason Martin, Reno, NV (US); Thomas Kurty, San Jose, CA (US); Andrew Shu, Sacramento, CA (US); Nihar Patel, Ahmedabad (IN); Charan Sunkara, Bangalore (IN); Xavier Chemla, Grenoble (FR); Nathan Eades, Raleigh, NC (US); Ian Ahl, Partlow, VA (US); Phani Modali, Campbell, CA (US)

(73) Assignee: Permiso Security Inc., McClean, VA (US)

( * ) Notice: Subject to any disclaimer, the term of this patent is extended or adjusted under 35 U.S.C. 154(b) by 0 days.

(21) Appl. No.: 19/394,310

(22) Filed: Nov. 19, 2025

(65) Prior Publication Data

US 2026/0142986 A1 May 21, 2026

Related U.S. Application Data

(60) Provisional application No. 63/722,623, filed on Nov. 20, 2024.

(51) Int. Cl.
*H04L 29/06* (2006.01)
*H04L 9/40* (2022.01)

(52) U.S. Cl.
CPC ................................ *H04L 63/1416* (2013.01)

(58) Field of Classification Search
CPC ............. H04L 63/1441; H04L 63/1408; H04L 63/1433; H04L 63/1425; H04L 43/062;
(Continued)

(56) References Cited

U.S. PATENT DOCUMENTS

2003/0065986 A1* 4/2003 Fraenkel .............. H04L 41/046 714/47.2
2014/0019575 A1* 1/2014 Alexander, Jr. ..... G06F 16/9535 709/213
(Continued)

*Primary Examiner* — Yogesh Paliwal
(74) *Attorney, Agent, or Firm* — Chandler Scheitin; Padowithz Alce; Alce PLLC

(57) ABSTRACT

A system, method, and computer-program product includes obtaining digital event data that occurred on a plurality of disparate computing environments of a subscribing entity, converting the digital event data into normalized digital event data, constructing, for the subscribing entity, a plurality of individual session objects detected across the plurality of disparate computing environments, generating, in real-time or near real-time, a plurality of session correlation links that selectively connect a target set of individual session objects of the plurality of individual session objects, generating, using the target set of individual session objects and the plurality of session correlation links, a cross-environment session artifact that graphically illustrates a directional access sequence associated with the target set of individual session objects, and detecting, using the cross-environment session artifact, a root actor responsible for the target set of individual session objects.

21 Claims, 20 Drawing Sheets

200

(58) Field of Classification Search
CPC ........................... H04L 41/22; H04L 63/1416; H04L 2463/146
See application file for complete search history.

(56) References Cited

U.S. PATENT DOCUMENTS

2017/0063908 A1* 3/2017 Muddu ................. G06F 3/0484
2019/0342095 A1* 11/2019 Simons ................... H04L 69/26

* cited by examiner

FIG. 8
BACK TO LIST
Activity Details
Session Summary
Start Time
End Time
Duration
Environment
Impact
Suspicion
Impact And Suspicion
Access By IP

SYSTEMS AND METHODS FOR AUTOMATICALLY CORRELATING DIGITAL EVENTS FOR ACTOR ATTRIBUTION ACROSS DISPARATE DIGITAL PLATFORMS

CROSS-REFERENCE TO RELATED APPLICATIONS

This application claims the benefit of U.S. Provisional Application No. 63/722,623, filed 20 Nov. 2024, which is incorporated in its entirety by this reference.

TECHNICAL FIELD

The inventions herein relate generally to the digital event monitoring fields, and more specifically to a new and useful system and method for automatically correlating digital events for actor attribution across disparate digital platforms in the digital event monitoring field.

BACKGROUND

Modern digital environments are becoming increasingly complex, involving interactions across a variety of cloud service providers, platforms, and systems. As organizations continue to adopt cloud-based services, they generate large volumes of data and metadata related to user activities, resource access, and operational changes. This expansion of digital infrastructure and user access presents significant challenges for organizations in tracking, analyzing, and attributing digital actions to specific actors, including entities or users. As the number of platforms and accounts an organization manages grows, so does the complexity in managing and securing digital events.

Additionally, many organizations seek to monitor and analyze user activity across cloud platforms to better understand patterns of behavior, identify potential security risks, and ensure compliance with organizational policies. However, the vast and often fragmented nature of digital event data, scattered across multiple disparate sources such as cloud service providers, identity and access management systems, and security platforms, presents technical challenges. Each platform generates its own format of event logs and activity data, which complicates the task of tracking users within and across platforms.

Therefore, there is a need in the digital event monitoring field to create improved systems and methods for automatically correlating large volumes of digital events across diverse platforms and automatically attributing those digital events to specific actors in real-time or near real-time.

The embodiments of the present application described herein provide technical solutions that address, at least, the need described above.

BRIEF SUMMARY OF THE EMBODIMENTS

In one embodiment, a computer-implemented method includes at an identity-based threat detection and response service implemented by a network of distributed computers obtaining, by the network of distributed computers, digital event data that occurred on a plurality of disparate computing environments of a subscribing entity; in response to obtaining the digital event data, converting the digital event data into normalized digital event data that conforms to a target data schema specified by the identity-based threat detection and response service; constructing, for the subscribing entity in real-time or near real-time, a plurality of individual session objects detected across the plurality of disparate computing environments in response to the network of distributed computers executing one or more session construction instructions against the normalized digital event data, wherein: each individual session object of the plurality of individual session objects includes a distinct set of digital events (e.g., 2 distinct digital events, 20 distinct digital events, 100 distinct digital events, 500 distinct digital events, 1,000,000 distinct digital events, etc.) performed in a respective computing environment of the plurality of disparate computing environments by a distinct digital account during a distinct time span; in response to constructing the plurality of individual session objects, generating, in real-time or near real-time, a plurality of session correlation links that selectively connect a target set of individual session objects of the plurality of individual session objects; generating, using the target set of individual session objects and the plurality of session correlation links, a cross-environment session artifact that graphically illustrates a directional access sequence associated with the target set of individual session objects; and detecting, using the cross-environment session artifact, a root actor responsible for the distinct set of digital events performed across the target set of individual session objects.

In one embodiment, the digital event data obtained by the network of distributed computers is not received in temporal order, the computer-implemented method further includes resequencing the normalized digital event data into a normalized digital event data sequence that is in temporal order prior to constructing the plurality of individual session objects, and the normalized digital event data sequence includes the distinct set of digital events performed across the plurality of disparate computing environments in chronological order from earliest digital event occurrence to latest digital event occurrence.

In one embodiment, a first distinct set of logs obtained from a first distinct event monitoring service and a second distinct set of logs obtained from a second distinct event monitoring service includes a same piece of digital event data, the computer-implemented method further includes detecting the same piece of digital event data included in the first distinct set of logs and the second distinct set of logs, and converting the digital event data into normalized digital event data includes including a single instance of the same piece of digital event data in the normalized digital event data.

In one embodiment, the root actor is a benign human actor or a malicious human actor.

In one embodiment, the root actor is a benign machine actor or a malicious machine actor.

In one embodiment, the computer-implemented method further includes initiating, based on the detected root actor and the directional access sequence, a preventative action configured to restrict or terminate access by the root actor across one or more of the plurality of disparate computing environments.

In one embodiment, the computer-implemented method further includes generating, using the cross-environment session artifact and the detected root actor, a graphical access representation that displays additional computing environments accessible to the root actor.

In one embodiment, the computer-implemented method further includes generating a graphical access representation that displays additional or all computing environments accessible to the root actor.

In one embodiment, the computer-implemented method further includes generating a graphical representation that displays all computing environments accessible to the root actor and/or all (e.g., digital) identities associated with the root actor.

In one embodiment, the computer-implemented method further includes in response to constructing a respective individual session object of the plurality of individual session objects: providing the respective individual session object to an actor-type machine learning classification model; computing, using the actor-type machine learning classification model, an actor-type classification inference comprising a confidence score indicating a probability of a machine actor using the distinct digital account of the respective individual session object to perform the distinct set of digital events included in the respective individual session object; and assessing, in real-time or near real-time, a security threat of the respective individual session object using one of: a first set of threat detection instructions operably configured to assess the distinct set of digital events of the respective individual session object as machine activity when the confidence score satisfies a predetermined confidence score threshold, and a second set of threat detection instructions operably configured to assess the distinct set of digital events of the respective individual session object as human activity when the confidence score fails to satisfy the predetermined confidence score threshold.

In one embodiment, the computer-implemented method further includes in response to constructing a respective individual session object of the plurality of individual session objects: assessing the distinct set of digital events associated with the respective individual session object; detecting, based on the assessment, that the respective individual session object corresponds to one of: an application programming interface-type session when metadata included in the distinct set of digital events of the respective individual session object indicates that access to the respective computing environment of the respective individual session object was obtained using an application programming interface (API) key, and a console-type session when the distinct set of digital events of the respective individual session object is indicative of a human user using one or more graphical user interfaces of the respective computing environment of the respective individual session object to perform the distinct set of digital events associated with the respective individual session object; and attributing, using the network of distributed computers, one of: an API session label to the respective individual session object when the respective individual session object is detected to be the application programming interface-type session, and a console session label to the respective individual session object when the respective individual session object is detected to be the console-type session.

In one embodiment, executing the one or more session construction instructions causes the network of distributed computers to: partition the normalized digital event data into a plurality of distinct sets of normalized digital event data based in part on actor metadata and time metadata included in the normalized digital event data, and construct the plurality of individual session objects based on the plurality of distinct sets of normalized digital event data, wherein: each individual session object of the plurality of individual session objects corresponds to a single actor, and the single actor corresponding to a respective individual session object of the plurality of individual session objects performed the distinct set of digital events of the respective individual session object within an amount of time less than a maximum time duration permitted by the identity-based threat detection and response service.

In one embodiment, executing the one or more session construction instructions causes the network of distributed computers to: assess the normalized digital event data based in part on timestamp metadata and actor metadata included in the normalized digital event data; identify, based on the normalized digital event data, a sequence of digital events performed by a single actor that occurred on one of the plurality of disparate computing environments; construct a respective individual session object of the plurality of individual session objects based in part on the sequence of digital events performed by the single actor, wherein the respective individual session object includes: a session start time corresponding to a timestamp of a first digital event included in the sequence of digital events, a session end time corresponding to a timestamp of a last digital event included in the sequence of digital events, a session time duration determined from a difference between the session end time and the session start time, a digital account identifier indicating the distinct digital account used by the single actor to perform the sequence of digital events, a representation of the one of the plurality of disparate computing environments where the sequence of digital events occurred, the sequence of digital events performed by the single actor on the one of the plurality of disparate computing environments, and identity and access data associated with the single actor.

In one embodiment, the identity and access data included in the respective individual session object includes an internet protocol address from which the single actor accessed the one of the plurality of disparate computing environments, a geolocation derived from the internet protocol address, an autonomous system number identifying a network organization from which the internet protocol address originates, a user-agent identifying an interface or client application used by the single actor to perform the sequence of digital events, and an indication of whether the single actor used multi-factor authentication to access the one of the plurality of disparate computing environments.

In one embodiment, the computer-implemented method further includes generating, using the network of distributed computers, a session information graphical user interface based on a target individual session object of the plurality of individual session objects, wherein a single actor used the distinct digital account of the target individual session object to perform the distinct set of digital events included in the target individual session object; displaying, by the network of distributed computers, the session information graphical user interface to the subscribing entity, wherein: a first portion of the session information graphical user interface includes at least a session start time of the target individual session object, a session end time of the target individual session object, a session time duration of the target individual session object, and identity and access data associated with the single actor, and a second portion of the session information graphical user interface includes an interactive data table that includes a plurality of distinct interactive data rows, wherein each distinct interactive data row of the plurality of distinct interactive data rows: corresponds to a respective digital event of the distinct set of digital events included in the target individual session object, and includes a distinct column describing an event name of the respective digital event.

In one embodiment, the computer-implemented method further includes detecting an input from the subscribing entity hovering over the event name of a target interactive data row of the plurality of distinct interactive data rows; in response to detecting the input from the subscribing entity, displaying a digital event explainability user interface object in association with the target interactive data row, wherein the event explainability user interface object includes one or more text strings providing a natural-language explanation of the respective digital event corresponding to the target interactive data row.

In one embodiment, executing the one or more session construction instructions against the normalized digital event data causes the network of distributed computers to: detect a console login digital event that occurred within the normalized digital event data, wherein the console login digital event includes an account identifier indicating a subject computing environment where the console login digital event occurred; and commence the construction of a subject individual session object of the plurality of individual session objects in response to the detection of the console login digital event, wherein constructing the subject individual session object includes: appending the console login digital event to the subject individual session object; assigning a session start time to the subject individual session object that corresponds to a timestamp of the console login digital event; appending, to the subject individual session object, one or more subsequent digital events included in the normalized digital event data that follow the console login digital event and correspond to the account identifier of the console login digital event; and assigning a session end time to the subject individual session object that corresponds to a timestamp of a respective subsequent digital event of the one or more subsequent digital events determined to occur last in time among the one or more subsequent digital events.

In one embodiment, the computer-implemented method further includes obtaining, by the network of distributed computers, additional event data at a different time than the digital event data; in response to obtaining the additional event data, converting the additional event data into normalized event data that conforms to the target data schema specified by the identity-based threat detection and response service; detecting, by the identity-based threat detection and response service, that at least one event included in the normalized event data is associated with the console login digital event, wherein the at least one event occurred after the one or more subsequent digital events; appending, to the subject individual session object, the at least one event included in the normalized event data that is associated with the console login digital event; and updating the session end time from the timestamp of the respective subsequent digital event determined to occur last in time to a new time value that corresponds a timestamp of the at least one event.

In one embodiment, a single actor performed the console login digital event on the subject computing environment, the subject computing environment is provided by a cloud service provider, and the identity-based threat detection and response service detects the at least one event included in the normalized event data is associated with the console login digital event based on detecting at least one of: that a session identifier attributed to the at least one event by the cloud service provider is equivalent to a session identifier attributed to the console login digital event by the cloud service provider, the at least one event included in the normalized event data and the console login digital event originated from a same internet protocol address, and the at least one event included in the normalized event data and the console login digital event were performed using a same hardware device associated with the single actor.

In one embodiment, the computer-implemented method further includes obtaining, by the network of distributed computers, additional event data at a different time than the digital event data; in response to obtaining the additional event data, converting the additional event data into normalized event data that conforms to the target data schema specified by the identity-based threat detection and response service; detecting, by the identity-based threat detection and response service, that at least one new event included in the normalized event data is not associated with the console login digital event and the one or more subsequent digital events, and constructing a new individual session object different from the plurality of individual session objects in response to detecting that the at least new one event included in the normalized event data is not associated with the console login digital event and the one or more subsequent digital events, wherein constructing the new individual session object includes appending the at least one new event to the new individual session object.

In one embodiment, a single actor performed the console login digital event and the at least one new event on the subject computing environment; the identity-based threat detection and response service detects the at least one new event included in the normalized event data is not associated with the console login digital event and the one or more subsequent digital events based on detecting at least one of: an amount of time elapsed between the at least one new event and the one or more subsequent digital events is greater than a predetermined elapsed time threshold, and a change in access data associated with the single actor for the at least one new event relative to access data associated with the subject individual session object.

In one embodiment, a same actor performed the console login digital event and the at least one new event; the identity-based threat detection and response service detects the at least one new event included in the normalized event data is not associated with the console login digital event and the one or more subsequent digital events based on detecting at least one of: an amount of time elapsed between the at least one new event and the one or more subsequent digital events is greater than a predetermined elapsed time threshold, and a change in access data associated with the same actor between the at least one new event and the subject individual session object.

In one embodiment, a first user performed the console login digital event and the one or more subsequent digital events, a second user performed the least one new event, the first user is different from the second user, the identity-based threat detection and response service detects the at least one new event is not associated with the console login digital event and the one or more subsequent digital events based on detecting a difference between a digital account identifier corresponding to the at least one new event and the account identifier corresponding to the console login digital event and the one or more subsequent digital events.

In one embodiment, a computer-implemented system includes one or more processors; a memory; a computer-readable medium operably coupled to the one or more processors, the computer-readable medium having computer-readable instructions stored thereon that, when executed by the one or more processors, cause a computing device to perform operations including: obtaining digital event data that occurred on a plurality of disparate computing environments of a subscribing entity; in response to obtaining the digital event data, converting the digital event data into normalized digital event data that conforms to a target data schema specified by an identity-based threat detection and response service; constructing, for the subscribing entity in real-time or near real-time, a plurality of individual session objects detected across the plurality of disparate computing environments in response to executing one or more session construction instructions against the normalized digital event data, wherein: each individual session object of the plurality of individual session objects includes a distinct set of digital events performed in a respective computing environment of the plurality of disparate computing environments by a distinct digital account during a distinct time span; in response to constructing the plurality of individual session objects, generating, in real-time or near real-time, a plurality of session correlation links that selectively connect a target set of individual session objects of the plurality of individual session objects; generating, using the target set of individual session objects and the plurality of session correlation links, a cross-environment session artifact that graphically illustrates a directional access sequence associated with the target set of individual session objects; and detecting, using the cross-environment session artifact, a root actor responsible for the distinct set of digital events performed across the target set of individual session objects.

In one embodiment, generating the plurality of session correlation links includes generating a first session correlation link of the plurality of session correlation links that connects a first individual session object of the plurality of individual session objects to a second individual session object of the plurality of individual session objects based on detecting a chronological relationship between the first individual session object and the second individual session object, wherein the chronological relationship is detected based on identifying that an amount of time elapsed between a session end time of the first individual session object and a session start time of the second individual session object is less than a predetermined elapsed-time threshold, and generating a second session correlation link of the plurality of session correlation links that connects the second individual session object to a third individual session object of the plurality of individual session objects based on detecting a causal relationship between the second individual session object and the third individual session object, wherein the causal relationship is detected based on identifying that at least one digital event of the distinct set of digital events included in the second individual session object triggered or enabled the distinct set of digital events included in the third individual session object.

In one embodiment, the target set of individual session objects includes a first individual session object of the plurality of individual session objects, wherein the distinct set of digital events of the first individual session object are performed on a first disparate computing environment of the plurality of disparate computing environments, a second individual session object of the plurality of individual session objects, wherein the distinct set of digital events of the second individual session object are performed on a second disparate computing environment of the plurality of disparate computing environments, and a third individual session object of the plurality of individual session objects, wherein the distinct set of digital events of the third individual session object are performed on a third disparate computing environment of the plurality of disparate computing environments, and the computer-readable instructions, when executed by the one or more processors, cause the computing device to perform operations further comprising: displaying, via a user interface (UI), the cross-environment session artifact, wherein the cross-environment session artifact includes: a first session UI card representing the first individual session object, a second session UI card representing the second individual session object, a third session UI card representing the third individual session object, a first directional graphical connector extending in a direction from the first session UI card to the second session UI card, and a second directional graphical connector extending in a direction from the second session UI card to the third session UI card, wherein: the first directional graphical connector and the second directional graphical connector graphically illustrate the directional access sequence, and the directional access sequence indicates a directional flow of access by the root actor across the first disparate computing environment, the second disparate computing environment, and the third disparate computing environment.

In one embodiment, the computer-readable instructions, when executed by the one or more processors, cause the computing device to perform operations further including detecting the root actor accessed the distinct digital account of the first disparate computing environment using multi-factor authentication (MFA); and in response to detecting the use of MFA, displaying, within the first session UI card, an MFA UI badge that visually indicates that MFA was used by the root actor to access the first disparate computing environment.

In one embodiment, generating the plurality of session correlation links includes generating a first session correlation link of the plurality of session correlation links that connects a first individual session object of the plurality of individual session objects to a second individual session object of the plurality of individual session objects based on detecting the first individual session object and the second individual session object share at least a common internet protocol address, generating a second session correlation link of the plurality of session correlation links that connects a third individual session object of the plurality of individual session objects to a fourth individual session object of the plurality of individual session objects based on detecting the third individual session object and the fourth individual session object share at least a common hardware device identifier, and generating a third session link of the plurality of session correlation links that connects a fifth individual session object of the plurality of individual session objects to a sixth individual session object of the plurality of individual session objects based on Hypertext Transfer Protocol (HTTP) cookie data.

In one embodiment, the computer-readable instructions, when executed by the one or more processors, cause the computing device to perform operations further comprising detecting the root actor is a malicious actor based on assessing the cross-environment session artifact; receiving an input from the subscribing entity selecting one of the first session UI card, the second session UI card, and the third session UI card; and in response receiving the input from the subscribing entity, executing, in real-time or near real-time, one or more security threat mitigation tasks to mitigate a security threat associated with the root actor, wherein the one or more security threat mitigation tasks includes: automatically blocking, in real-time or near real-time, the root actor from accessing the plurality of disparate computing environments, and automatically disabling, in real-time or near real-time, one or more digital accounts associated with the root actor that were used to perform the distinct set of digital events over the target set of individual session objects.

In one embodiment, the computer-readable instructions, when executed by the one or more processors, cause the computing device to perform operations further comprising detecting the root actor is a malicious actor based on assessing the cross-environment session artifact; receiving an input from the subscribing entity selecting the first directional graphical connector or the second directional graphical connector; and in response receiving the input from the subscribing entity, automatically executing, in real-time or near real-time, one or more security threat mitigation tasks to mitigate a security threat associated with the root actor, wherein the one or more security threat mitigation tasks includes: automatically blocking, in real-time or near real-time, the root actor from accessing the plurality of disparate computing environments, and automatically disabling, in real-time or near real-time, one or more digital accounts associated with the root actor that were used to perform the distinct set of digital events over the target set of individual session objects.

In one embodiment, the computer-readable instructions, when executed by the one or more processors, cause the computing device to perform operations further comprising detecting, in real-time or near real-time, the distinct set of digital events performed across the target set of individual session objects is indicative of suspicious or malicious activity; automatically blocking, in real-time or near real-time, the root actor from accessing the plurality of disparate computing environments in response to detecting the distinct set of digital events performed across the target set of individual session objects is indicative of suspicious or malicious activity; and automatically revoking, in real-time or near real-time, authentication tokens or active session credentials associated with the root actor.

In one embodiment, a non-transitory computer-readable storage medium storing instructions that, when executed by one or more processors, cause the one or more processors to perform operations including: obtaining, via a network interface, digital event data that occurred on a plurality of disparate computing environments of a subscribing entity; converting, by an event normalization module executed by the one or more processors, the digital event data into normalized digital event data that conforms to a target data schema stored in memory and specified by an identity-based threat detection and response service; executing, by a session construction module, one or more session construction instructions against the normalized digital event data to generate a plurality of individual session objects, wherein: (a) each individual session object represents a distinct set of digital events performed in a respective computing environment of the plurality of disparate computing environments by a distinct digital account during a distinct time span; and (b) the plurality of individual session objects are stored in a session data repository maintained in the memory; executing, by a correlation engine, a plurality of correlation computations to generate a plurality of session correlation links that selectively connect a target set of individual session objects of the plurality of individual session objects based on shared identifiers, temporal proximity, or causal relationships; executing, by a visualization engine, generation of a cross-environment session artifact comprising graphical node representations of the target set of individual session objects and directional edge representations of the plurality of session correlation links; and displaying, via a display interface coupled to the one or more processors, the cross-environment session artifact on a graphical user interface, the cross-environment session artifact visually illustrating a directional access sequence across the plurality of disparate computing environments and identifying a root actor responsible for the distinct set of digital events performed across the target set of individual session objects.

In one embodiment, a computer-implemented method includes at an identity-based threat detection and response service implemented by a network of distributed computers: obtaining, by the network of distributed computers, digital event data that occurred on a plurality of disparate cloud computing environments of a subscribing entity; in response to obtaining the digital event data, converting the digital event data into normalized digital event data that conforms to a target data schema specified by the identity-based threat detection and response service; constructing, for the subscribing entity in real-time or near real-time, a plurality of individual session objects detected across the plurality of disparate cloud computing environments in response to the network of distributed computers executing one or more session construction instructions against the normalized digital event data, wherein: each individual session object of the plurality of individual session objects includes a distinct set of digital events performed in a respective cloud computing environment of the plurality of disparate cloud computing environments by a distinct digital account during a distinct time span; in response to constructing the plurality of individual session objects, generating, in real-time or near real-time, a plurality of session correlation links that selectively connect a target set of individual session objects of the plurality of individual session objects; generating, using the target set of individual session objects and the plurality of session correlation links, a cross-environment session artifact that graphically illustrates a directional access sequence associated with the target set of individual session objects; and detecting, using the cross-environment session artifact, a root actor responsible for the distinct set of digital events performed across the target set of individual session objects.

In one embodiment, the computer-implemented system further includes in response to constructing a respective individual session object of the plurality of individual session objects: assessing the respective individual session object against a plurality of actor-type classification heuristics; determining, in response to assessing the respective individual session object against the plurality of actor-type classification heuristics, the distinct set of digital events included in the respective individual session object was performed by a human actor or a non-human actor; assessing, in real-time or near real-time, a security threat of the respective individual session object using one of: a first set of threat detection instructions operably configured to assess the distinct set of digital events of the respective individual session object as machine activity when the plurality of actor-type classification heuristics determines the distinct set of digital events included in the respective individual session object was performed by the non-human actor, and a second set of threat detection instructions operably configured to assess the distinct set of digital events of the respective individual session object as human activity when the plurality of actor-type classification heuristics determines the distinct set of digital events included in the respective individual session object was performed by the human actor.

In one embodiment, the target set of individual session objects includes a first distinct individual session object and a second distinct individual session object, a first distinct digital account performed the distinct set of digital events of the first distinct individual session object, a second distinct digital account performed the distinct set of digital events of the second distinct individual session object, and the computer-readable instructions, when executed by the one or more processors, further cause the computing device to perform operations comprising: generating a first session correlation link of the plurality of session correlation links that connects the first distinct individual session object of the target set of individual session objects to the second distinct individual session object of the target set of individual session objects in response to detecting the root actor used the first distinct digital account to perform the distinct set of digital events of the first distinct individual session object and transitioned to using the second distinct digital account to perform the distinct set of digital events of the second distinct individual session object.

DESCRIPTION OF THE PREFERRED EMBODIMENTS

Figure 1:
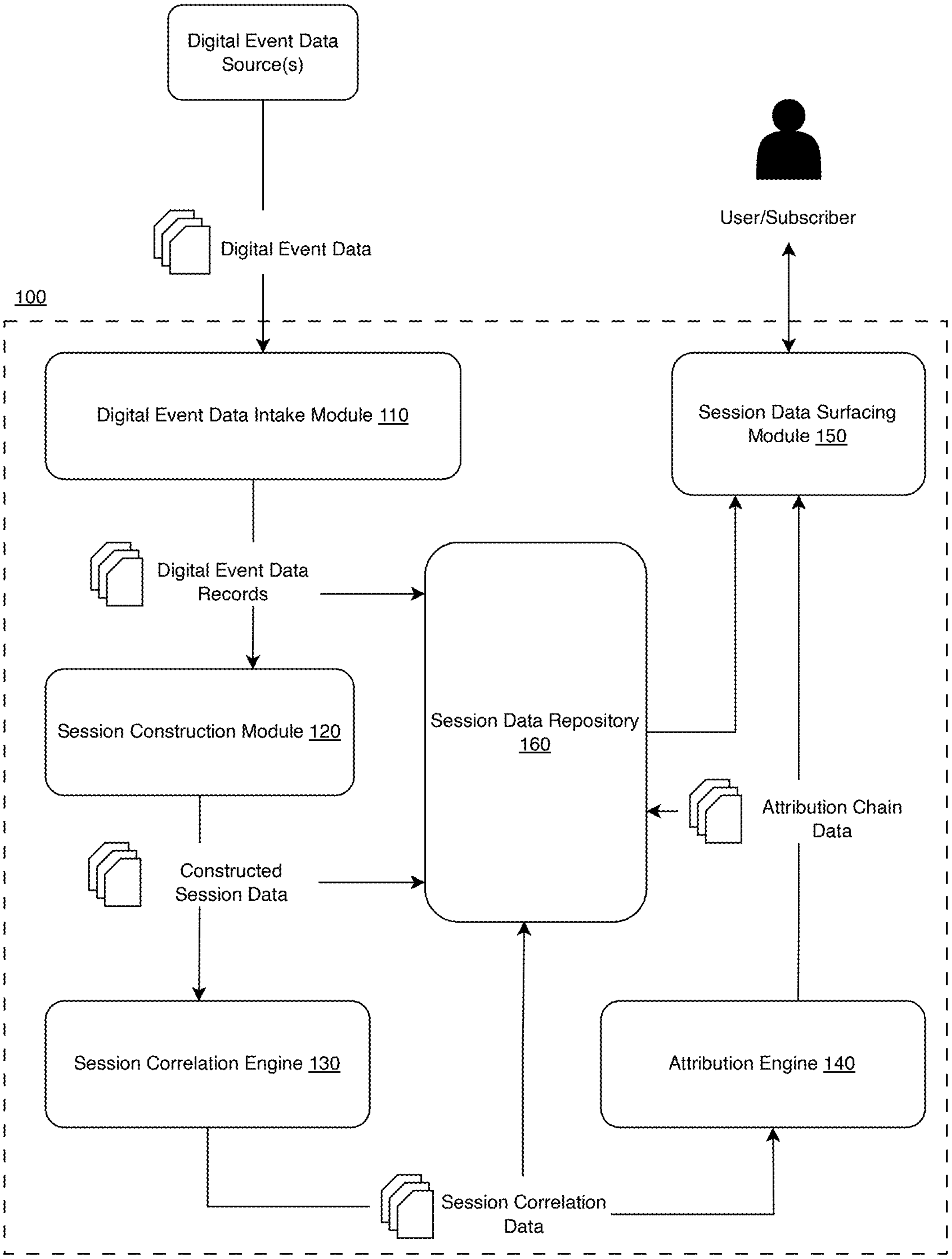
FIG. 1 illustrates a schematic representation of a system 100 in accordance with one or more embodiments of the present application.

The following description of the preferred embodiments of the present application are not intended to limit the inventions to these preferred embodiments, but rather to enable any person skilled in the art to make and use these inventions.

Technical Benefits

Embodiments of the present application achieve technical advancements and optimizations through the innovative use of session roll-ups, session constructs, and identity attribution chains, providing significant improvements in performance and security. Implementing session roll-ups allows the system to reduce data volume by consolidating individual digital events into groupings based on sessions. The reduction in data size, approximately 10-1000×, optimizes application performance by decreasing memory usage and compute processing demands, which is especially valuable in environments with extensive event logs. The resulting efficiency supports scalability and enhances system responsiveness.

The session construct adds a layer of context by aggregating multiple related activities (e.g., normalized digital events, etc.) within a specific timeframe, forming a comprehensive view of user actions. Unlike isolated event monitoring, the session construct captures sequences of interrelated actions, revealing access patterns and behavior over time. This type of data structure is essential for security monitoring, enabling the system to detect potential threats with greater accuracy by identifying anomalies or sequences indicative of malicious activities.

The identity attribution chain within the system further enhances clarity in tracking user activity by linking individual sessions to a consistent actor or identity across platforms. Correlation with an identity attribution chain allows for precise actor attribution and provides valuable context for compliance tracking, security audits, and forensic investigations. By assembling an identity attribution chain, the system can reveal what might otherwise appear as fragmented or unrelated sessions and/or digital events, offering a cohesive view crucial for identifying security events. The combination of session roll-ups, session constructs, and identity attribution chains enables comprehensive management, monitoring, and attribution of digital events across complex digital infrastructures, advancing operational efficiency, security posture, and data handling capabilities.

Another technical benefit of the systems and methods described herein enables real-time or near real-time detection of a root actor responsible for digital activity or digital events that occurred and/or is occurring across a plurality of disparate computing environments. Instead of viewing a digital event (e.g., digital activity or the like) in isolation, the systems and methods described herein assess streams of normalized digital event data to construct a plurality of distinct individual session objects. Each individual session object, in some embodiments, may include a distinct set of digital events performed in a respective computing environment by a single actor and/or by one or more digital accounts used by the single actor. The systems and methods described herein may further digitally connect, in real-time or near real-time, at least a subset of the plurality of distinct individual session objects based on shared actor identities, temporal proximity, causal relationships, and/or other attribute-based similarities to generate a cross-environment session artifact that visually and/or programmatically represents correlated sessions across multiple disparate computing environments. The cross-environment session artifact provides a directional and contextual view of digital activity, enabling the system to trace and attribute distributed actions to a single root actor with minimal latency. In other words, the cross-environment session artifact may represent a unified and directional mapping of correlated sessions across multiple cloud service providers, providing a visual and/or programmatic representation of how digital events propagate through a subscribing entity's digital infrastructure. The cross-environment session artifacts may allow for immediate contextual understanding of complex multi-platform interactions, reduces latency in actor attribution, and enhances system responsiveness and threat detection accuracy relative to conventional event monitoring systems that evaluate discrete digital events asynchronously and/or without cross-environment correlation.

Another technical benefit of the systems and methods described herein is the ability to continuously receive and process large volumes of digital event data in real-time or near real-time, such as hundreds of thousands or even millions of log entries obtained from a plurality of disparate computing environments. As new digital event data is received, the systems and methods described herein may automatically normalize the incoming data and update existing session objects in real time or near real time or construct new session objects when appropriate. Such continuous updating allows the system and/or method to maintain an accurate and current representation of digital activity across all monitored computing environments without requiring batch-based processing or manual intervention. By dynamically updating the session objects and cross-environment session artifacts as new event data is received, the system and/or method may ensure that session correlations and actor attributions remain consistent and current, even as large-scale data changes occur. This capability enhances scalability, reduces processing delays, and improves the overall accuracy and responsiveness of root actor detection in high-volume, distributed computing environments.

1. System for Automatically Correlating Digital Events for Attribution Across Digital Platforms As shown in FIG. 1, a system 100 for automatically correlating digital events for attribution across digital platforms includes a digital event data intake module 110, a session construction module 120, a session correlation engine 130, an attribution engine 140, and a session data surfacing module 150. Additionally, in some embodiments, system 100 may include a session data repository 160.

It shall be recognized that, in some embodiments, system 100 may interchangeably be referred to herein as an "identity-based threat detection and response service." The identity-based threat detection and response service, in some embodiments, may be implemented by a network of distributed computers.

1.10 Digital Event Data Intake Module

The digital event data intake module 110 preferably functions to collect or receive digital event data associated with one or more digital events (as detailed in 2.10). Preferably, the digital event data intake module may be in operable communication with one or more digital event data sources which may include, but are not limited to, one or more digital or computing service providers and/or platforms (as detailed in 2.10), and/or one or more digital event data streams (e.g., real-time data streams). In some embodiments, digital event data intake module 110 may function to parse and extract incoming digital event data into one or more digital event data records (as detailed in 2.10).

The digital event data intake module 110 functions to collect, parse, and organize incoming digital event data, ensuring a consistent structure across multiple data formats and sources. In various embodiments, digital event data intake module 110 may receive digital event data from diverse digital event data sources, including but not limited to one or more cloud platforms, non-cloud platforms (e.g., on-premises and hybrid environments), identity management systems, endpoint security tools, and user device logs. To standardize data ingestion, the module may implement data parsing functions to convert data into structured records known as "digital event data records," each associated with a unique digital event identifier. The structured records enable seamless integration with downstream modules, allowing efficient processing and analysis.

In one or more embodiments, digital event data intake module 110 defines a "digital event" as a distinct instance of user or system activity, associated with one or more attributes, including but not limited to timestamps, event type, actor identity, associated resources, and activity outcome. "Digital event data" refers to data and metadata associated with digital events, encompassing details like the event source (e.g., originating platform or service), event scope (e.g., access, modification, or execution), and system identifiers, such as IP addresses or device IDs.

It shall be recognized that system 100 described herein may be configured to correlate digital events not only across cloud platforms but also in non-cloud environments, including on-premises and hybrid infrastructures. By accommodating a range of digital providers, system 100 enables organizations to monitor, correlate, and attribute events across varied infrastructure types. In on-premises and hybrid environments, digital events are often managed within locally hosted servers, databases, and private networks, where event data may lack the native integrations present in cloud-based platforms. Digital event data intake module 110 may be designed to process event logs from diverse sources consistently, standardizing data structures and consolidating information from multiple environments. Integrating on-premises and hybrid systems into the correlation and attribution processes enhances a capacity of system 100 to deliver comprehensive monitoring across all digital activities and digital events, regardless of infrastructure type, supporting the needs of complex, multi-platform organizations.

To enhance consistency in digital event data processing, digital event data intake module 110 may incorporate data normalization processes. Normalization transforms disparate data formats into a unified schema, using predefined templates to create consistency across various data fields, such as timestamp formats, event categorization labels, and actor identifiers. Normalization allows system 100 to efficiently correlate and analyze data across different platforms, minimizing ambiguity when attributing actions to specific actors. That is, a feature and capability of digital event data intake module 110 is the normalization of event data across diverse digital event sources. Service providers and platforms generally generate event logs in unique formats, often with custom naming conventions for event attributes. To address inconsistencies, digital event data intake module 110 standardizes and structures incoming events by converting disparate data into a unified format using key/value pairs. By mapping event properties to a consistent set of attributes, such as event type, actor identity, timestamp, and resource identifier, the module achieves a standardized data structure that facilitates downstream processing and integration with other system components.

In addition to structural normalization, digital event data intake module 110 generates a unified set of metadata as key/value pairs to provide enhanced context for each event. Metadata may include derived attributes, such as user role, device location, and event impact level, which enriches the original event data. Normalizing events into standardized key/value pairs and supplementing them with metadata streamlines event data processing for subsequent modules, while improving the accuracy of event analysis, session correlation, and actor attribution across multi-platform environments.

In some preferred embodiments, the digital event data intake module 110 includes a "data enrichment" feature, which may augment incoming digital event records with contextual metadata. For example, digital event records may be enriched with geolocation details based on IP addresses or with user role details from identity management systems. Enriched metadata enhances the accuracy of downstream session construction and correlation processes, as described in sections 1.20 and 1.30, by providing additional context for identifying patterns in user behavior and access.

Additionally, or alternatively, digital event data intake module 110 is configured to generate a unique session identifier, referred to as "sessionId," for grouping related events. SessionId generation involves a fingerprinting process that uses event metadata and timestamp information to create a distinctive identifier for a set of digital activities associated with a specific actor or entity. This approach to session identification allows digital event data intake module 110 to capture and group relevant events into sessions that accurately represent user or system actions over time. In addition, digital event data intake module 110 may analyze time intervals between events and apply predefined time windows to divide large sessions into smaller, more manageable segments. By segmenting sessions with high event volume based on temporal thresholds, the module supports efficient handling and optimized processing of extensive event data.

The temporal thresholds applied during session chunking allow digital event data intake module 110 to create smaller, logically consistent sessions from continuous or prolonged user interactions. Each smaller session retains an independent sessionId while maintaining an association with the overall sequence of events, preserving continuity within the larger session context. This segmentation enables system 100 to maintain data organization and manage processing load while still providing an accurate depiction of digital actions within each defined time window. The generation and assignment of unique session identifiers across segmented sessions ensure that each chunked session remains traceable and identifiable, facilitating further processing and correlation in downstream modules.

In some embodiments, digital event data intake module 110 incorporates various machine learning models to enhance classification, correlation, and analysis of digital events. Machine learning techniques implemented may include supervised learning, unsupervised learning, reinforcement learning, and ensemble methods, among other approaches. Each technique is selected to suit specific requirements for processing complex digital event data from diverse sources.

Supervised learning algorithms, including logistic regression, random forests, and gradient boosting machines, may be implemented to classify and predict outcomes based on labeled historical data. Applying these algorithms allows for accurate classification of digital events, such as distinguishing routine activity from anomalous activity. Additional models, such as support vector machines and neural networks, provide capabilities for identifying patterns in large datasets, relying on labeled data to improve predictive accuracy over time.

Unsupervised learning techniques, including clustering methods like k-means and density-based spatial clustering of applications with noise (DBSCAN), enable grouping of related digital events and detection of patterns in unlabeled data. Clustering techniques support analysis across varied data sources and contribute foundational insights for session construction and correlation within session construction module 120.

Reinforcement learning approaches, such as Q-learning, enable adaptive decision-making processes in real-time, allowing the system to adjust to new patterns or behaviors in digital event data. Reinforcement learning contributes to continuous improvement in classification and attribution, especially in dynamic environments where digital events evolve in response to user and system interactions.

In various embodiments, ensemble methods, including boosting, bagging, and stacked generalization, combine multiple models to enhance classification accuracy and resilience to data variability. Random forests and gradient boosting methods prove effective for complex digital environments, where variability in data sources and structures requires a robust approach to correlation and attribution.

Natural language processing models, such as Bidirectional Encoder Representations from Transformers (BERT) and Generative Pre-trained Transformers (GPT), may be integrated to analyze unstructured digital event data. BERT and GPT models, adapted for event-specific terminology, process textual event data logs and extract key information relevant to attribution. Integrating these models allows the system to handle events recorded as descriptive text, expanding flexibility in data intake and analysis.

Digital event data intake module 110 may also employ model selection algorithms to determine optimal machine learning models for different types of digital event data. Model selection and evaluation criteria may include accuracy, precision, recall, and adaptability to new data inputs. A model selection approach ensures continuous improvement and application of current best practices across a wide range of data types and formats.

1.20 Session Construction Module

The session construction module 120 preferably functions to automatically construct one or more sessions based on digital event data. Preferably, session construction module 120 may function to construct each session to represent a series of digital events performed or initiated by a distinct actor or entity that may occur within a specific session timespan. In one or more preferred embodiments, session construction module 120 may be in operable communication with digital event data intake module 110. In some embodiments, session construction module 120 may function to continuously construct, update, and/or otherwise modify sessions as associated digital event data is received (e.g., from digital event data intake module 110). It shall be recognized that the term “session” may also be interchangeably referred to herein as a “session object” or the like.

In some embodiments, before event data is used in session construction, digital event data intake module 110 performs additional operations to optimize the quality and relevance of data passed to session construction module 120. Events undergo filtering to remove non-essential or redundant information, allowing each session to focus on digital actions that contribute to the accurate portrayal of user behavior. Enrichment processes add additional metadata to events, such as device information, network characteristics, or geolocation data, enhancing the context available for session analysis. The enrichment of events provides a comprehensive view of each action, facilitating precise session construction in later stages.

Additionally, or alternatively, digital event data intake module 110 may also perform resequencing of events to correct any chronological inconsistencies in event data. Resequencing organizes events into a strict chronological order, which is essential when events are received in a non-sequential arrangement from various sources. Ensuring accurate event sequencing enables session construction module 120 to maintain a faithful timeline of activities, capturing the correct sequence of user interactions within each session. The combination of filtering, enrichment, and resequencing allows digital event data intake module 110 to deliver optimized event data to session construction module 120, supporting high accuracy in session assembly and in downstream analysis and correlation processes. For instance, in a non-limiting example, the system may receive event data from multiple heterogeneous data sources that generate and transmit logs at different times or in varying network conditions, which may result in out-of-order or asynchronous event arrival. The system may automatically analyze timestamp metadata, sequence identifiers, or other temporal indicators associated with the received digital events and reorganize the digital events into a strict chronological order. Resequencing in such a manner ensures that the system maintains an accurate and consistent temporal record of digital activities across all monitored computing environments. By preserving the true order of occurrence, the system improves the fidelity of reconstructed user activity timelines and enhances the accuracy of subsequent session construction, event correlation, and actor attribution processes. For instance, in a non-limiting example, when the system receives log data from multiple cloud service providers having overlapping authentication, API, and access events, the system may automatically resequence the digital events according to their associated timestamps to reflect the actual sequence of actions (e.g., digital events) performed by an actor. This capability allows the system to generate more accurate session objects and cross-environment correlations, thereby improving the precision and effectiveness of real-time root actor detection and security analysis.

In some embodiments, session construction module 120 may function to determine whether the actor type for a constructed session is a machine actor or a human actor. That is, in some embodiments, session construction module 120 may function to determine whether the digital events of a constructed session are initiated by a machine (e.g., a computer or server) or a human. In some such embodiments, session construction module 120 may function to determine the human or machine actor type of a session based on one or more algorithms, heuristics, and/or other logic.

Additionally, or alternatively, in some embodiments, session construction module 120 may function to implement one or more machine learning models to determine the human or machine actor type of a constructed session. Additionally, or alternatively, session construction module 120 may perform various other types of machine learning to enhance security and contextual awareness. For example, machine learning models may detect anomalous access by identifying new geolocation patterns based on IP address changes or recognizing hardware device information that deviates from expected configurations. Machine learning models may also detect unusual behavior, such as significant deviations from typical access times, frequencies, or interaction patterns, thereby identifying potential security risks and enhancing the accuracy of session-based activity analysis. As such, in some embodiments, session construction module 120 (and/or any other component of system 100) may employ any suitable machine learning including, but should not be limited to, one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), adversarial learning, and any other suitable learning style. Each module of the plurality can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, density-based spatial clustering of applications with noise (DBSCAN), expectation maximization, etc.), a bidirectional encoder representation form transformers (BERT) for masked language model tasks and next sentence prediction tasks and the like, variations of BERT (i.e., ULMFiT, XLM UDify, MT-DNN, SpanBERT, RoBERTa, XLNet, ERNIE, KnowBERT, VideoBERT, ERNIE BERT-wwm, MobileBERT, TinyBERT, GPT, GPT-2, GPT-3, GPT-4 (and all subsequent iterations), LLaMA, LLaMA 2 (and subsequent iterations), ELMo, content2Vec, and the like), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and any suitable form of machine learning algorithm. Each processing portion of system 100 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the system 100. Further, any suitable model (e.g., machine learning, non-machine learning, etc.) may be implemented in the various systems and/or methods described herein.

1.30 Session Correlation Engine

The session correlation engine 130 preferably functions to automatically configure one or more session correlations between constructed sessions (e.g., individual session objects or the like). Preferably, session correlation engine 130 may function to configure a session correlation between two distinct constructed sessions (e.g., two distinct individual session objects) based on determining the two distinct sessions are associated with a common actor or entity (e.g., the same actor or entity performed the digital events in each of the two distinct sessions). In one or more embodiments, session correlation engine 130 may be in operable communication with session construction module 120 to receive, as input, each of the constructed sessions.

Session correlation engine 130 preferably functions to automatically identify relationships between constructed sessions (e.g., session objects) by analyzing digital event data attributes associated with each session. In one or more embodiments, session correlation engine 130 determines a correlation between sessions based on common actor identities, temporal alignment of digital events, and shared resources. Correlation between sessions enables system 100 to attribute sequential digital actions to a single actor or entity across multiple digital platforms, forming a comprehensive view of activity within a specified time period. For instance, in such a non-limiting example, session correlation engine 130 may correlate sessions that share one or more common identifiers, timestamps, or network attributes to accurately associate related digital activities and/or related session objects across different computing environments.

In various embodiments, session correlation engine 130 implements correlation algorithms, including temporal proximity matching and attribute-based matching, to detect related sessions. Temporal proximity matching identifies sessions initiated by a common actor within a specified timeframe, defining session boundaries based on predetermined time intervals. Attribute-based matching evaluates specific session properties, such as IP addresses, device identifiers, and user roles, to determine whether two or more sessions belong to a single actor. Using multiple correlation algorithms allows system 100 to establish robust relationships among sessions, enhancing the reliability of actor attribution.

Session correlation engine 130 may further incorporate probabilistic correlation methods to account for ambiguous session attributes. In some embodiments, the session correlation engine assigns a confidence score to each correlation based on factors such as the frequency of shared identifiers, the degree of temporal overlap, and the likelihood of shared actor identity. Probabilistic correlation methods enable system 100 to manage uncertainty, facilitating more accurate correlations when data points are incomplete or inconclusive.

Additionally, session correlation engine 130 supports cross-platform correlation and/or cross-environment correlation by standardizing session properties across diverse digital event data sources. Standardization enables effective comparison of session attributes from distinct digital environments, such as cloud service providers and on-premise systems. In some embodiments, session correlation engine 130 incorporates machine learning models trained on historical data to predict session relationships based on patterns of actor behavior. Integrating machine learning allows session correlation engine 130 to adapt to evolving digital environments, improving correlation accuracy over time.

1.40 Attribution Engine

The attribution engine 140 preferably functions to construct an attribution chain for a target session based on session correlations. As described in 2.40, the term "attribution chain", as generally used herein, may refer to a set of one or more sessions of a distinct session actor that may represent a sequence of digital activity of the distinct session actor across the set of one or more sessions. Preferably, for a given target session, attribution engine 140 may function to construct an attribution chain by identifying any sessions linked to the target session by a session correlation that may precede the target session chronologically. In one or more embodiments, attribution engine 140 may be in operable communication with session correlation engine 130 and/or session construction module 120 to receive, as input, the one or more constructed sessions, including a target session for attribution, and any session correlations between the one or more constructed sessions. In turn, attribution engine 140 may function to construct an attribution chain for the target session that may comprise one or more correlated sessions.

Attribution engine 140 functions to construct attribution chains that trace a series of digital events associated with a target actor across multiple sessions. In various embodiments, attribution engine 140 identifies correlations between sessions based on actor identity, sequence of actions, and contextual properties of digital events. Correlation of sessions enables attribution engine 140 to connect discrete actions within a cohesive activity trail, forming an attribution chain that allows users to analyze behavioral patterns and detect potential security risks.

In one or more embodiments, attribution engine 140 applies temporal correlation methods to establish session links. Temporal correlation involves aligning sessions based on the timing of digital events, with sessions deemed related if timestamps indicate continuity of activity within a specified timeframe. Temporal correlation parameters may be configured to reflect acceptable gaps in user activity, accommodating both continuous and intermittent behavior patterns.

Attribution engine 140 may further employ event similarity correlation, which groups sessions with closely aligned event characteristics. Event similarity is assessed based on digital event types, event outcomes, accessed resources, and other event-specific attributes. Sessions with highly similar event sequences are correlated to reflect the probability of a common actor origin, allowing attribution engine 140 to group related sessions across different digital platforms.

In some embodiments, attribution engine 140 incorporates actor-based correlation methods, linking sessions by a common actor identifier or associated identifiers, such as device IP addresses, account credentials, or geolocation data. Actor-based correlation ensures that digital events attributed to the same user or device are connected across sessions, enabling consistent identity attribution across distinct digital environments.

Attribution engine 140 may also use causal correlation methods to infer relationships between sessions based on the flow of actions or dependencies between digital events. Causal correlation identifies sessions where one session's events trigger or enable actions in a subsequent session. For example, authentication in an initial session followed by resource access in a subsequent session may establish a causal link between sessions, reflecting a logical progression of activity. Stated another way, attribution engine 140 may detect that a digital event recorded in a first session object initiated or enabled an action (e.g., one or more digital events) represented in a second session object, thereby establishing a causal relationship between the two session objects and allowing the system to map the directional flow of activity across computing environments. In a non-limiting example, attribution engine 140 may detect that a user's console login captured in a first session object results in the creation of an API key subsequently used in a second session object to access cloud resources, thereby establishing a causal relationship between the two session objects. In another non-limiting example, attribution engine 140 may detect that a configuration change indicated in a first session object triggers an automated deployment process indicated in a second session object, indicating that the second session object was causally derived from the first session object. In another non-limiting example, attribution engine 140 may detect that a user downloaded sensitive data in a first session object and then, within a short time frame (e.g., 2 minutes or less, 15 minutes or less, etc.), executes an external data transfer in a second session object, establishing a causal relationship between the two session objects.

In various embodiments, attribution engine 140 applies a scoring model to evaluate the strength of each correlation, assigning confidence scores based on alignment across temporal, event similarity, actor-based, and causal criteria. Higher confidence scores are assigned to correlations with multiple aligned criteria, enhancing the accuracy of constructed attribution chains. The scoring model may be configured to filter low-confidence correlations, ensuring attribution chains represent a reliable sequence of actions by a distinct actor.

To support cross-platform correlation, attribution engine 140 applies normalization processes that standardize session properties from diverse digital sources, enabling consistent comparison across platforms. In some embodiments, attribution engine 140 integrates machine learning algorithms that predict correlation likelihood based on historical activity patterns, adapting to changing user behaviors and platform-specific attributes. Machine learning integration enables continuous refinement of correlation accuracy, improving the precision of attribution chains over time.

It shall be further recognized that, in some embodiments, attribution engine 140 may obtain new information (e.g., new data) during or after the attribution process that was not available, considered, or fully understood at an earlier stage of processing by session construction module 120. In such embodiments, attribution engine 140 may provide this newly obtained information as feedback or input to session construction module 120, enabling the system to incorporate additional context or correlations that enhance previously constructed session objects. This backward feedback process allows system 100 to iteratively refine its understanding of digital activity as new information surfaces, ensuring that earlier processing steps remain aligned with the most current and complete data available. The updated and contextually enriched session data may then be stored in data repository module 160 for persistence and use in subsequent analytical or visualization processes. For instance, in a non-limiting example, attribution engine 140 may obtain new information or data indicating that two previously distinct session objects share a previously unrecognized session identifier (e.g., an authentication token or provider-issued session ID), and may provide this information back to session construction module 120 so that the two session objects are merged into a single session object. In another non-limiting example, attribution engine 140 may obtain new information or data indicating that additional digital event data associated with a previously constructed session object has become available from one or more data sources, and may provide the new information or data back to session construction module 120 so that the previously constructed session object can be updated to include the newly obtained digital event data. At least one technical benefit of attribution engine 140 is that it can input newly obtained data into system 100 (or any module of system 100) and propagate backward feedback to earlier processing stages, enabling the system to update or refine previously created session objects as new information and data becomes available.

1.50 Session Data Surfacing Module

Session data surfacing module 150 preferably functions to surface any session data (e.g., constructed session(s), session correlation(s), and/or attribution chain(s)) to one or more users or subscribers (e.g., subscribing entities) of system 100. In one or more embodiments, session data surfacing module 150 may include a user interface that may enable the one or more users or subscribers of system 100 to interact with, direct, and/or configure one or more components of system 100. In one or more embodiments, the user interface may comprise a graphical user interface (GUI), a voice user interface (VUI), and/or any other suitable user interface for receiving input from and providing output to one or more users, subscribers, or subscribing entities of system 100. Additionally, session data surfacing module 150 may support external integrations, including an application programming interface (API) for automated access to session data, export functionality for downloading data in various formats (e.g., CSV, JSON), and a notification system that utilizes webhooks or sends alerts through chat applications. These capabilities enhance flexibility in accessing and distributing session data, allowing users to incorporate system 100 outputs into broader workflows and external monitoring systems.

Session data surfacing module 150 functions to display correlated session data, attribution chains, and digital event summaries to users through an interactive graphical user interface. Session data surfacing module 150 is designed to enhance user accessibility and facilitate analysis of session attributes and correlations. Various display regions within the module organize session data for efficient navigation and detailed inspection of session information.

In one or more embodiments, session data surfacing module 150 includes a session summary region that presents an overview of each session's primary attributes, including session start and end timestamps, session duration, and impact and suspicion scores. Impact and suspicion scores indicate the relative importance and security risk level of each session based on detected behaviors. Providing a quick reference to key session details in the session summary region allows users to rapidly assess sessions requiring further review.

Session data surfacing module 150 includes an attribution chain region, which displays a visual representation of attribution chains constructed by attribution engine 140. The attribution chain region presents each session as a linked node, arranged sequentially to reflect actor activity progression. Each node includes session properties, such as session duration and actor identity, enabling users to trace a continuous trail of activity across multiple sessions. Interactive features, such as expanding or collapsing session nodes, allow users to control the detail level displayed within the attribution chain.

The digital event table region displays individual digital events within each session, organized in a tabular format. Digital event table columns may include event timestamps, event type, actor identity, IP address, device identifier, and event outcome (e.g., success or failure). Users may sort or filter events by column criteria to isolate specific event types or outcomes, providing a focused view of session activities. Each row in the digital event table can be selected to view event-specific details, enhancing flexibility in data exploration.

In various embodiments, session data surfacing module 150 also includes a session alert notification region that displays notifications related to significant session events. Alerts may indicate policy violations, anomalies, or other flagged behaviors within a session. Each alert includes descriptive information about the triggering condition and suggested actions for investigation or remediation. Displaying alerts alongside session data allows users to identify critical events quickly and take appropriate action without needing to switch interfaces.

The session data export feature enables users to export selected session data for offline analysis or recordkeeping. Session data may be exported in various formats, including CSV, JSON, and PDF. Users can select individual sessions, events, or entire attribution chains for export, enabling tailored data retrieval. Data export functions support integration with external reporting and analysis tools, allowing users to manage session data across different platforms as needed.

Additionally, session data surfacing module 150 may incorporate user-configurable settings for customizing display preferences. Settings may include options for adjusting time intervals, session impact score thresholds, and session categorization rules. Configurable settings enable users to align module behavior with specific analysis requirements or organizational policies.

Figure 3:
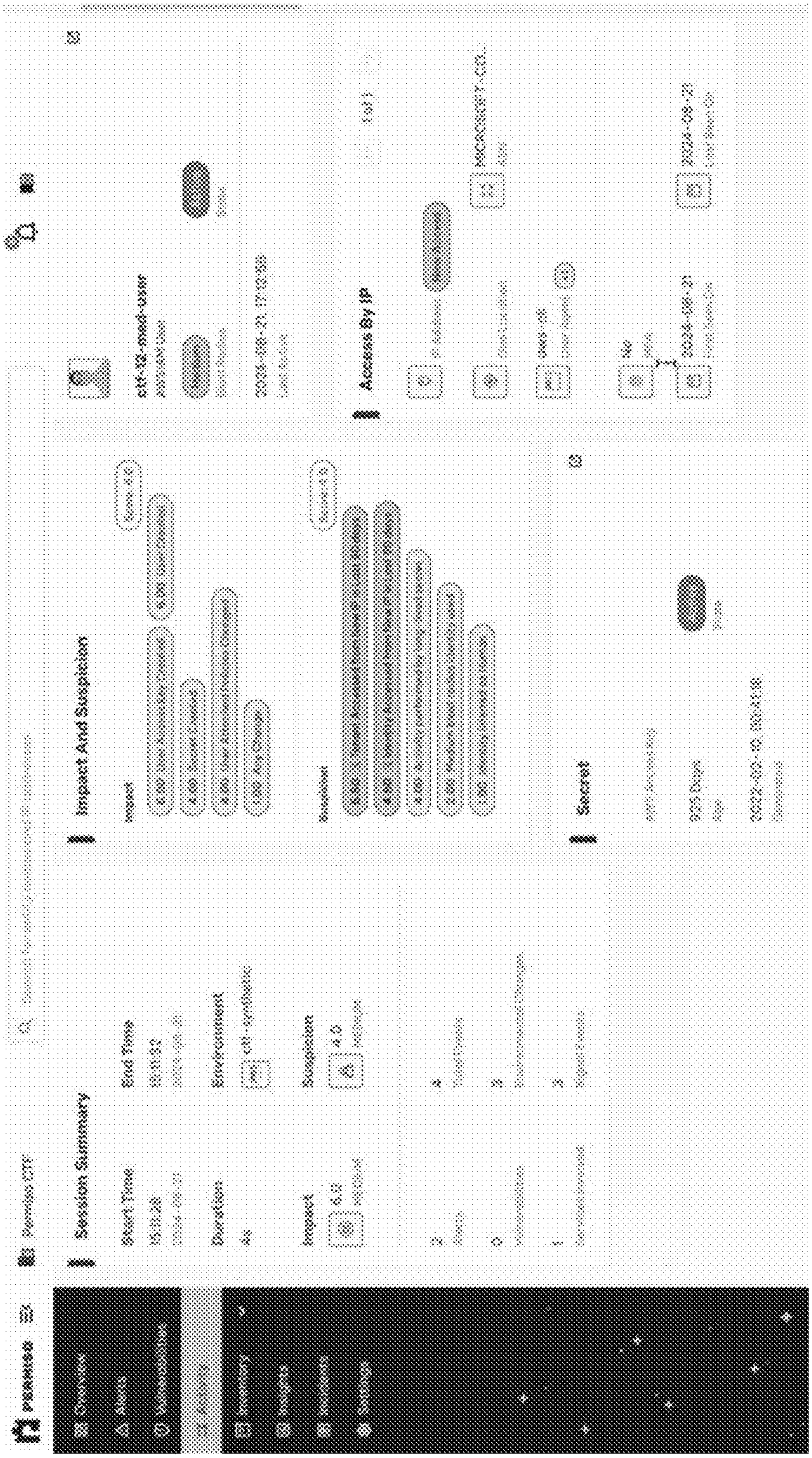
FIGS. 3-8 and 19 illustrate an exemplary session user interface in accordance with one or more embodiments of the present application.

The session user interface within session data surfacing module 150 functions to display session data summaries, correlation information, and session properties to users. The session user interface may include multiple visual regions for presenting key session details, organized to provide an intuitive and accessible display that aligns with system functions as shown in FIG. 3.

In one or more embodiments, the session user interface includes a session summary region that displays primary session properties, including session start timestamp, end timestamp, session duration, and session environment. The session summary region may additionally include impact and suspicion scores, which are calculated based on factors such as the sensitivity of accessed resources and frequency of suspicious behaviors within the session. Including impact and suspicion scores enables the user to quickly assess the significance of a session's activities.

The session user interface may also include a session credential region, which displays authentication and authorization details associated with a session. Credential information may include access keys, validity periods, access key age, and session authentication type (e.g., single-factor or multi-factor authentication). Displaying credential details provides transparency regarding access controls associated with a session, enabling users to evaluate session security more effectively.

Additionally, the session user interface includes a session actor identity region to surface actor details associated with a session, including username, role, and location details (e.g., IP address and geolocation). The actor identity region supports quick reference to the user identity involved in session activities, highlighting both human and machine actors based on session properties.

In various embodiments, the session user interface includes an impact and suspicion analysis region that presents calculated scores and visual indicators for each session. Each session's impact score and suspicion score may be represented using visual scales, color-coding, or iconography to signal potential risk levels. Displaying visual indicators in the impact and suspicion analysis region enables rapid assessment of sessions requiring further investigation, based on unusual activity patterns or access levels.

The digital event list region of the session user interface displays individual digital events within a session, presented in a structured table format. Columns in the digital event list may include event timestamp, event type, event outcome (e.g., success or failure), IP address, device identifier, and relevant resources accessed. Sorting and filtering functions enable users to focus on specific event types or outcomes, providing a detailed view of session activities as needed.

In some embodiments, the session user interface includes an alert notification region displaying notifications related to session events. Alert notifications may indicate flagged events or conditions, such as policy violations or detected anomalies within a session. Alert notifications appear alongside detailed descriptions to assist users in identifying specific behaviors or risks requiring prompt attention.

In some preferred embodiments, session data surfacing module 150 may function to enable the one or more users or subscribers to query system 100 for session data associated with one or more target sessions. In such embodiments, session data surfacing module 150 may function to display or otherwise output any or all session data (e.g., digital event data and/or metadata) related to each selected target session. In such embodiments, session data surfacing module 150 may be in operable communication with session construction module 120 and/or session correlation engine 130.

Additionally, or alternatively, session data surfacing module 150 may function to enable the one or more users or subscribers to select one or more target sessions for attribution engine 140. In such embodiments, session data surfacing module 150 may function to surface (e.g., display or otherwise output) an attribution chain constructed by attribution engine 140 for each selected target session. In such embodiments, session data surfacing module 150 may additionally or alternatively be in operable communication with attribution engine 140.

1.60 Session Data Repository

In some embodiments, system 100 may include session data repository 160. In such embodiments, session data repository 160 may function to receive and/or store one or more constructed sessions within computer memory (e.g., sessions constructed by session construction module 120). Additionally, session data repository 160 may function to store digital event data, one or more session correlations (e.g., session correlations generated by session correlation engine 130) and/or one or more attribution chains (e.g., attribution chains generated by attribution engine 140). In one or more embodiments, session data repository 160 may be queried by one or more components of system 100 to provide access to or otherwise deliver any stored data. In some embodiments, system 100 may include a plurality of session data repositories 160. In various embodiments, session data repository 160 may comprise one or more remote computers or servers, one or more local computers or servers, cloud storage, local storage (e.g., hard drives, solid state drives, network-attached storage, flash drives, and/or the like), one or more databases, and/or any other suitable data storage system or device.

Figure 2:
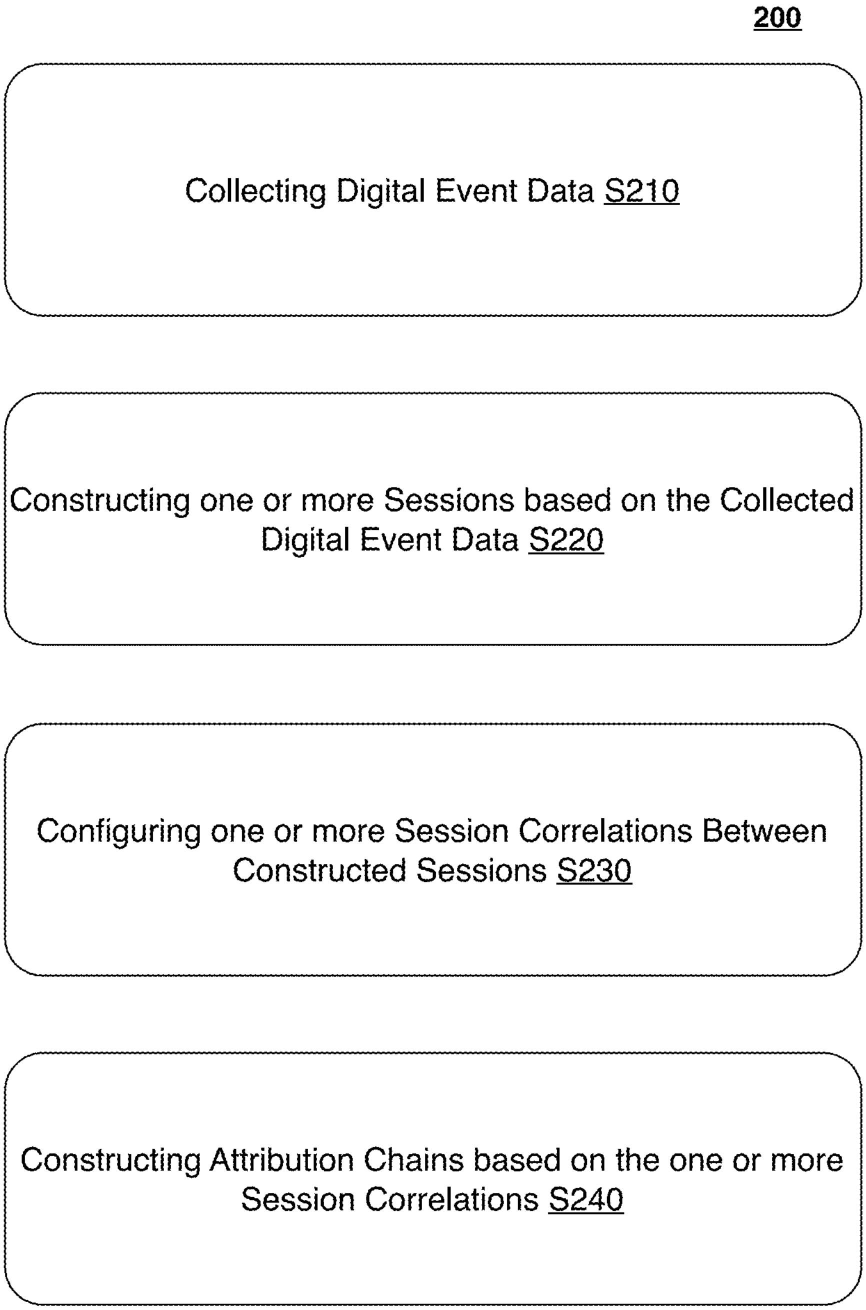
FIG. 2 illustrates an example method 200 in accordance with one or more embodiments of the present application.

2. Method for Automatically Correlating Digital Events for Attribution Across Digital Platforms As shown in FIG. 2, a method 200 for automatically correlating digital events for attribution across digital platforms includes collecting digital event data S210, constructing one or more sessions based on the collected digital event data S220, configuring one or more session correlations between constructed sessions S230, and constructing attribution chains based on the one or more session correlations S240.

It shall be recognized that, in some embodiments, the system 100 and method 200 may use additional and/or different system components and method processes as described in U.S. Patent Application No. 63/762,366, titled SYSTEMS AND METHODS FOR AUTOMATED DETECTION OF CYBERSECURITY THREATS ACROSS DIGITAL PLATFORMS, which is incorporated in its entirety by this reference.

The term "computing environment," "environment," and/or the like, in some embodiments, may be a web server, a web-based SaaS application, or a computer workstation.

The term "digital event," "event," and/or the like, in some embodiments, may be a record of a digital action taken within a respective computing environment.

The term "action," "digital action," and/or the like, in some embodiments, may refer to an operation performed within a respective computing environment, such as reading data from a file or database, creating or updating a file or database record, deleting a file or database item, invoking an application programming interface (API) operation, modifying a configuration setting, accessing a resource, or performing any other suitable action that produces a corresponding digital event.

The term "session," "session object," and/or the like, in some embodiments, may refer to a group of one or more digital events (e.g., 1 digital event, 10 digital events, 20 digital events, 300 digital events, etc.).

The term "root actor," in some embodiments, may be a human or non-human (e.g., software procedure, artificial intelligence (AI), etc.) performing digital actions within a computing environment.

The term "user" or "user account," in some embodiments, may be a unique representation of a root actor, such as an email account in a SaaS application, a user account in a web server, an IAM user with separate login credentials. It shall be recognized that, in some embodiments, an actor may be used as an alias for user, but the root actor is the underlying human or non-human behind the digital actions or digital events included in a plurality of session objects that are connected (e.g., linked) together, irrespective of which user account or alias was used. In other words, the root actor is the common entity responsible for the digital actions/digital events performed across all session objects connected (e.g., linked) together. It shall be further recognized that, in some embodiments, the root actor may have many users.

2.10 Collecting Digital Event Data

S210, which includes collecting digital event data, may function to receive, source, and/or otherwise collect one or more pieces of digital event data that may relate to one or more digital events or actions. In various embodiments, digital event data may comprise one or more pieces of data and/or metadata related to a distinct digital event or action. In one or more embodiments, S210 may function to construct one or more digital event records based on the collected digital event data, wherein each digital event record relates to a distinct digital event.

Digital Event Data and Metadata

Preferably, digital event data may comprise one or more pieces of data and/or metadata associated with a distinct digital event performed or executed in a distinct digital environment (e.g., a cloud computing environment or platform). In one or more embodiments, digital event data for a distinct digital event may relate to the actor and/or entity performing or initiating the digital event, one or more resources or services utilized during the distinct digital event, access details of the distinct digital event, activity details of the distinct digital event, and/or any related resources associated with the distinct digital event. Additionally, digital event data may include enriched metadata from external sources to provide further context, such as identity attributes from an associated distinct system or other identity management platforms. External enrichment may also incorporate data from third-party sources, including threat intelligence information, such as prior threat history associated with an IP address, enhancing the depth and accuracy of information available for subsequent analysis.

In various embodiments, digital event data for a distinct digital event may include, but is not limited to, a start timestamp of the distinct digital event, an event label or event name of the distinct digital event, a service name and/or service type of the distinct digital event, an IP address of the actor or entity performing or initiating the distinct digital event, an identifier (e.g., name, label, and/or the like) of the actor or entity performing or initiating the distinct digital event, an outcome status (e.g., success/failure) of the distinct digital event, one or more event insight features of the distinct digital event, one or more signals generated, sent and/or received by the distinct digital event, one or more (e.g., online or digital) resources utilized and/or activated by the distinct digital event, one or more digital event category labels of the distinct digital event, and/or any other data and/or metadata associated with the distinct digital event. Digital event data may further include user-agent information, detailing the browser or application used to access the service, and authentication device information, identifying the device employed for access authentication. The inclusion of user-agent and authentication device details provides additional context for access-related events, supporting more comprehensive analysis and security monitoring.

Digital Event Data Sources

In one or more embodiments, S210 may function to collect digital event data from one or more digital event data sources. In various embodiments, the one or more digital event data sources may include, but are not limited to, one or more clouds service providers or systems, one or more identity and access management (IAM) providers or systems, one or more single sign-on (SSO) providers or systems, one or more cybersecurity providers or systems, one or more user devices, one or more one or more operating systems, one or more servers or computers, one or more applications, one or more microservices, one or more databases, and/or any other suitable source of digital event data.

The digital event data sources function as origins for digital event data collected by digital event data intake module 110. In various embodiments, digital event data sources may include, but are not limited to, cloud service providers, identity and access management (IAM) systems, single sign-on (SSO) systems, cybersecurity platforms, network devices, and user devices. Each digital event data source provides unique insights into activity that is occurring or that occurred within a digital environment and contributes valuable metadata for accurately tracking and attributing digital events.

In one embodiment, cloud service providers serve as a data source by generating logs related to user and system activities, including access events, service utilization, and account modifications. Identity and access management systems generate authentication and authorization logs, detailing identity verification events, permission grants, and policy enforcement actions. Single sign-on systems provide records of centralized authentication events that unify access credentials across multiple platforms, while cybersecurity platforms capture threat detection and response activities, alerting system 100 to security incidents and anomalous behaviors.

Network devices, such as routers, switches, and firewalls, generate logs that capture network-level events, including IP address usage, packet transfers, and security alerts. User devices, including desktops, mobile devices, and virtual machines, record local activities such as application launches, file accesses, and network connections. These logs contribute data that enables system 100 to attribute actions to specific users or devices across a variety of digital environments.

In various embodiments, digital event data sources may produce data in multiple formats, including but not limited to JSON, XML, CSV, and Syslog formats. Digital event data intake module 110 can parse each data format into a standardized structure, enabling efficient processing and analysis by other system components.

In various embodiments, S210 may function to collect digital event data from one or more digital event data sources in any suitable format including, but not limited to, JSON formats, XML formats, CSV formats, Syslog formats, text-based data formats, and/or any other suitable format for digital event data.

In some embodiments, S210 may function to collect one or more digital event log artifacts comprising one or more digital event logs. In some such embodiments, each digital event log artifact may comprise a time series sequence of digital events that may be parsed into individual digital events and/or into digital event data. In some embodiments, the one or more digital event log artifacts may comprise a series of digital events that may or may not be arranged in chronological order according to a timestamp of each digital event.

Digital Event Data Parsing

In some embodiments, S210 may function to parse, in real-time or near real-time, the one or more digital event logs to extract digital event data. In one or more embodiments, S210 may function to receive, as input, one or more event logs comprising digital event data (e.g., event logs in any suitable event log format). In turn, S210 may function to automatically extract digital event data associated with one or more digital events. In such embodiments, each piece of digital event data may be associated with a distinct digital event. Additionally, in such embodiments, each distinct digital event may be associated with one or more pieces of digital event data. In some preferred embodiments, S210 may function to associate each piece of digital event data to a distinct digital event, such that S210 may function to construct one or more digital event records, wherein each digital event record may be representative of a distinct digital event. In such embodiments, each digital event record may comprise one or more (or all) pieces of digital event data associated with the corresponding digital event.

As a non-limiting example, a distinct digital event may comprise a user login event in which a user (e.g., the actor or entity of the distinct digital event) logs in to a computing service or platform (e.g., a cloud service provider). In such an example, the login event may be associated with a timestamp identifying the time and date of the user login event. Additionally, the login event may be associated with an IP address and/or an identifier of the user, as well as an outcome (e.g., success or failure) of the login event. In certain embodiments, the login event may also involve a second-factor verification process, such as a 6-digit code sent to the user via SMS text message or an authenticator application. Metadata from the second-factor verification may include information about the device, phone number, or email address where the verification code was received. Such metadata can be analyzed to determine whether the device appears expected or may indicate potential suspicious activity, providing an additional layer of context for assessing security and trustworthiness of the login event. S210 may function to parse or extract digital event data sourced from the computing service or platform, and in turn S210 may function to construct a digital event record for the user login event comprising all digital event data and multi-factor authentication data associated with the user login event.

Digital Event Data Streaming

In some embodiments, S210 may function to collect digital event data in real time. As a non-limiting example, S210 may function to receive digital event data from one or more digital event data streams that may be sourced from one or more digital event data sources in real-time as the events occur and/or as the digital events are logged. Such real-time digital event data collection may advantageously enable early or immediate detection of any potential issues related to one or more digital events. Additionally, or alternatively, in some embodiments, S210 may function to collect event data at specified (e.g., predefined) intervals. In some such embodiments, S210 may function to collect batches of digital event data at specified or predetermined intervals.

Stated another way, in one or more embodiments, S210 may function to obtain, by a network of distributed computers, digital event data that occurred on a plurality of disparate computing environments of a subscribing entity and, in turn, convert the digital event data into normalized digital event data that conforms to a target data schema specified by the identity-based threat detection and response service.

2.20 Constructing One or More Sessions Based on the Collected Digital Event Data S220, which includes constructing one or more sessions based on the collected digital event data, may function to construct one or more actor- or entity-specific sessions based on digital event data associated with one or more distinct digital events that occur within a session timespan. As generally used herein, the term "session" may refer to a series of digital events performed or initiated by a distinct actor or entity (sometimes referred to herein as a "session actor") that may occur within a specific session timespan. In one or more embodiments, each session may be associated with a distinct digital event data source or environment (e.g., a distinct cloud service provider), such that each session may represent the activity of an actor or entity, within a specific time period, on a platform or service associated with the distinct digital event data source. It shall be recognized that the term "session" may be interchangeably referred to herein as a "session object," "individual session object," or the like.

Session Properties

In one or more embodiments, S220 may function to compute or otherwise determine one or more session properties for each constructed session based on the digital event data of each digital event of the associated constructed session. The term "session properties," as generally used herein, may refer to any data and/or metadata that may characterize or be associated with a distinct session. That is, each distinct session may include one or more session properties that may describe or characterize that distinct session.

In various embodiments, session properties for a constructed session may include, but are not limited to, a session start timestamp, a session end timestamp, a session duration, a session environment, a session impact score, a session suspicion score (e.g., a computed score associated with a level of suspicious activity of a session), an impact activity list, a suspicion activity list, a session potential impact category (e.g., a categorization of the potential damage or impact that activities of a session may cause, sometimes referred to herein as a "blast radius", that may include one or more categories such as "low", "medium", "high", and/or the like), one or more session credential properties (e.g., an access key, an access key age, an access key validity, an access key generation date, and/or any other credential properties), session actor identity properties (e.g., actor username, actor role or title, last activity date), an IP address of the session actor, a geolocation of the session actor, an autonomous system number (ASN) of the session actor, a client identifier (e.g., an Amazon Web Services (AWS) user agent), a session platform identifier (e.g., the computing platform or the service associated with the session), a multi-factor authentication status (e.g., to identify if multi-factor authentication is used or not in the session), session actor activity timestamps (e.g., a "first seen on" timestamp and a "last seen on" timestamp that may identify the first and last timestamps, respectively, that the session actor may have been active in the session), digital event categorizations (e.g., alert events, change events, signal events, and/or any other category of digital event), and/or any other suitable properties that may relate to a distinct session.

Session Construction

Preferably, S220 may function to construct one or more sessions based on the collected digital event data. In one or more embodiments, S220 may function to split a large volume of digital event data into one or more sessions. Additionally, or alternatively, in some embodiments S220 may function to split a continuous stream of digital event data into one or more sessions. During session construction, S220 may perform operations to optimize the accuracy and relevance of each session. For example, S220 may filter out non-essential or redundant digital events, transforming event data to standardize formats or attribute labels. S220 may also enrich digital events by adding additional metadata, such as contextual information about the user or device, and may merge multiple related events into a single consolidated record within a session. Each session may therefore comprise one or more digital event records that correspond to the actions initiated by the session actor, reflecting only the most relevant and processed event data.

In some embodiments, each session may be associated with a singular digital event data source (e.g., a distinct cloud service provider, a distinct IAM provider, a distinct SSO provider, and/or the like). As such, S220 may function to construct different sessions, or split sessions, based on identifying digital event data from different digital event data sources. In some embodiments, each digital event data source may be associated with a distinct digital event environment, such that each session may correspond to one or more digital events that occur in a distinct digital event environment.

In some embodiments, each session may be associated with one or more digital event data sources, referred to as "integrations," representing distinct data feeds from various systems (e.g., cloud service providers, identity and access management platforms, or monitoring tools). Each integration may function as a unique data feed that may provide complete, partial, or no overlap with other integrations, capturing different aspects of the same session activity. Despite multiple integrations, each session may be ultimately associated with a single distinct digital event environment, representing the overall protected region or computing context in which digital events occur. S220 may function to construct sessions by aggregating and reconciling data from multiple integrations to create a unified session view, even when multiple data sources capture identical or overlapping session events within the same distinct digital event environment.

Additionally, in some embodiments, each session may be associated with a singular session actor; that is, the actor or entity that performs or initiates the one or more digital events of the session. As such, S220 may additionally function to construct different sessions, or split sessions, based on determining that different actors or entities are performing or initiating the one or more digital events. As such, S220 may function to construct each session based on a set of digital events, initiated by a distinct session actor in a distinct digital event environment.

In some embodiments, each session may additionally be associated with a distinct identity, one or more accounts (e.g., one digital account, two digital accounts, three digital accounts, four digital accounts, etc.), one or more IP addresses (e.g., one IP address, two IP addresses, three IP addresses, four IP addresses, etc.), and/or other session identification property associated with a session actor performing or initiating the one or more digital events of the session. As such, S220 may additionally function to construct different sessions, or split sessions, based on determining that different accounts, identities, and/or users are performing or initiating the one or more digital events.

As a non-limiting example, an actor (e.g., a user) may log into a distinct IAM provider, and then subsequently the actor may log in to a distinct cloud service provider from the distinct IAM provider. In such an example, after performing one or more digital events (activities) on the distinct cloud service provider, the actor may then log in to a separate account on the cloud service provider. In such an example, S210 may function to collect and parse digital event data logs from the distinct IAM provider and the distinct cloud service provider. In turn, S220 may function to construct a session associated with the actor and the distinct IAM provider that comprises a login event to the IAM provider. S220 may additionally construct a session associated with the actor and the distinct cloud service provider that comprises a login event and the one or more digital events (activities) performed by the actor on the distinct cloud service provider. Additionally, in such an example, S220 may construct a session associated with the actor and the distinct cloud service provider for the separate account that comprises the login event to the separate account, as well as any subsequent digital events (activities) performed by the actor on the distinct cloud service provider while logged in to the separate account. Therefore, in such an example, S220 may function to construct three distinct sessions that may comprise digital event data associated with the actor, the respective digital event data source, and/or the account used by the actor. Stated another way, in one or more embodiments, S220 may function to construct distinct session objects that individually represent the actor's activity within each distinct account or distinct service to collectively capture the actor's overall sequence of actions across multiple computing environments.

In one or more embodiments, S220 may function to aggregate or append one or more digital events to a session based on identifying each digital event performed by a distinct actor or entity on a distinct computing platform or provider (e.g., a cloud service provider, an IAM provider, an SSO provider, and/or the like) using a distinct account. In some embodiments, each digital event of a session may comprise an atomic action that may represent an instance or unit of actor activity on the distinct computing platform or provider using the distinct account.

In some embodiments, each session may be associated with a distinct session timespan. In such embodiments, S220 may function to append digital event records to a distinct session if the corresponding digital events occur temporally within the session timespan of the distinct session. As such, S220 may function to construct one or more sessions that may each comprise one or more digital events that occur within a similar timeframe. In such embodiments, S220 may determine this temporal overlap based on comparing the timestamp of the digital event of a digital event record to the session timespan. In some such embodiments, if one or more corresponding digital events occur outside the session timespan, S220 may function to construct a separate distinct session with a different session timespan for those digital events. Alternatively, if the one or more corresponding digital events occur within the session timespan of another, previously constructed session, S220 may function to append the corresponding digital event records to the previously constructed session. That is, as S220 receives digital event data and/or digital event records, S220 may function to determine whether the corresponding digital event(s) occurred within the session timespan of a previous session, an active (current) session, or if the digital event(s) are part of a new, as-yet unconstructed session. Based on this determination, S220 may append the digital event data and/or the digital event records to the session that may have been active at the time of the digital event, and/or S220 may function to construct a new session to accommodate the digital event if it occurred outside of any currently active or previously constructed sessions.

In some embodiments, the session timespan may be predefined or user-selected (e.g., by a user of a system implementing method 200). Alternatively, in some embodiments, S220 may function to automatically determine the session timespan for each constructed session. In one or more embodiments, the session timespan may be based on the digital event data source for the session, the actor or entity type (e.g., machine or human) for the session, the computing platform or provider for the session, and/or any other feature of the constructed session.

In some embodiments, S220 may maintain constructed sessions in an append status for a period of time after the session timespan and/or indefinitely, such that S220 may continue to append digital events data and/or digital event records to the constructed sessions. Such embodiments may enable S210 and/or S220 to receive digital event data for digital events of constructed sessions at a point in time after the constructed session timespans (e.g., digital event data received late or out of chronological order).

In one or more embodiments, S220 may function to construct, for a subscribing entity in real-time or near real-time, a plurality of individual session objects detected across a plurality of disparate computing environments in response to the network of distributed computers implementing the identity-based threat detection and response service executing one or more session construction instructions against the normalized digital event data. In such an embodiment, each individual session object of the plurality of individual session objects may include a distinct set of digital events performed in a respective computing environment of the plurality of disparate computing environments by a distinct digital account during a distinct time span.

In one or more embodiments, executing the one or more session construction instructions may cause the network of distributed computers to partition the normalized digital event data into a plurality of distinct sets of normalized digital event data based in part on actor metadata and time metadata included in the normalized digital event data and/or construct the plurality of individual session objects based on the plurality of distinct sets of normalized digital event data. For instance, in a non-limiting example, the system may automatically group normalized digital events associated with a common actor identifier and occurring within a defined temporal window into a single session object, while digital events associated with a different actor identifier or outside the temporal window may be assigned to another session object, thereby allowing the system to accurately represent distinct periods of actor activity across one or more computing environments. It shall be recognized that, in some embodiments, each individual session object of the plurality of individual session objects may correspond to a single actor and the single actor corresponding to a respective individual session object of the plurality of individual session objects may have performed the distinct set of digital events of the respective individual session object within an amount of time (e.g., thirty seconds, five minutes, ten minutes, etc.) less than a maximum time duration (e.g., five minutes, twenty minutes, thirty minutes, four months, etc.) permitted by the identity-based threat detection and response service.

Additionally, or alternatively, in one or more embodiments, executing the one or more session construction instructions may cause the network of distributed computers to assess the normalized digital event data based in part on timestamp metadata and actor metadata included in the normalized digital event data, identify, based on the normalized digital event data, a sequence of digital events performed by a single actor that occurred on one of the plurality of disparate computing environments, and/or construct a respective individual session object of the plurality of individual session objects based in part on the sequence of digital events performed by the single actor. The respective individual session object, in some embodiments, may include a session start time corresponding to a timestamp of a first digital event included in the sequence of digital events, a session end time corresponding to a timestamp of a last digital event included in the sequence of digital events, a session time duration determined from a difference between the session end time and the session start time, a digital account identifier indicating the distinct digital account used by the single actor to perform the sequence of digital events, a representation of the one of the plurality of disparate computing environments where the sequence of digital events occurred, the sequence of digital events performed by the single actor on the one of the plurality of disparate computing environments, and identity and access data associated with the single actor. The identity and access data included in the respective individual session object may include an internet protocol address from which the single actor accessed the one of the plurality of disparate computing environments, a geolocation derived from the internet protocol address, an autonomous system number identifying a network organization from which the internet protocol address originates, a user-agent identifying an interface or client application used by the single actor to perform the sequence of digital events, and/or an indication of whether the single actor used multi-factor authentication to access the one of the plurality of disparate computing environments.

Additionally, or alternatively, in one or more embodiments, executing the one or more session construction instructions against the normalized digital event data may cause the network of distributed computers to detect a console login digital event (e.g., session start digital event) that occurred within the normalized digital event data and/or commence the construction of a subject individual session object of the plurality of individual session objects in response to the detection of the console login digital event. The console login digital event may include an account identifier indicating a subject computing environment where the console login digital event occurred, and constructing the subject individual session object may include appending the console login digital event to the subject individual session object, assigning a session start time to the subject individual session object that corresponds to a timestamp of the console login digital event, appending, to the subject individual session object, one or more subsequent digital events included in the normalized digital event data that follow the console login digital event and correspond to the account identifier of the console login digital event, and/or assigning a session end time to the subject individual session object that corresponds to a timestamp of a respective subsequent digital event of the one or more subsequent digital events determined to occur last in time among the one or more subsequent digital events.

It shall be further recognized that, in such an embodiment, S220 may function to obtain, by the network of distributed computers, additional event data at a different time than the digital event data and, in turn, convert the additional event data into normalized event data that conforms to the target data schema specified by the identity-based threat detection and response service. Accordingly, in one or more embodiments, the identity-based threat detection and response service may detect that at least one event included in the normalized event data is associated with the console login digital event (e.g., the at least one event occurred after the one or more subsequent digital events) and, in turn, append, to the subject individual session object, the at least one event included in the normalized event data that is associated with the console login digital event. It shall be further recognized that, in some embodiments, the session end time associated with the subject individual session object may be updated from the timestamp of the respective subsequent digital event determined to occur last in time to a new time value that corresponds to a timestamp of the at least one event.

In one or more embodiments, the identity-based threat detection and response service may have detected that the at least one event included in the normalized event data is associated with the console login digital event based on detecting that a session identifier attributed to the at least one event by a cloud service provider is equivalent to a session identifier attributed to the console login digital event by the cloud service provider, the at least one event included in the normalized event data and the console login digital event originated from a same internet protocol address, the at least one event included in the normalized event data and the console login digital event were performed using a same hardware device (e.g., server, computer, etc.) associated with the single actor, and/or the at least one event included in the normalized event data and the console login digital event were performed using a same computer operating system.

Additionally, or alternatively, in one or more embodiments, S220 may function to obtain, by the network of distributed computers, additional event data at a different time than the digital event data and, in turn, convert the additional event data into normalized event data that conforms to the target data schema specified by the identity-based threat detection and response service. In such an embodiment, the identity-based threat detection and response service may function to detect that at least one new event included in the normalized event data is not associated with the console login digital event and the one or more subsequent digital events. Accordingly, in such an embodiment, S220 may function to construct a new individual session object in response to detecting that the at least new one event included in the normalized event data is not associated with the console login digital event and the one or more subsequent digital events, wherein constructing the new individual session object includes appending the at least one new event to the new individual session object.

Additionally, or alternatively, in one or more embodiments, the identity-based threat detection and response service may have detected the at least one new event included in the normalized event data is not associated with the console login digital event and the one or more subsequent digital events based on detecting an amount of time elapsed (e.g., fifteen minutes, etc.) between the at least one new event and the one or more subsequent digital events is greater than a predetermined elapsed time threshold (e.g., 30 seconds, 5 minutes, ten minutes, etc.) and/or detecting a change in access data (e.g., IP address, geolocation, hardware device, operating system, etc.) associated with the single actor for the at least one new event relative to access data associated with the subject individual session object.

Additionally, or alternatively, in one or more embodiments, the identity-based threat detection and response service may have detected the at least one new event included in the normalized event data is not associated with the console login digital event and the one or more subsequent digital events based on detecting a difference between a digital account identifier corresponding to the at least one new event and the account identifier corresponding to the console login digital event and the one or more subsequent digital events. In other words, the identity-based threat detection and response service may have detected the at least one new event included in the normalized event data is not associated with the console login digital event and the one or more subsequent digital events based on detecting a first actor (e.g., first user) performed the console login digital event and the one or more subsequent digital events and a second actor (different from the first actor) performed the at least one new event.

It shall be recognized that, in some embodiments, a plurality of integrations or data feeds may be monitoring the same computing environment and may observe the same digital event, and S220 may process, normalize, and remove redundant event data to ensure that each constructed session object accurately reflects the underlying activity and does not include duplicative digital events.

It shall be further recognized that, in some embodiments, the system or service implementing method 200 may function to attribute or assign a session label to each distinct digital event or normalized digital event obtained by the system or service implementing method 200. In a non-limiting example, the distinct set of digital events included in a respective session object may have the same session label and the distinct set of digital events included in another session object may correspond to a different session label. In another non-limiting example, the distinct set of digital events included in a first distinct session object may each be associated with a first session label, while the distinct set of digital events included in a second distinct session object may each be associated with a second session label that is different from the first session label. In another non-limiting example, the distinct set of digital events included in a first distinct session object may each correspond to a first session label, while the distinct set of digital events included in a second distinct session object may also correspond to the same first session label even though the two session objects are distinct from one another.

Machine/Human Categorization

In one or more embodiments, S220 may function to determine, based on one or more algorithms, heuristics (e.g., a plurality of actor-type classification heuristics or the like), and/or rules, whether the session actor of a constructed session is a machine (artificial) actor (e.g., a computer, a serverless function, and/or the like) or a human actor (e.g., a human user). In some embodiments, upon determining that the session actor is a machine actor, S220 may further function to classify the machine actor as a service actor (service activity) or a vendor actor (vendor activity). Additionally, in some embodiments, S220 may function to determine whether the session is an API session, which may include digital events initiated or performed via API calls or functions, or a console session, which may include digital events initiated or performed via a console or user interface.

In some embodiments, S220 may function to employ a human-machine classification model to determine whether the session actor of a session is a machine actor or a human actor. In one or more such embodiments, the human-machine classification model may be trained based on a training corpus of digital event data to classify digital event actors (entities) as machine actors or human actors. In some such embodiments, S220 may function to provide the digital event data of the digital events of the session as input to the human-machine classification model. In turn, the human-machine classification model may function to output an actor classification label that may identify the session actor as a machine actor (e.g., a machine actor label) or a human actor (e.g., a human actor label).

In one or more embodiments, in response to constructing a respective individual session object, the system or service implementing method 200 may function to provide, as input, the respective individual session object to an actor-type machine learning classification model and, in turn, the actor-type machine learning classification model may function to compute an actor-type classification inference comprising a confidence score indicating a probability of a machine actor using the distinct digital account of the respective individual session object to perform the distinct set of digital events included in the respective individual session object. Accordingly, in such an embodiment, the system or service implementing method 200 may function to assess, in real-time or near real-time, a security threat of the respective individual session object using a first set of threat detection instructions operably configured to assess the distinct set of digital events of the respective individual session object as machine activity when the confidence score satisfies a predetermined confidence score threshold or a second set of threat detection instructions operably configured to assess the distinct set of digital events of the respective individual session object as human activity when the confidence score fails to satisfy the predetermined confidence score threshold. Stated another way, the actor-type machine learning classification model may enable the system to automatically differentiate between automated and human-driven digital activity in real-time, allowing the system to dynamically tailor subsequent threat detection, response, and attribution processes based on the nature of the actor performing the activity. In one or more embodiments, the actor-type machine learning classification model may be trained using a corpus of labeled training data samples, where each labeled training data sample of the corpus of labeled training data samples includes a distinct session object and a corresponding label indicating whether the digital activity (e.g., digital events) represented by the session object was performed by a human actor or a machine actor. The training process may include extracting session-level features from the corpus of labeled training data samples, such as event timing distributions, action frequency, and interaction diversity, and using those features to train a machine learning model to distinguish between human and machine activity based on learned behavioral patterns.

In one or more embodiments, human activity may be characterized by irregular or varied interaction patterns, such as non-uniform timing between digital events, diverse sequences of actions, and contextual pauses that reflect decision-making or navigation behavior within an interface. Human-initiated sessions may also include evidence of manual interaction, such as console-based logins, user-interface actions, or commands entered through interactive sessions. In contrast, machine activity may be characterized by highly consistent or repetitive event sequences, uniform timing intervals, and sustained or periodic bursts of digital activity that occur without interactive context. Machine actors may also perform operations through APIs or service accounts, often executing large volumes of requests (e.g., hundreds of digital events, etc.) within a narrow time window (e.g., 5 minutes, etc.).

In one or more embodiments, in response to constructing a respective individual session object, the system or service implementing method 200 may function to assess the distinct set of digital events associated with the respective individual session object and detect, based on the assessment, that the respective individual session object corresponds to an application programming interface-type session when metadata included in the distinct set of digital events of the respective individual session object indicates that access to a respective computing environment of the respective individual session object was obtained using an application programming interface (API) key or a console-type session when the distinct set of digital events of the respective individual session object is indicative of a human user using one or more graphical user interfaces of the respective computing environment of the respective individual session object to perform the distinct set of digital events associated with the respective individual session object. Accordingly, in such an embodiment, the system or service implementing method 200 may function to attribute an API session label to the respective individual session object when the respective individual session object is detected to be the application programming interface-type session or a console session label to the respective individual session object when the respective individual session object is detected to be the console-type session.

Session User Interface

In one or more embodiments, S220 may function to implement a session user interface (e.g., session information graphical user interface or the like) that may in turn surface digital event data and/or session properties of constructed sessions to one or more users, as shown by way of example in FIGS. 3-12. In such embodiments, the session user interface may enable a user to view or access data associated with a target, user-selected session. Additionally, in some embodiments, the session user interface may enable a user (or subscriber) to access digital event data and/or session properties of one or more constructed sessions (e.g., via a user query and/or user selection of one or more constructed sessions). In various embodiments, the session user interface may be implemented as a graphical user interface (GUI).

In some embodiments, as illustrated by way of example in FIG. 3, the session user interface may include a session summary surfacing region that may function to surface or display one or more summary session properties of a target session including, but not limited to, the session start timestamp, the session end timestamp, the session duration, the session environment, the session impact score, the session suspicion score, and/or any other suitable properties for summarizing a target session. Additionally, in some such examples, the session summary surfacing region may include a count of the number of digital events of the target session, and/or a count of the number of digital events of the target session that may be associated with one or more distinct event categories.

In some embodiments, as illustrated by way of example in FIG. 3, the session user interface may include a session impact and suspicion surfacing region that may function to surface or display one or more impact and suspicion session properties of a target session including, but not limited to, the session impact score of the target session and the session suspicion score of the target session. In some embodiments, S220 may function to compute the session impact score and/or the session suspicion score of a constructed session based on one or more impact factors and/or one or more suspicion factors respectively. In some embodiments, the impact factors and/or suspicion factors may include the one or more digital events of the constructed session, and/or the one or more session properties of the constructed session. Additionally, session properties may also be linked to data and/or insights (e.g., impact factors, suspicion factors, and/or the like) from external systems, such as databases or monitoring tools, providing context on whether the actor has previously exhibited suspicious conditions or behaviors. For example, the session impact and suspicion surfacing region may indicate if an actor associated with the session has a history of suspicious activity or abnormal behavioral patterns as identified by an external security platform. Integrating historical actor data from external systems may allow for more informed assessments, enhancing the reliability of impact and suspicion evaluations. In some such embodiments, S220 may function to associate each impact factor and/or each suspicion factor with an impact score or suspicion score, respectively. In some such embodiments, the session impact and suspicion surfacing region may additionally or alternatively include the one or more impact and suspicion factors (e.g., digital event identifiers, session properties, and/or the like), and/or the impact score or suspicion score associated with each impact factor or suspicion factor, respectively.

In some embodiments, as illustrated by way of example in FIG. 3, the session user interface may include a session credential surfacing region that may function to surface or display one or more session credential properties of a target session including, but not limited to, an access key for the target session, an access key age of an access key for the target session, an access key validity for the target session, an access key generation date for the target session, and/or any other credential properties of the target session.

In some embodiments, as illustrated by way of example in FIG. 3, the session user interface may include a session actor identity surfacing region that may function to surface or display one or more session actor identification properties of a target session including, but not limited to, one or more session actor identity properties of the session actor for the target session (e.g., actor username, actor role or title, last activity date, and/or any other suitable session actor identity properties or details). Additionally, in some embodiments, the session actor identity surfacing region may function to surface or display an activity state of the target session (e.g., active or inactive) and/or a session potential impact category of the target session.

In some embodiments, the session user interface may include a session IP access surfacing region that may function to surface or display one or more session properties of a target session including, but not limited to, an IP address of the session actor, a geolocation of the session actor, an ASN of the session actor, a client identifier, a session platform identifier, multi-factor authentication status, session actor activity timestamps, and/or any other suitable session property associated with the IP address and/or the location of the session actor for the target session.

Figure 4:
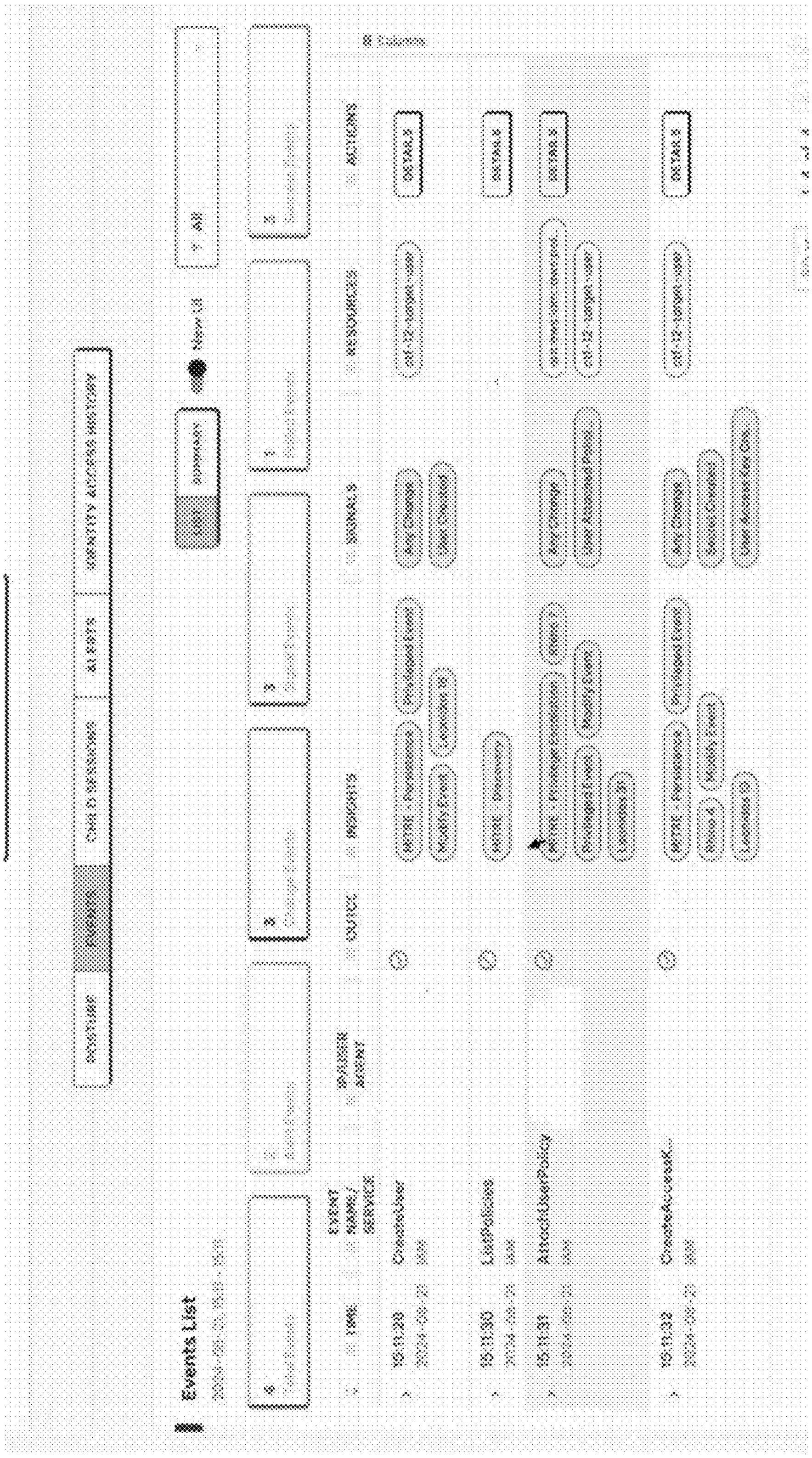

In some embodiments, as illustrated by way of example in FIG. 4, the session user interface may include a digital event category surfacing region that may function to surface or display the number of digital events of a target, user-selected session associated with one or more distinct digital event categories. In such embodiments, the digital event category surfacing region may include, for each digital event category, a digital event category label a corresponding digital event category number. In such embodiments, the digital event category label may comprise a name and/or description of the digital event category, and the digital event category number may identify the number of digital events of the target session that may be categorized in the corresponding digital event category. The one or more distinct digital event categories may include, but are not limited to, a total events category (e.g., all digital events of the target session), an alert events category (e.g., alert-type digital events of the target session), a change events category (e.g., change-type digital events of the target session), a signal events category (e.g., signal-type digital events of the target session), a failed events category (e.g., digital events of the target session that failed to execute or complete), a success events category (e.g., digital events of the target session that successfully executed or completed), and/or any other suitable category for classifying a digital event.

Figure 5:
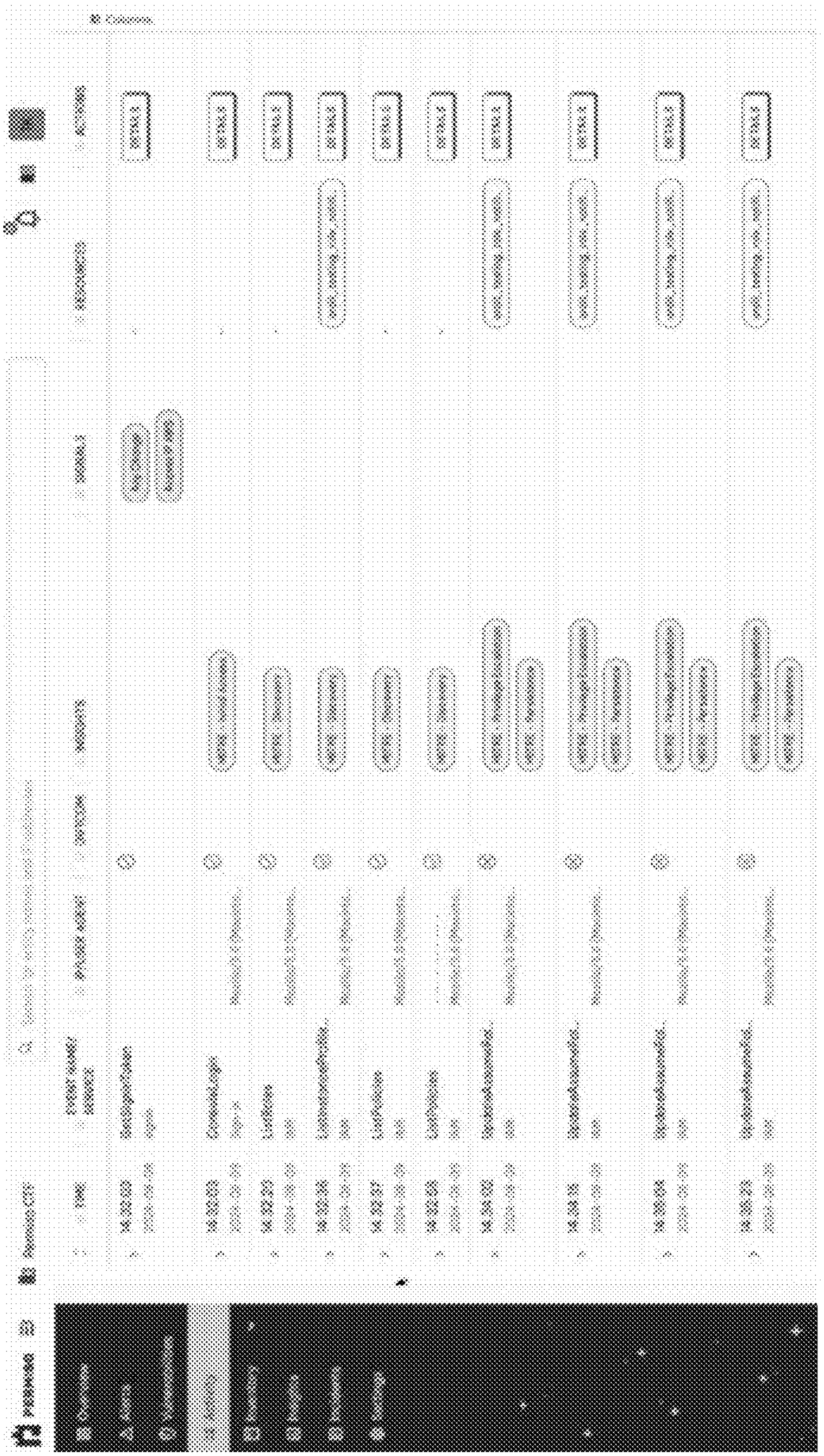
Figure 6:
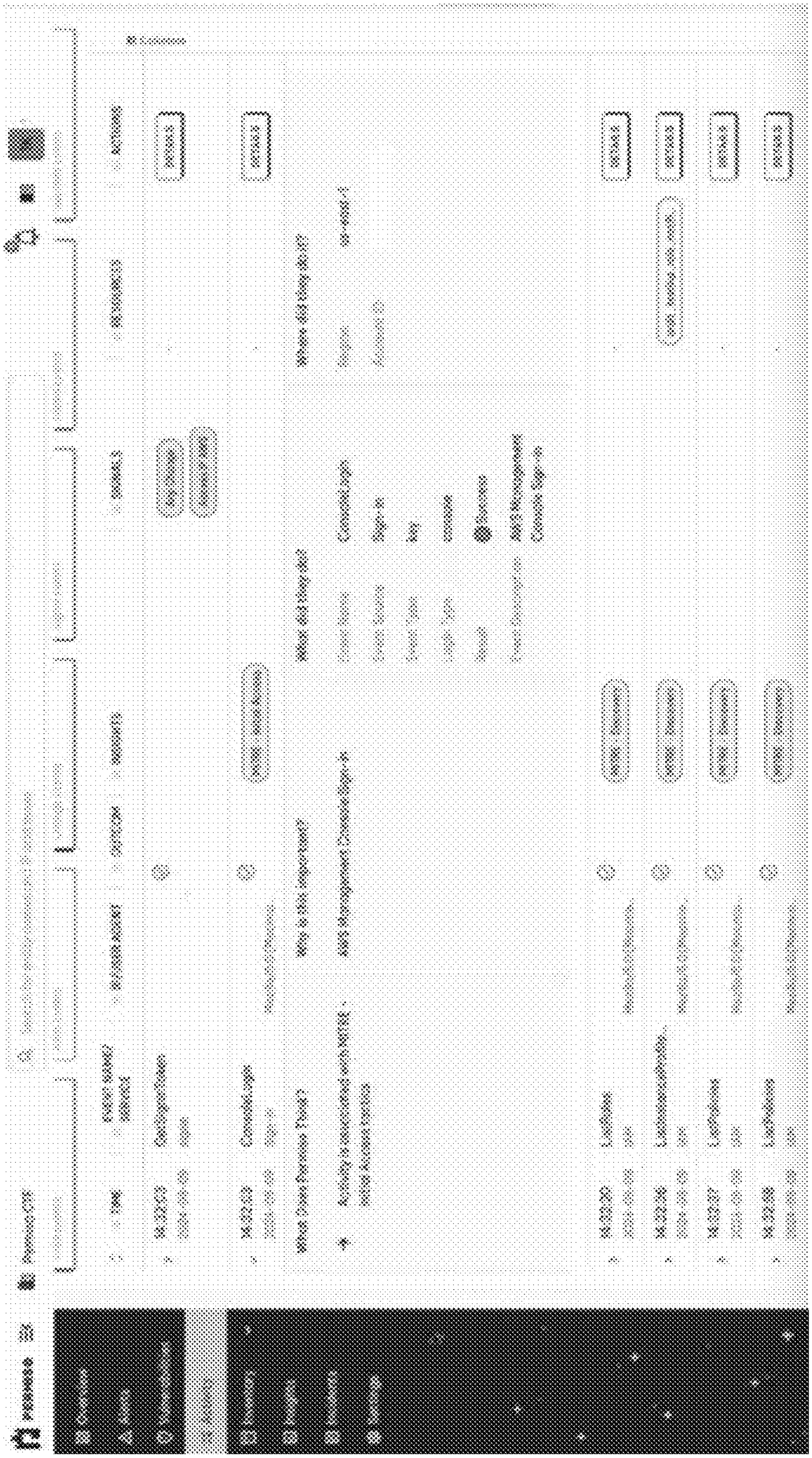

In some preferred embodiments, as illustrated by way of example in FIGS. 4-6, the session user interface may additionally, or alternatively, include a digital event table (sometimes referred to as a digital event list) to display or surface, to a user of the session user interface, a list of the one or more digital events of a target user-selected session. In such embodiments, the digital event table may comprise a table header and one or more rows, wherein each row may correspond to a distinct digital event of the target session. In such embodiments, the digital event table may comprise one or more columns corresponding to one or more properties or features of the one or more digital events of the target session extracted and/or derived from the digital event data associated with each of the one or more digital events of the target session. In various embodiments, the one or more columns of the digital event table may include, but are not limited to, a digital event timestamp column, a digital event name and/or digital event service column, an IP address and/or user agent column, a digital event outcome column (e.g., success or failure), a digital event insights column, a digital event signals column, a digital event resources column, and/or any other suitable column for displaying one or more features or properties of a digital event. In one or more embodiments, each cell of the digital event table may include a value (e.g., a text value, a numerical value, and/or any other suitable value format or combination thereof) for the corresponding row of the cell (i.e., the corresponding digital event that the row may represent) associated with the digital event property or feature of the corresponding column of the cell.

Figure 7:
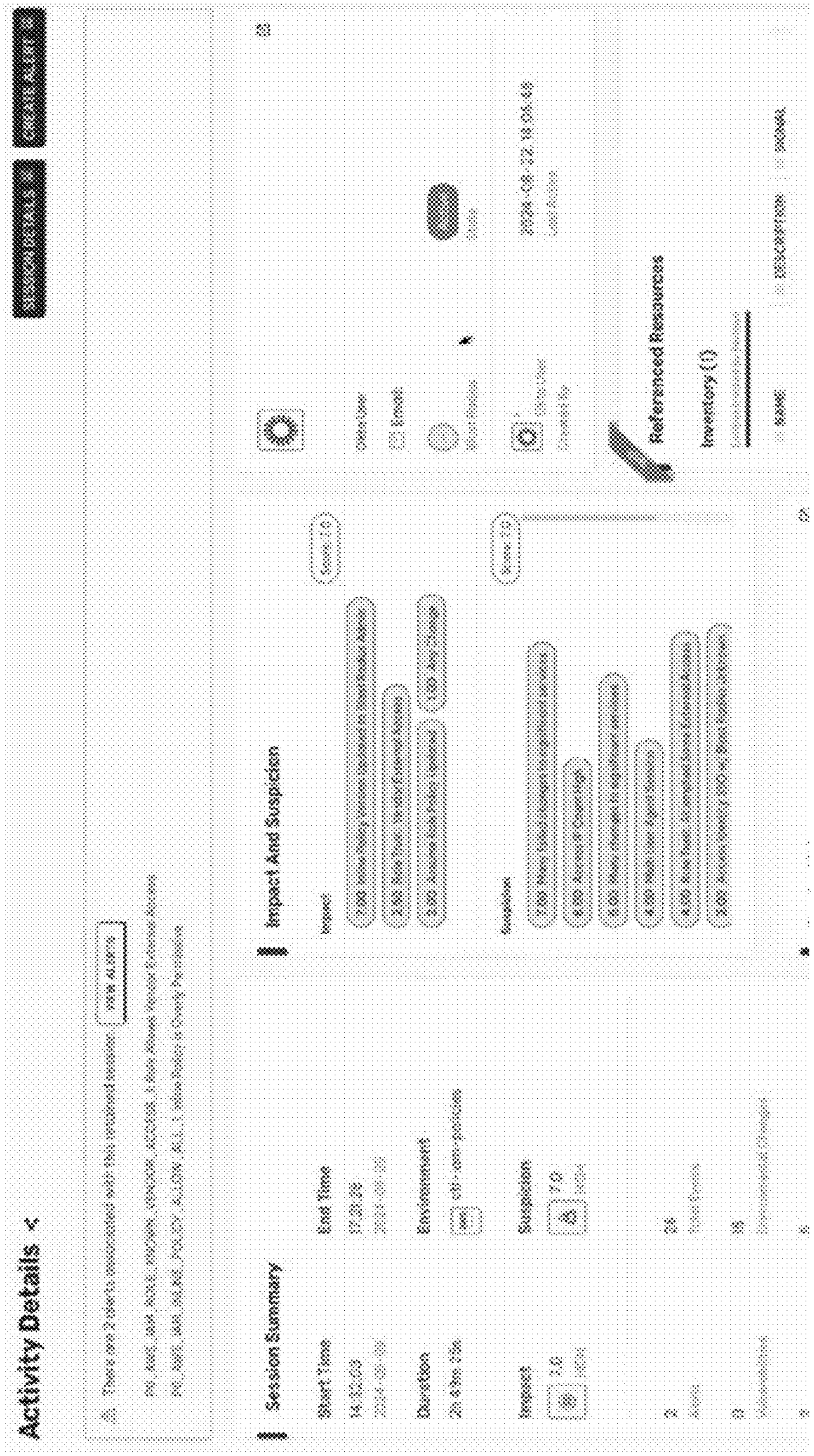
Figure 8:

In some embodiments, as illustrated by way of example in FIGS. 7 and 8, the session user interface may additionally include a session alert surfacing region that may function to display or surface one or more alerts associated with a target session. The term "session alert," as generally used herein, may refer to a notification, warning, and/or other communication intended to inform a user of the session user interface about one or more digital events of the target session and/or one or more session properties of the target session. In such embodiments, the alert surfacing region may include an alert label and/or an alert identifier for each session alert, as well as one or more pieces of alert-descriptive text (e.g., contextual text that describes each session alert).

Stated another way, the system or service implementing method 200 may function to generate a session information graphical user interface based on a target individual session object. In such an embodiment, a single actor may have used a distinct digital account associated with the target individual session object to perform the distinct set of digital events included in the target individual session object. Accordingly, the system or service implementing method 200 may function to display the session information graphical user interface to the subscribing entity to which the target individual session object corresponds.

In one or more embodiments, a first portion of the session information graphical user interface may include at least a session start time of the target individual session object, a session end time of the target individual session object, a session time duration of the target individual session object, and identity and access data associated with the single actor. The session information graphical user interface may further include a second portion that includes an interactive data table that includes a plurality of distinct interactive data rows, wherein each distinct interactive data row of the plurality of distinct interactive data rows corresponds to a respective digital event of the distinct set of digital events included in the target individual session object, and further includes a distinct column describing an event name of the respective digital event.

Figure 19:
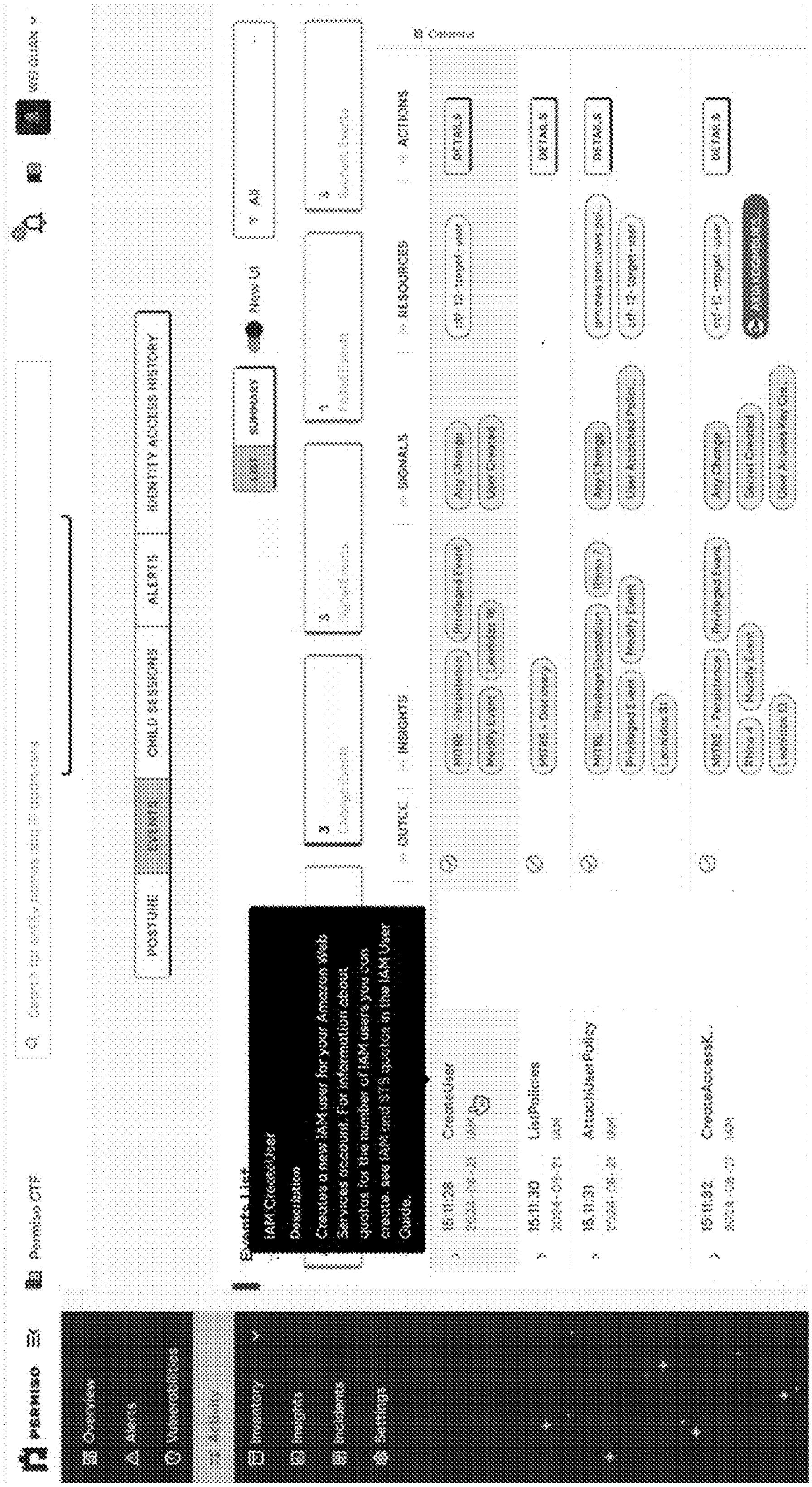

In one or more embodiments, the system or service implementing method 200 may function to detect an input from the subscribing entity hovering over the event name of a target interactive data row of the plurality of distinct interactive data rows and, in response to detecting the input from the subscribing entity, the system or service implementing method 200 may function to display a digital event explainability user interface object in association with the target interactive data row, as shown generally by way of example in FIG. 19. The digital event explainability user interface object, in such an embodiment, may include one or more text strings providing a natural-language explanation of the respective digital event corresponding to the target interactive data row. Additionally, or alternatively, in such an embodiment, the digital event explainability user interface object may include one or more hyperlinks that, when selected, automatically navigates to an internal or external link providing additional contextual information related to the respective digital event. It shall be recognized that, in some embodiments, the session information graphical user interface may include the cross-environment session artifact described herein.

Activity Overview Interface

In some embodiments, as shown by way of example in FIGS. 9-12, the session user interface may include an activity overview interface. In some such embodiments, as illustrated in by way of example in FIG. 10, the activity overview interface may enable one or more users to selectively display one or more sessions based on one or more user-selected activity filters. In various embodiments, the one or more activity filters may include, but are not limited to, an environment filter (e.g., a distinct platform environment or computing environment), an identity filter (e.g., a distinct actor identity), an identity type filter (e.g., a distinct actor identity type, such as a "web identity" type), an identity category (e.g., a "human" or "machine" identity category), a credential filter, a credential type filter, a secret identity, a secret type, a computing or cloud service category, and/or any other suitable type of activity filter. Additionally, or alternatively, in some embodiments, the activity overview interface may include one or more activity filters that may each correspond to a distinct session property (e.g., a session property of the session properties discussed herein), such that a user may filter the surfaced or displayed sessions based on one or more user-selected session property activity filters (e.g., the IP address of a session, the impact score of a session, and/or any other session property).

Figure 11:
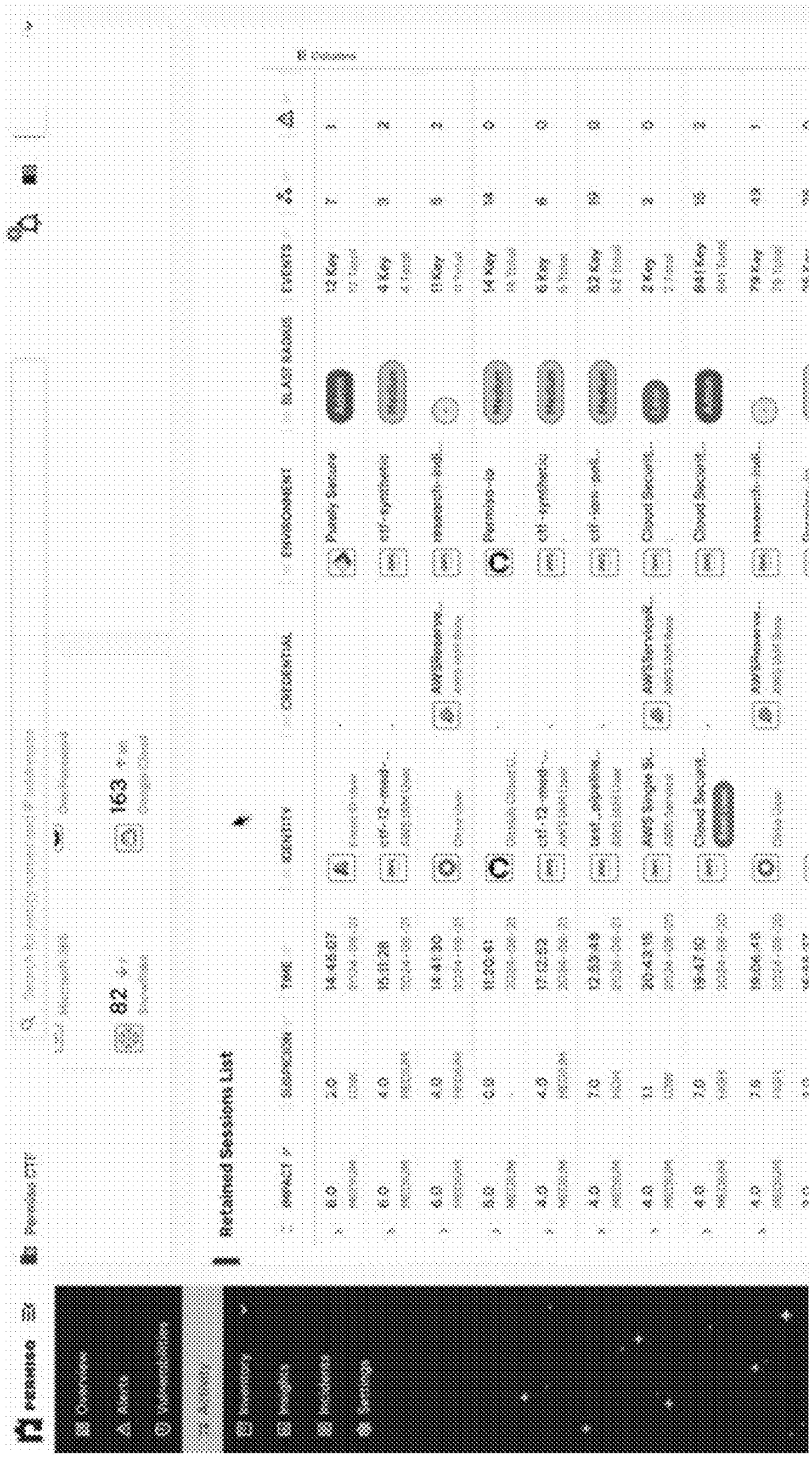
Figure 12:
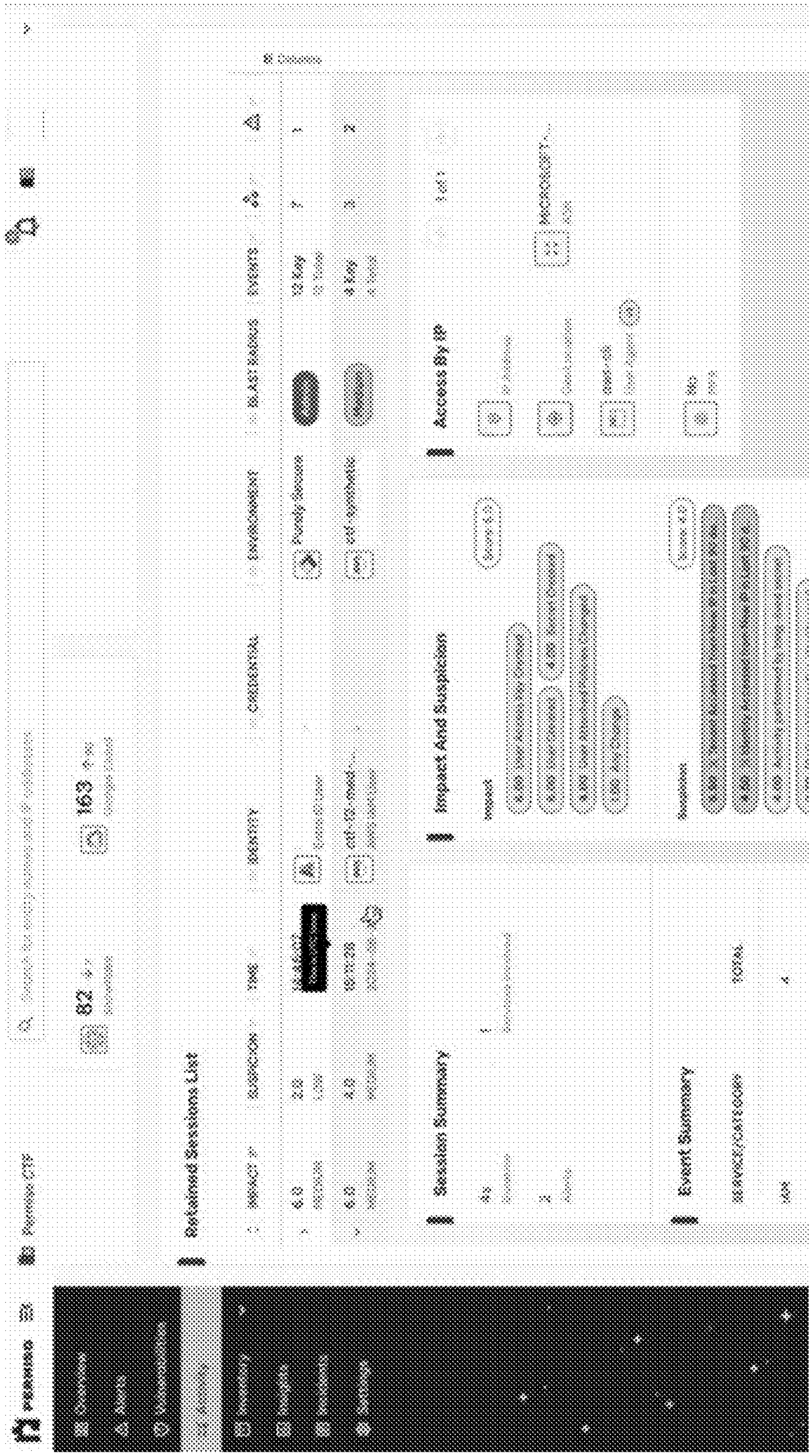

In one or more embodiments, as illustrated by way of example in FIGS. 11 and 12, the activity overview interface may function to display or output a list of user-selected sessions based on one or more user-selected activity filters and/or one or more user queries. In such embodiments, the activity overview interface may include a session table comprising a session table header and one or more rows, wherein each row may correspond to a distinct session according to the selected activity filters and/or the one or more user queries. In such embodiments, the session table may comprise one or more columns corresponding to one or more session properties of the displayed sessions including, but not limited to, a session impact score column, a session suspicion score column, a session timestamp column, a session duration column, a session actor identity column, a session credential property column, a session environment column, a session potential impact category column, a session event count column, and/or any other suitable column based on a session property. In one or more embodiments, each cell of the session table may include the session property for the corresponding row of the cell (i.e., the corresponding session that the row may represent) associated with the session property of the corresponding column of the cell.

Figure 9:
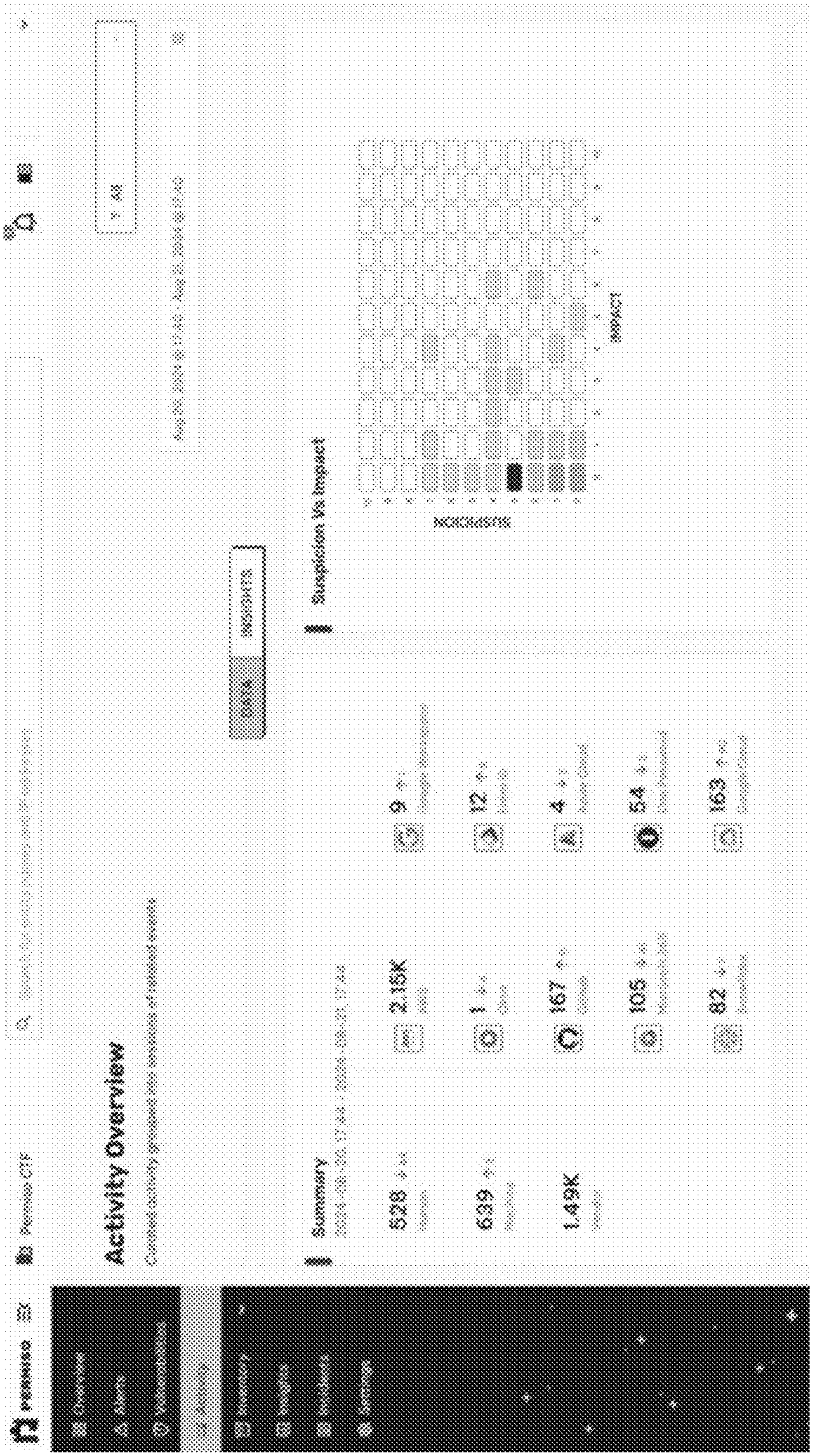
FIGS. 9-12 illustrate an exemplary activity overview user interface in accordance with one or more embodiments of the present application.
Figure 10:
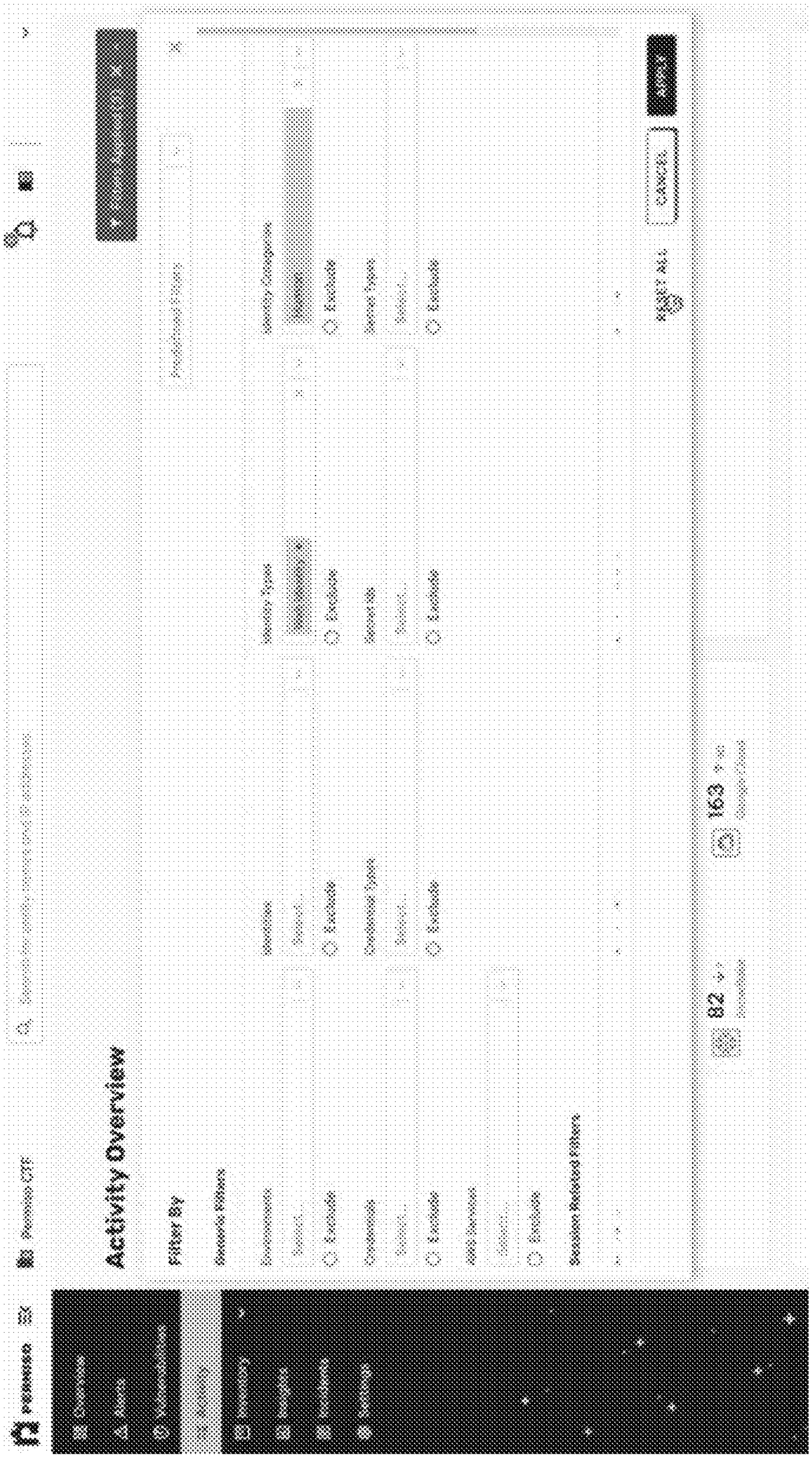

In one or more embodiments, the activity overview interface may additionally or alternatively include an activity summary interface object, as shown by way of example in FIG. 9. In such embodiments, the activity summary interface object may function to display or surface a summarization of the one or more user-selected sessions based on the one or more user-selected activity filters and/or one or more user queries. In various embodiments, the activity summary interface object may function to display a count or quantity of the one or more user-selected sessions according to various session properties. As a non-limiting example, the activity summary interface object may function to display one or more session counts according to identity category. In such an example, the activity summary interface object may display a number X corresponding to the quantity X of the user-selected sessions that may be human category sessions, a number Y corresponding to the quantity Y of the user-selected sessions that may be machine category sessions, and a number Z corresponding to the quantity Z of the user-selected sessions may be vendor category sessions). Additionally, or alternatively, the activity summary interface object may similarly function to display one or more session counts according to session platform (e.g., counts of how many user-selected sessions are associated with each distinct session platform), and/or session counts according to any other suitable session property.

In one or more embodiments, the activity overview interface may additionally or alternatively include an activity suspicion and impact interface object that may function to display a mapping of the user-selected sessions based on session suspicion score and session impact score, as shown by way of example in FIG. 9. As a non-limiting example, the activity suspicion and impact interface object may comprise a heatmap (or the like) that may include an x-axis for session impact scores and a y-axis for session suspicion score. In such an example, the heatmap may include a map or grid of shaded shapes, each shaded shape corresponding to a unique combination of a session impact score value and a session suspicion score value. In such an example, the shade of each shaded shape on the heatmap may correspond to the quantity of user-selected sessions that have the corresponding unique combination of session impact score and session suspicion score (e.g., darker-shaded shapes may correspond to a higher quantity of user-selected sessions with the corresponding unique combination of scores). Accordingly, in such an example, a user may easily identify patterns, trends, and outliers of the user-selected sessions according to session impact score and session suspicion score. It shall be noted that the above example is non-limiting, and the activity suspicion and impact interface object may comprise an alternative visualization object suitable for mapping session suspicion scores and session impact scores of user-selected sessions.

2.30 Configuring One or More Session Correlations Between Constructed Sessions S230, which includes configuring one or more session correlations between constructed sessions, may function to configure one or more session correlations that may link related sessions for a distinct session actor. A session correlation, as used herein, may refer to a link between two related sessions. In some preferred embodiments, a session correlation may comprise a directional link between two sessions of a distinct session actor. In such embodiments, the direction of the session correlation may relate to a chronological order of the two linked sessions. It shall be recognized the phrase "session correlation" may be interchangeably referred to herein as a "session correlation link" or the like.

In some embodiments, S230 may function to identify and establish session correlations between sessions that share a common actor or entity across multiple digital events (e.g., a common session actor). In such embodiments, the session correlations may enable recognition of related digital activity that may span different sessions and may thereby provide a more comprehensive view of the actor's (or entity's) actions over time. In one or more embodiments, session correlations may be identified based on various criteria, such as the session actor's identity or account, the sequence (e.g., chronological sequence) of digital events, and/or the resources or services utilized. Additional criteria may include metadata associated with each event, such as an eventID (e.g., event identifier) or a sessionID (e.g., session identifier) assigned by a cloud service provider (distinct from the sessionID computed by system 100), as well as hardware information related to the actor, or the IP address from which the actor's network data originates. By using multiple criteria for correlation, S230 may identify patterns across sessions, even when sessions occur on different platforms or involve diverse resources, thus accurately reflecting the overarching workflow of the actor. As a non-limiting example, if a user logs into an IAM provider, initiates an action on a cloud service provider, and later accesses a different account on the same cloud service provider, S230 may function to establish session correlations between these sessions to reflect the overarching workflow performed by the user (actor). In another non-limiting example, S230 may detect that an actor authenticates through a first distinct cloud service provider using multi-factor authentication (MFA) to obtain access credentials, uses the obtained credentials to access data or services within a second distinct cloud service provider, and subsequently performs one or more target tasks within a third distinct cloud service provider. In such an embodiment, S230 may establish correlations across the sessions originating from each distinct cloud service provider to represent the actor's complete sequence of access and actions performed across the disparate cloud environments.

In one or more embodiments, S230 may function to configure session correlations between constructed sessions based on chronological criteria. In such embodiments, S230 may function to identify related sessions that may be chronologically adjacent (i.e., one session that follows another session in a chronological sequence). In some such embodiments, this identification may be based on the session timespans, session timestamps and/or the timestamps of digital events of related sessions. In some embodiments, S230 may function to configure a session correlation between two chronologically adjacent sessions that share the same session actor. In one or more such embodiments, S230 may function to configure session correlations between two chronologically adjacent sessions with a directionality that may identify one session as the first chronological session and the other as the second chronological session.

Additionally, or alternatively, in some embodiments, S230 may function to configure session correlations between constructed sessions based on causal criteria. In such embodiments, S230 may function to determine whether a digital event in one session triggers or results in actions in another session. In some such embodiments, S230 may function to determine whether a digital event in one session triggers or results in the instantiation or formation of another session. As a non-limiting example, a user may log into an IAM provider, which may result in a session associated with the IAM provider. In such an example, the user may then utilize the IAM provider to log in to a cloud service provider, starting a separate session associated with the cloud service provider. S230 may function to identify a causal relationship between the session associated with the IAM provider and the session associated with the cloud service provider.

In one or more embodiments, the directionality of a session correlation between two sessions may identify the chronological and/or the causal relationship between the two sessions. In such embodiments, the directionality of a session correlation may point from a causal (parent) session (the chronologically preceding session) to a resultant (child) session (the chronologically subsequent session). In various embodiments, S230 may function to identify and construct one or more session correlations between each constructed session and one or more resultant sessions. In some embodiments, each constructed session may be linked to only one causal or parent session; that is, in some embodiments, S230 may function to identify only one (at most one) causal session for each constructed session. It shall be noted that, in some embodiments, each constructed session may be linked to a plurality of resultant child sessions by session correlations.

In addition to chronological and causal relationships, session correlations may also encompass layered or multi-plane relationships that extend across different dimensions of session data. In some embodiments, session correlations may identify nested layers of sessions, such as short-duration sessions lasting a few minutes (e.g., a single interaction) and extended-duration sessions spanning weeks or months (e.g., sessions linked by persistent browser cookies or weak association methods). Layered sessions offer alternative perspectives on user behavior, enabling session analysis based on different temporal scales or interaction types. Layered session tracking allows S230 to organize and correlate sessions according to various analytical lenses, accommodating scenarios where sessions are linked by factors (e.g., browser cookie data) other than strict chronology or causality.

Additionally, or alternatively, session correlations may support multi-plane tracking between related identities or entities that influence each other's actions. Multi-plane session tracking allows S230 to capture relationships between entities, such as when one entity impacts or modifies another. For example, an entity may create an access key for a second entity, which then uses the key to perform actions impacting a third entity. S230 may function to correlate sessions across interconnected entities, providing a comprehensive view of cascading relationships and actions initiated by or impacting each entity. Multi-plane tracking enables identification of complex workflows and dependencies, where session correlations reflect not only direct actions but also the extended influence of one entity on others within a digital environment.

Stated another way, in one or more embodiments, in response to constructing a plurality of individual session objects, the system or service implementing method 200 may function to generate, in real-time or near real-time, a plurality of session correlation links that selectively connect a target set of individual session objects of the plurality of individual session objects. For instance, in a non-limiting example, the system or service implementing method 200 may construct twenty individual session objects representing digital activity across twenty different computing environments but may determine, based on correlation criteria such as actor identity, temporal proximity, or causal relationships, that only a subset (e.g., two, three, four, ten, etc.) of the twenty session objects are related. In such an example, the system may generate session correlation links connecting only the subset of related session objects while leaving the remaining session objects unlinked, thereby ensuring that only relevant and contextually associated sessions are connected.

In one or more embodiments, S230 may function to compute and assign linking metadata to establish and maintain session correlations between related session objects. The linking metadata may include identifiers, timestamps, causal indicators, or other computed attributes that uniquely define the relationship between a pair or group of correlated sessions. In some embodiments, the linking metadata may include a correlation identifier (e.g., correlationID) representing a persistent linkage record that maps one or more source (parent) sessions to one or more destination (child) sessions. Each correlation identifier may be stored in association with the linked session objects, allowing the system to reconstruct the linkage structure and the directional flow of activity between related sessions.

In some embodiments, the linking metadata may be appended to or stored alongside the corresponding session objects within a session data repository, enabling bidirectional traceability between correlated sessions. For example, each session object may include one or more correlation fields indicating parent and child session identifiers, correlation confidence scores, and the type of relationship (e.g., chronological, causal, or contextual). This approach allows the system to persist correlation context directly within the session data itself, eliminating the need for an external relational mapping process and allowing for faster traversal and querying of linked sessions in real time.

As a non-limiting example, if a system constructs twenty session objects from distinct data sources and determines that four sessions share common actor identifiers and related event timestamps, S230 may generate four sets of linking metadata records that associate those sessions through shared correlation identifiers. The linking metadata may then be stored within each of the four session objects, allowing subsequent processes—such as attribution, explainability visualization, or threat analysis—to efficiently access and reconstruct the relationship between the correlated sessions.

Stated another way, S230 may function to generate and store linking metadata that structurally defines the relationships between correlated session objects. In some embodiments, the linking metadata may include structured data fields appended to each session object, enabling the system to represent directional or non-directional associations between sessions in a standardized and queryable format. By embedding the linking metadata directly within the session data, the system maintains persistent traceability across correlated sessions, allowing downstream components to efficiently traverse and reconstruct multi-session relationships without relying on external mapping or lookup processes.

Additionally, or alternatively, in a non-limiting example, S230 may function to generate a session correlation link that graphically, programmatically, or otherwise digitally connects or digitally links a first distinct session object to a second distinct session object based on the system or service implementing method 200 detecting that the first distinct session object and the second distinct session object have the same (e.g., equivalent) session label. A session label, in some embodiments, may refer to a data value or data construct generated from one or more pieces of session-related metadata (e.g., environment identifier, device identifier, user identifier, previous session identifier, etc.) included in a respective session object.

For instance, in such a non-limiting example, in response to detecting that the metadata associated with the distinct set of digital events included in the first distinct session object and the metadata associated with the distinct set of digital events included in the second distinct session object share the same environment identifier (e.g., compute environment identifier or the like), S230 may function generate a session correlation link that links or connects the first distinct session object to the second distinct session object. An environment identifier, in some embodiments, may refer to a data value that uniquely identifies a particular computing environment, web server, web-based software-as-a solution (SaaS) application, or a computer workstation.

Additionally, or alternatively, in such a non-limiting example, in response to detecting that the metadata associated with the distinct set of digital events included in the first distinct session object and the metadata associated with the distinct set of digital events included in the second distinct session object share the same device identifier, S230 may function generate a session correlation link that links or connects the first distinct session object to the second distinct session object. A device identifier, in some embodiments, may refer to a data value that uniquely identifies a particular computing device, hardware device, virtual machine, mobile device, network appliance, or other physical or virtual device from which the corresponding set of digital events included in a respective session object occurred.

Additionally, or alternatively, in such a non-limiting example, in response to detecting that the metadata associated with the distinct set of digital events included in the first distinct session object and the metadata associated with the distinct set of digital events included in the second distinct session object share the same user identifier (e.g., same username, same user identifier (ID), same alias, etc.), S230 may function generate a session correlation link that links or connects the first distinct session object to the second distinct session object. A user identifier, in some embodiments, may refer to a data value that uniquely identifies a particular user, user account, login identity, or the like that performed the distinct set of digital events included in a respective session object.

Additionally, or alternatively, in such a non-limiting example, in response to detecting that the metadata associated with the distinct set of digital events included in the first distinct session object and the metadata associated with the distinct set of digital events included in the second distinct session object share the same previous session identifier (e.g., a prior session identifier attributed by an external system, service, or computing environment), S230 may function to generate a session correlation link that links or connects the first distinct session object to the second distinct session object. A previous session identifier, in some embodiments, may refer to a data value that identifies an earlier or predecessor session identifier attributed by an external service, system, or platform from which the distinct set of digital events included in a respective session object originated.

Additionally, or alternatively, in one or more embodiments, S230 may function to generate a respective session correlation link that connects a first distinct individual session object to a second distinct individual session object based on detecting that a same root actor (e.g., a single human actor or a single machine actor) transitioned from one nominal account to another nominal account to perform the distinct set of digital events (e.g., digital actions) included in the first distinct individual session object and the second distinct individual session object. In other words, the system or service implementing method 200 may function to detect that the same root actor was operating across multiple nominal user accounts when performing the distinct set of digital events (e.g., digital actions or the like) included in the first distinct individual session object and the second distinct individual session object.

For instance, in a non-limiting example, the distinct set of digital events included in the first distinct individual session object was performed by a first distinct digital account or a first distinct user account (e.g., andrew@permiso.io), while the distinct set of digital events included in the second distinct individual session object was performed by a second distinct digital account or a second distinct user account (e.g., thomas@permiso.io). It shall be recognized that the first distinct digital account or the first distinct user account (e.g., andrew@permiso.io) may be controlled or primarily used by a first distinct user (e.g., "Andrew"), while the second distinct digital account or the second distinct user account (e.g., thomas@permiso.io) may be controlled or primarily used by a second distinct user (e.g., "Thomas"). Accordingly, in such a non-limiting example, the system or service implementing method 200 may detect that the same root actor (e.g., "Andrew") used multiple nominal user accounts (e.g., andrew@permiso.io and thomas@permiso.io) to perform the distinct set of digital events (or digital actions) associated with the first distinct individual session object and the second distinct individual session object based on detecting one or more of (i) that the same internet protocol address value is present in the first distinct individual session object and the second distinct individual session object, (ii) that a shared password, group password, or team password was used to log in to the second distinct user account (e.g., second distinct digital account or the like), and (iii) at least one historical act of the first distinct user (e.g., "Andrew") managing (e.g., administrating, controlling, setting, handling, etc.) the password of the second distinct user account on Thomas's behalf.

In other words, the system or service implementing method 200 may determine that a single root actor was responsible for digital activity performed across both nominal user accounts despite the accounts belonging to different users. Stated another way, the system or service implementing method 200 may determine that "Andrew" was the root actor acting through both the andrew@permiso.io account and the thomas@permiso.io account.

2.40 Constructing One or More Attribution Chains Based on the One or More Session Correlations S240, which includes constructing one or more attribution chains based on the one or more session correlations, may function to construct one or more attribution chains, each attribution chain comprising one or more sessions that may be linked by session correlations to a distinct target session. An attribution chain (sometimes referred to herein as an "access chain" or "cross-environment session artifact"), as used herein, may refer to a graphical or data structure comprising a set of one or more sessions of a distinct session actor that may represent a sequence of digital activity of the distinct session actor across the set of one or more sessions. In one or more embodiments, S240 may function to attribute an actor identity to each session in a constructed attribution chain based on the identity of the session actor in one or more sessions of the constructed attribution chain.

In some preferred embodiments, S240 may function to construct an attribution chain by grouping multiple sessions that are linked through one or more session correlations, thereby representing a continuous or logically connected sequence of activities performed by a distinct session actor. In such embodiments, these attribution chains may provide a comprehensive view of a distinct session actor's activity across different sessions, services, and/or accounts. In some embodiments, S240 may aggregate all sessions involving a specific session actor within a specific period of time into a single attribution chain.

In one or more embodiments, the system or service implementing method 200 may function to generate, using the target set of individual session objects and the plurality of session correlation links, a cross-environment session artifact that graphically illustrates a directional access sequence associated with the target set of individual session objects. A directional access sequence, in some embodiments, may represent the ordered progression of an actor's activity across multiple computing environments, showing how access begins in one environment and propagates through subsequent environments. In some such embodiments, each node of the directional access sequence may correspond to an individual session object, while each connecting edge may represent a session correlation link that defines the chronological or causal relationship between sessions. The resulting cross-environment session artifact may provide a visual and programmatic representation of the actor's end-to-end access path across disparate systems and environments, allowing the subscribing entity to trace the flow of digital activity associated with the root actor in real-time or near real-time.

Accordingly, in one or more embodiments, the system or service implementing method 200 may function to detect the root actor responsible for the distinct set of digital events performed across the target set of individual session objects included or represented in the cross-environment session artifact. In some embodiments, the system may identify the root actor by analyzing the directional access sequence and determining the originating session from which subsequent correlated sessions were derived. The originating session may be identified based on one or more criteria, such as being the first chronological session in the sequence, the causal parent of other linked sessions, or the session that generated or distributed the credentials or tokens used in downstream sessions.

Stated another way, in some embodiments, the system may identify the root actor by analyzing the directional access sequence and determining which session represents the starting point of activity. In such an embodiment, the root actor may be identified as the entity associated with the first session in the sequence.

In one or more embodiments, the system or service implementing method 200 may function to generate a first session correlation link of the plurality of session correlation links that connects a first individual session object of the plurality of individual session objects to a second individual session object of the plurality of individual session objects based on detecting a chronological relationship between the first individual session object and the second individual session object. The chronological relationship may have been detected based on identifying that an amount of time elapsed (e.g., thirty seconds, etc.) between a session end time of the first individual session object and a session start time of the second individual session object is less than a predetermined elapsed-time threshold (e.g., three minutes, etc.).

Additionally, or alternatively, in one or more embodiments, the system or service implementing method 200 may function to generate a second session correlation link of the plurality of session correlation links that connects the second individual session object to a third individual session object of the plurality of individual session objects based on detecting a causal relationship between the second individual session object and the third individual session object. The causal relationship may have been detected based on identifying that at least one digital event of the distinct set of digital events included in the second individual session object triggered or enabled the distinct set of digital events included in the third individual session object. In other words, the system may determine that an operation (e.g., digital event) represented in the second session—such as an administrator granting temporary access credentials—resulted in a subsequent data retrieval or configuration change represented in the third session using those credentials, thereby establishing a causal link between the sessions that reflects the flow of access and actions across environments.

Alternatively, in one or more embodiments, the system or service implementing method 200 may function to generate a first subject session correlation link of the plurality of session correlation links that connects a first individual session object of the plurality of individual session objects to a second individual session object of the plurality of individual session objects based on detecting the first individual session object and the second individual session object share at least a common internet protocol address. In such an embodiment, the system or service implementing method 200 may function to further generate a second subject session correlation link of the plurality of session correlation links that connects a third individual session object of the plurality of individual session objects to a fourth individual session object of the plurality of individual session objects based on detecting the third individual session object and the fourth individual session object share at least a common hardware device identifier. Additionally, in such an embodiment, the system or service implementing method 200 may function to further generate a third subject session link of the plurality of session correlation links that connects a fifth individual session object of the plurality of individual session objects to a sixth individual session object of the plurality of individual session objects based on Hypertext Transfer Protocol (HTTP) cookie data.

It shall be recognized that, in such an embodiment, the system or service implementing method 200 may have detected that the fifth and sixth session objects share one or more matching HTTP cookie values—such as a session cookie, authentication token, or tracking identifier—associated with a common browser or client context. The shared cookie data may indicate that both sessions originated from the same authenticated browser session or client application, allowing the system to correlate the session objects even if they occurred at different times or in different computing environments. This enables detection of persistent or continuous user activity that spans multiple session objects linked through shared browser state information.

Attribution Chain Structure

In one or more embodiments, S240 may function to construct an attribution chain for a target constructed session based on one or more (or any) session correlations linking the target constructed session to other constructed sessions with a common session actor. Preferably, the attribution chain of a target session may represent a continuous trail of a session actor through one or more sessions to the target session. In some embodiments, the target constructed session may be selected by a user of a system implementing method 200 (e.g., a user of system 100).

Preferably, each attribution chain may comprise a one-dimensional, directional sequence of constructed sessions and session correlations. In some preferred embodiments, the attribution chain for a target session may comprise at least the target session. In such embodiments, S240 may function to initially populate the attribution chain with the target session. In turn, S240 may function to determine whether the target session is linked to a causal parent session via a session correlation. If a causal parent session exists for the target session, S240 may function to append the causal parent session and the session correlation to the attribution chain. S240 may then function to determine whether the causal parent session itself has a causal parent session linked via a session correlation, and S240 may in turn add the parent session of the parent session of the target session, as well as the corresponding session correlation, to the attribution chain of the target session.

A one-dimensional attribution chain, in one or more embodiments, may refer to a linear and unbranched sequence of session correlations that establish a singular directional path of causality and/or access flow between individual sessions objects. In other words, each session object within the attribution chain is linked to at most one causal parent session object and one resultant child session object, forming a straight-line progression of digital activity that represents how a single actor's actions propagate through successive computing environments or digital accounts over time. Such a one-dimensional structure enables the system or service implementing method 200 to trace and visualize the origin and propagation of digital activity from an initial access point to subsequent dependent sessions without the complexity of multi-branch or parallel relationships.

In such a way, S240 may continue to add causal parent sessions and session correlations to the attribution chain until a root session is reached. The term "root session," as generally used herein, may refer to a constructed session in an attribution chain that does not have a causal parent session. In some embodiments, the root session may represent an initial access point or origin session for the activity of the session actor of the target session, from which all subsequent sessions of the session actor may be traced in the attribution chain. It shall be noted that, if the target session does not have a causal parent session, the attribution chain of the target session may only comprise the target session. In such an example, the target session may also be the root session.

Actor Identity Attribution

In one or more embodiments, S240 may function to attribute a consistent distinct actor identity to each session within an attribution chain. In some such embodiments, S240 may function to attribute the actor identity (e.g., root actor) of the root session of the attribution chain to every other session in the same attribution chain. Therefore, S240 may function to identify a consistent actor (e.g., root actor) or entity for all sessions in a distinct attribution chain, even if the sessions occur on different platforms or involve different accounts.

In some embodiments, S240 may function to determine an actor identity for an attribution chain based on session correlations, session properties, and/or digital event data of each session in the attribution chain, such as IP addresses, access credentials, usernames, account names, and/or any other suitable data for determining actor identity.

As a non-limiting example, if a user first logs into Okta and then accesses Amazon Web Services (AWS) using their Okta credentials, S220 may function to construct an Okta session (e.g., the root session) and an AWS session for the user. In turn, S230 may function to construct a session correlation between the Okta session and the AWS session. In such an example, S240 may function to link these sessions into a single attribution chain based on the constructed session correlation, with the AWS session as the target session. In such an example, S240 may function to identify the Okta session as a root session of the attribution chain. In turn, S240 may then function to attribute the actor identity for the Okta session (root session) to the AWS session. As such, the attribution chain may enable actor identity and access traceback across multiple sessions.

Attribution Chain User Interface

Figure 13:
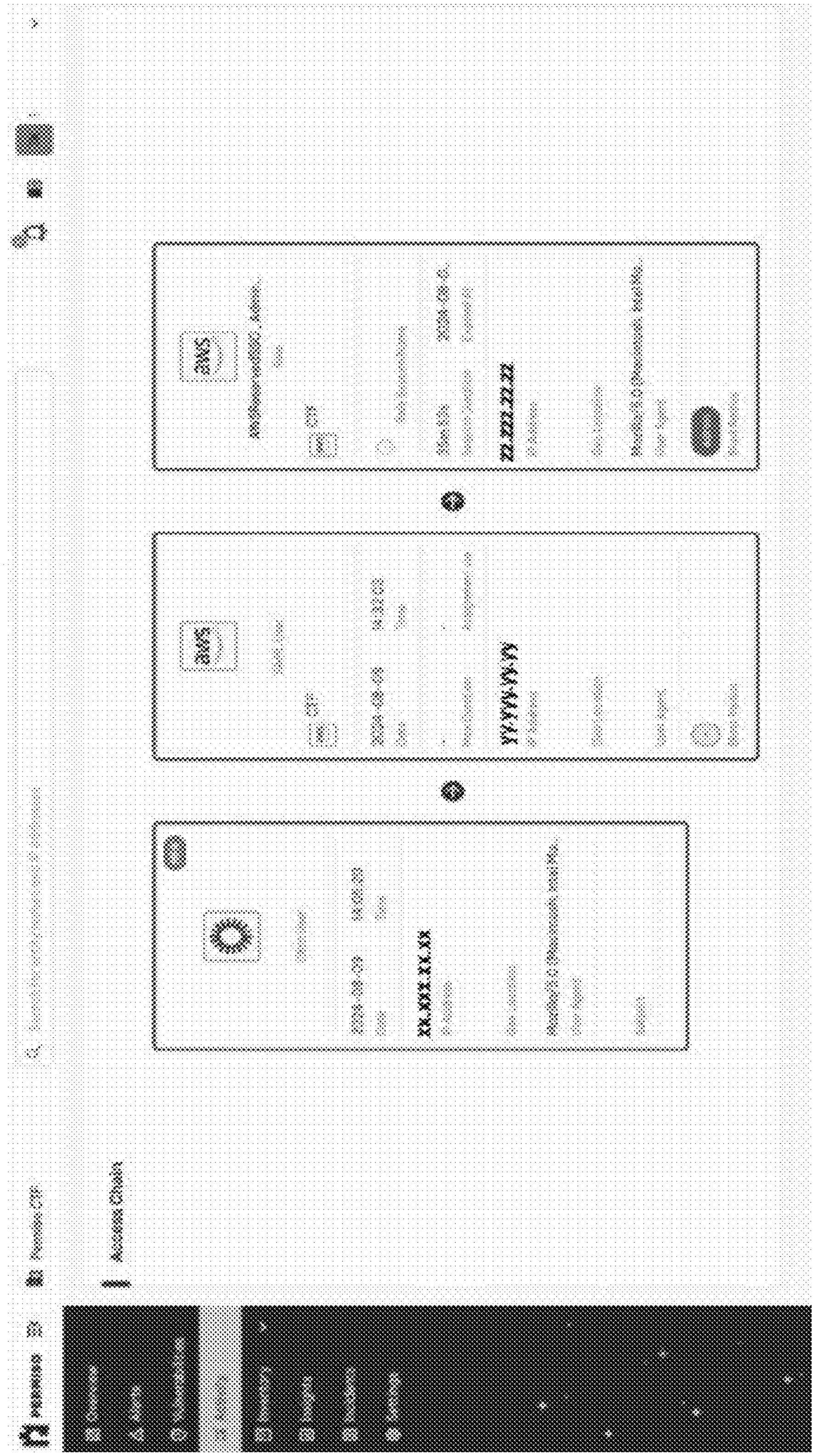
FIGS. 13-15 illustrate an exemplary attribution chain user interface in accordance with one or more embodiments of the present application.
Figure 14:
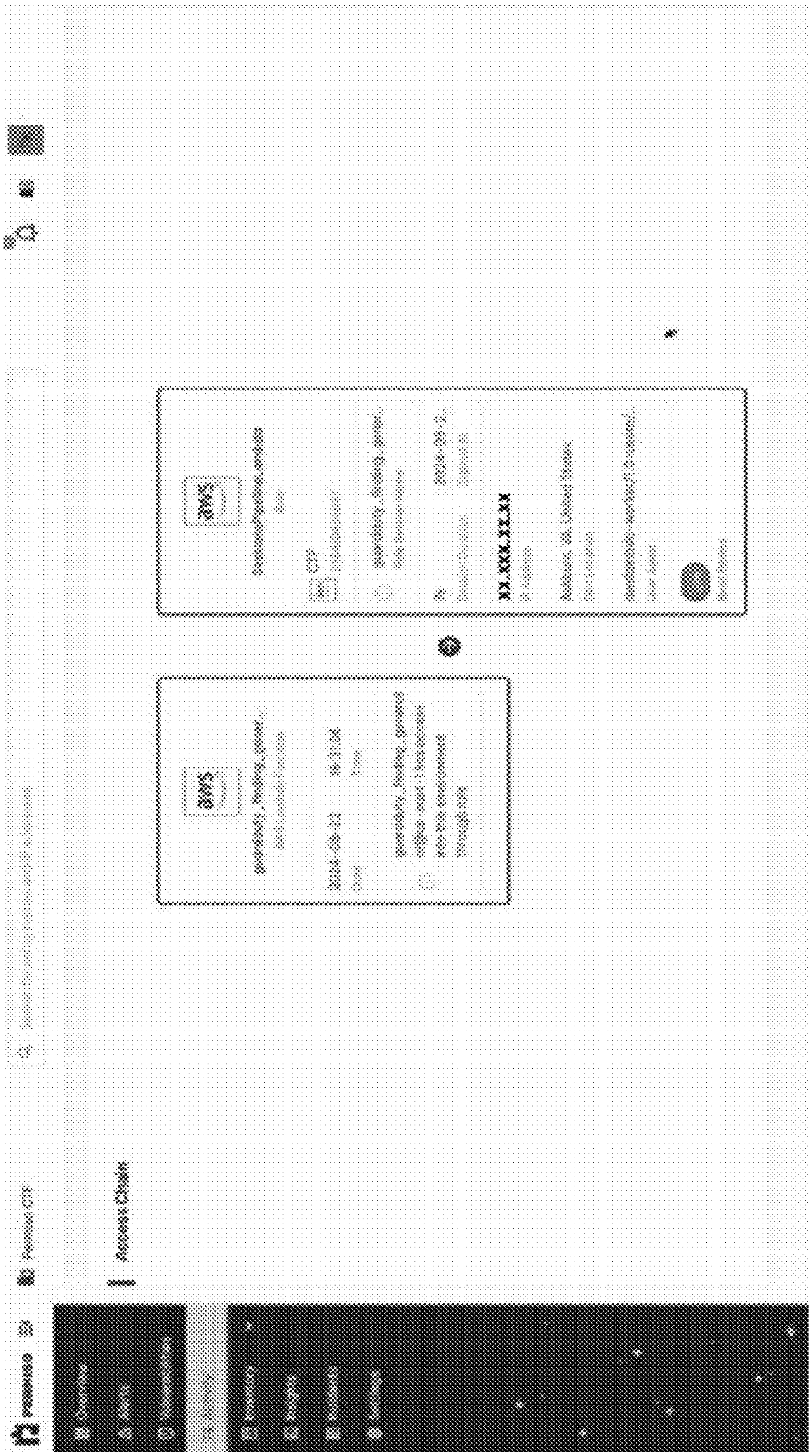
Figure 15:
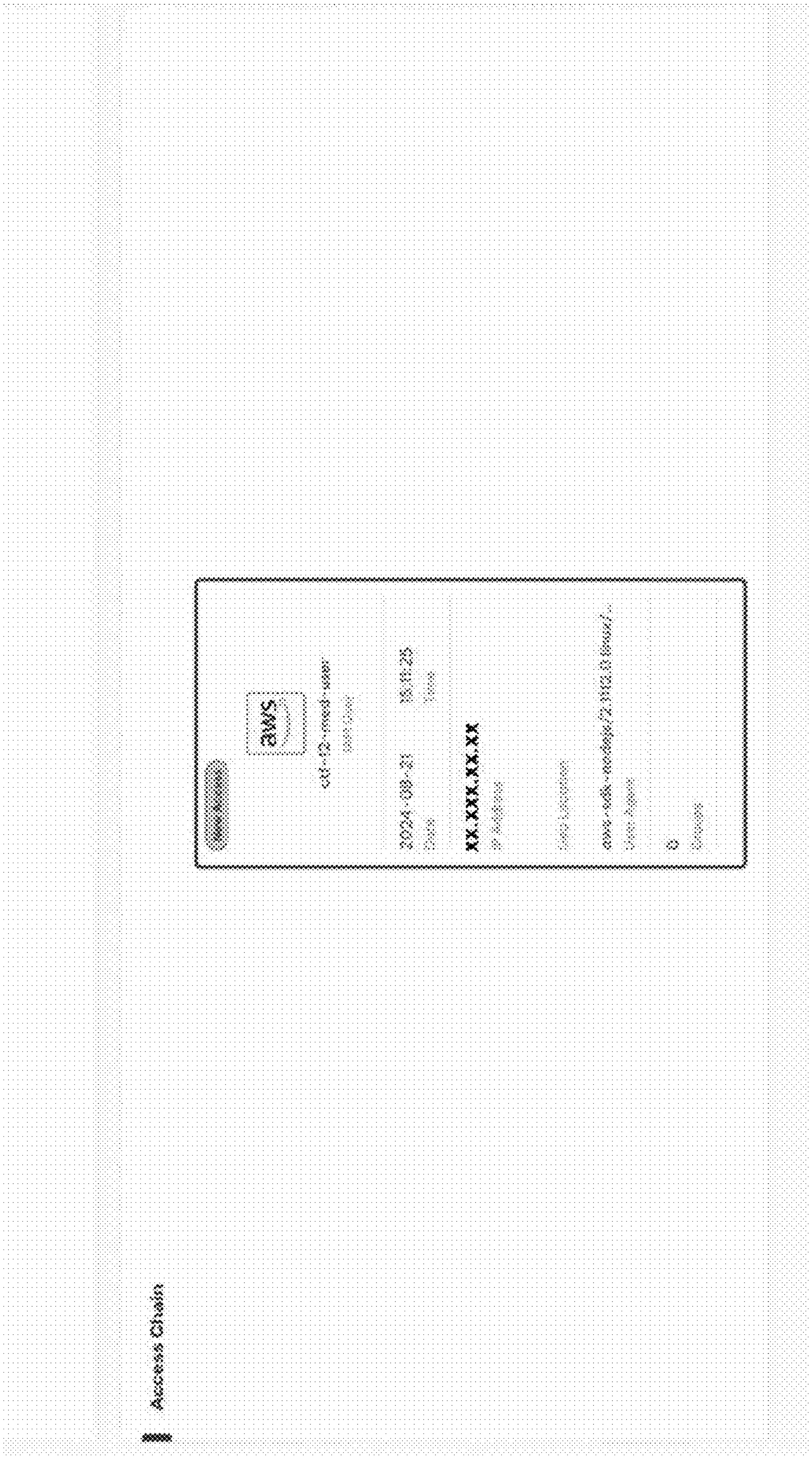

In one or more embodiments, S240 may function to implement an attribution chain user interface, as shown by way of example in FIGS. 13-15. In such embodiments, the attribution chain user interface may comprise a visual representation of the attribution chain for a target session. In some embodiments, a user of the attribution chain user interface may select, via the user interface, a target session to view its attribution chain. In turn, the attribution chain user interface may function to construct a visual layout comprising a session summary object for each session of the target session attribution chain.

In one or more embodiments, each session summary object may additionally include one or more GUI display elements (e.g., text display elements) that may include one or more session properties of the corresponding session. In various embodiments, the session properties displayed on a session summary object may include, but are not limited to, a session start timestamp, a session end timestamp, session actor identity details, multi-factor authentication data, device (e.g., hardware and/or virtual) data, an IP address and/or geolocation of the session actor, and/or any other suitable session properties that may be displayed.

Additionally, in some embodiments, the attribution chain user interface may comprise one or more session correlation visualization objects that may visually link sessions of the target attribution chain that are linked by session correlations. In one or more such embodiments, a session correlation visualization object may comprise a graphical object such as an arrow, an edge, a line, an icon, and/or any other suitable visualization of a link between session interface objects.

For instance, with continued reference to the above non-limiting example, the target set of individual session objects may include (i) a first individual session object of the plurality of individual session objects, wherein the distinct set of digital events of the first individual session object are performed on a first disparate computing environment of the plurality of disparate computing environments, (ii) a second individual session object of the plurality of individual session objects, wherein the distinct set of digital events of the second individual session object are performed on a second disparate computing environment of the plurality of disparate computing environments, and (iii) a third individual session object of the plurality of individual session objects, wherein the distinct set of digital events of the third individual session object are performed on a third disparate computing environment of the plurality of disparate computing environments. The cross-environment session artifact displayed on the user interface (e.g., the session information graphical user interface or any other suitable user interface), in such a non-limiting example, may include a first session UI card representing (or corresponding to) the first individual session object, a second session UI card representing (or corresponding to) the second individual session object, a third session UI card representing (or corresponding to) the third individual session object, a first directional graphical connector extending in a direction from the first session UI card to the second session UI card, and a second directional graphical connector extending in a direction from the second session UI card to the third session UI card. Accordingly, in such a non-limiting example, the first directional graphical connector and the second directional graphical connector graphically illustrate the directional access sequence and the directional access sequence indicates a directional flow of access by the root actor across the first disparate computing environment, the second disparate computing environment, and the third disparate computing environment.

Furthermore, in such a non-limiting example, the system or service implementing method 200 may function to detect the root actor accessed the first disparate computing environment using multi-factor authentication. Accordingly, in response to detecting the use of MFA, the system or service implementing method 200 may function to generate and display, within the first session UI card, an MFA UI badge that visually indicates that MFA was used by the root actor to access the first disparate computing environment.

It shall be further recognized that, in some embodiments, a subject session UI card corresponding to a respective individual session object included in the cross-environment session artifact may include an IP address associated with the respective individual session object, geolocation data associated with the respective individual session object, user agent data associated with the respective individual session object, session duration data associated with the respective individual session object, the distinct digital account associated with the respective individual session object, and any other piece of data or information included in the respective individual session object.

It shall be further recognized that, in some embodiments, a shared or group digital account associated with the third disparate computing environment may have performed the distinct set of digital events on the third disparate computing environment. The shared or group digital account may be accessible by a plurality of distinct users (e.g., ten distinct users, one hundred distinct users, one thousand distinct users, etc.), and, when viewed in isolation, the distinct set of digital events performed by the shared or group digital account on the third disparate computing environment may not indicate which specific user initiated or performed the distinct set of digital events using the shared or group digital account. In such an embodiment, using the cross-environment session artifact, the system or service implementing method 200 may function to detect that the first individual session object corresponding to the first session UI card is the parent session object to the third individual session object corresponding to the third session UI card based on the directional access sequence. Accordingly, the system or service implementing method 200 may function to detect that the same actor (e.g., same user) that performed the distinct set of digital events on the first disparate computing environment also performed the distinct set of digital events on the third disparate computing environment based on the directional access sequence illustrated within the cross-environment session artifact linking the first session UI card to the second session UI card and the second session UI card to the third session UI card, as shown generally by way of example in FIG. 13.

Stated another way, in some embodiments, the cross-environment session artifact may function to visually and programmatically trace the sequence of digital activity (e.g., digital events) performed by a single actor across multiple disparate computing environments, even when one of the environments includes a shared or group digital account accessible by many users. By correlating session objects through the directional access sequence—linking the first session UI card to the second session UI card and the second session UI card to the third session UI card—the system or service implementing method 200 enables clear attribution of the shared or group digital account activity to the root actor represented by the first session UI card, thereby providing an unbroken and intelligible representation of the root actor's end-to-end access path across the disparate computing environments.

In one or more embodiments, the system or service implementing method 200 may function display, via a user interface (UI), a cross-environment session artifact that includes a first session UI card corresponding to a first distinct individual session object, a second session UI card corresponding to a second distinct individual session object, a third session UI card corresponding to a third distinct individual session object, a first directional graphical connector extending in a direction from the first distinct session UI card to the second distinct session UI card, and a second directional graphical connector extending in a direction from the second distinct session UI card to the third distinct session UI card.

In such an embodiment, the distinct set of digital events of the first distinct individual session object was performed on a first disparate computing environment, the distinct set of digital events of the second distinct individual session object was performed on a second disparate computing environment, and the distinct set of digital events of the third individual session object was performed on a third disparate computing environment of the plurality of disparate computing environments.

In such an embodiment, the system or service implementing method 200 may function to detect a respective authentication factor (e.g., password, application programming interface (API) token, multi-factor authentication (MFA), passkey, hardware, etc.) used to access the first disparate computing environment, the second disparate computing environment, and the third disparate computing environment and, in turn, display a corresponding authentication-factor badge within each respective session UI card that visually indicates the respective authentication factor used.

For instance, in a non-limiting example, if the system or service implementing method 200 detects that a password was used during an authentication to the first disparate computing environment, the system or service implementing method 200 may function to display, within the first session UI card, an authentication-factor badge that indicates or specifies password-based authentication was used.

In another non-limiting example, if the system or service implementing method 200 detects that an API token was used during an authentication to the first disparate computing environment, the system or service implementing method 200 may function to display, within the first session UI card, an authentication-factor badge that indicates or specifies API token-based authentication was used.

In another non-limiting example, if the system or service implementing method 200 detects that a passkey was used during an authentication to the first disparate computing environment, the system or service implementing method 200 may function to display, within the first session UI card, an authentication-factor badge that indicates or specifies passkey-based authentication was used.

In another non-limiting example, if the system or service implementing method 200 detects that a hardware factor (e.g., smart card, hardware one-time-password token, FIDO2 security key, etc.) was used during an authentication to the first disparate computing environment, the system or service implementing method 200 may function to display, within the first session UI card, an authentication-factor badge that indicates or specifies hardware-based authentication was used.

Actor Identity User Interface

Figure 16:
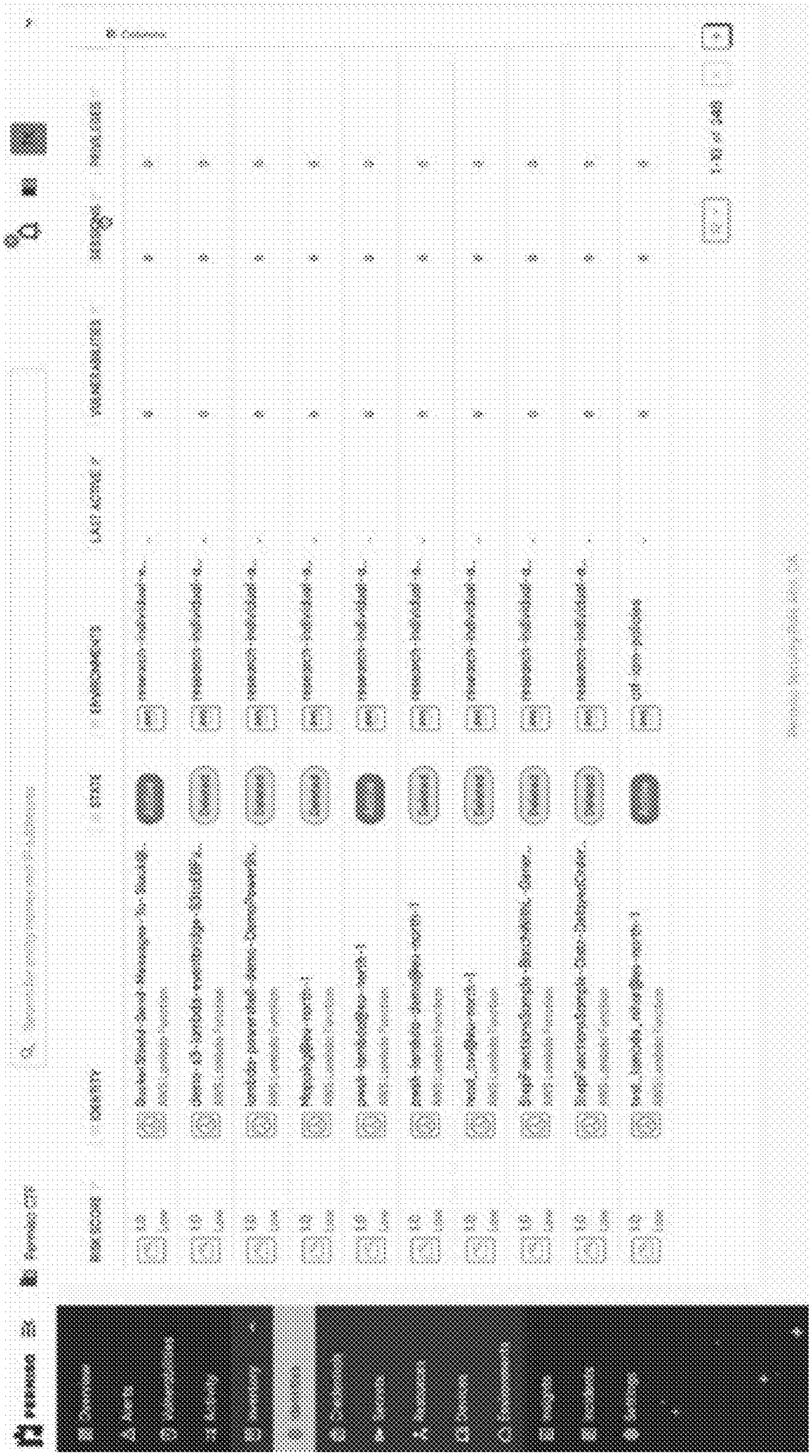
FIGS. 16-18 illustrate an exemplary actor identity user interface in accordance with one or more embodiments of the present application.
Figure 17:
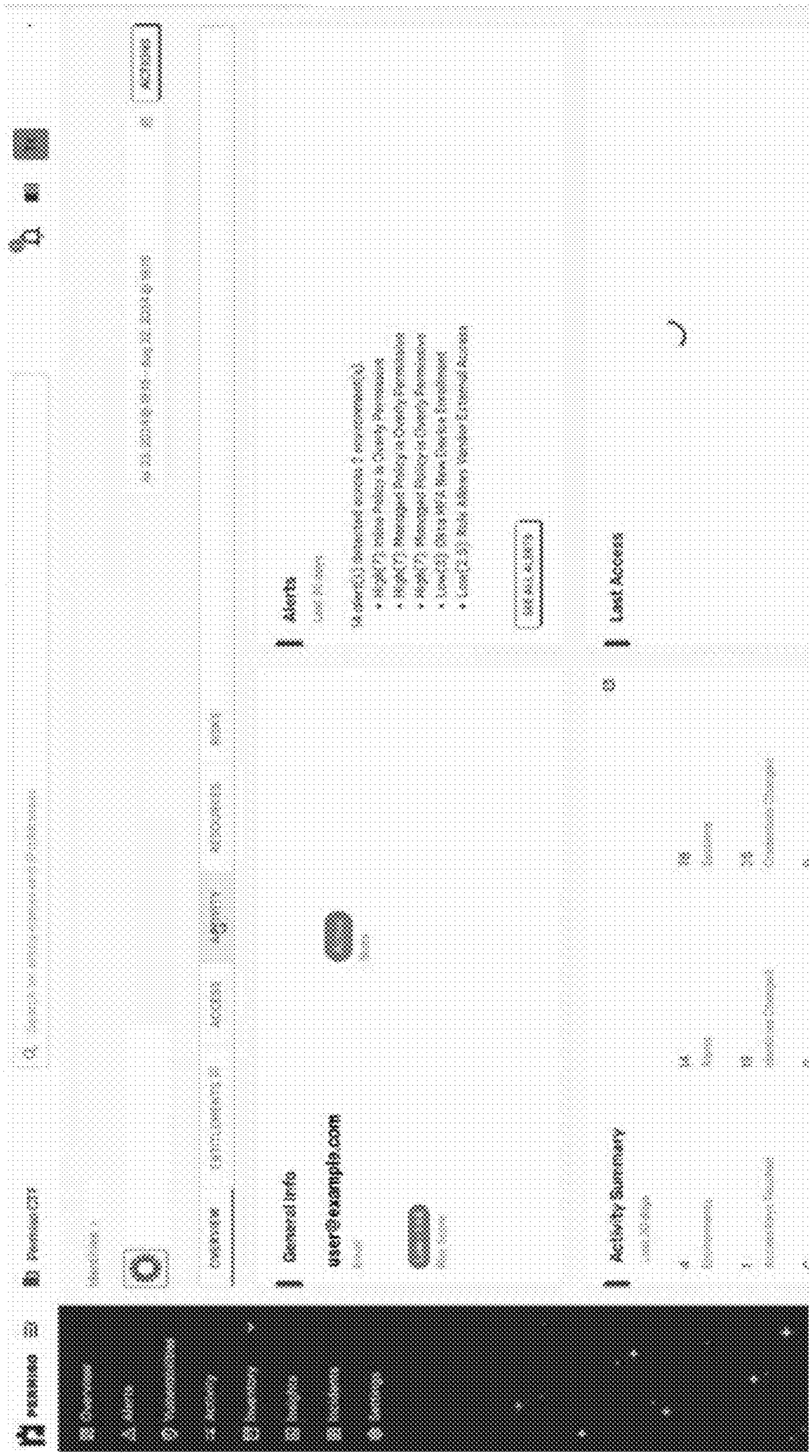
Figure 18:
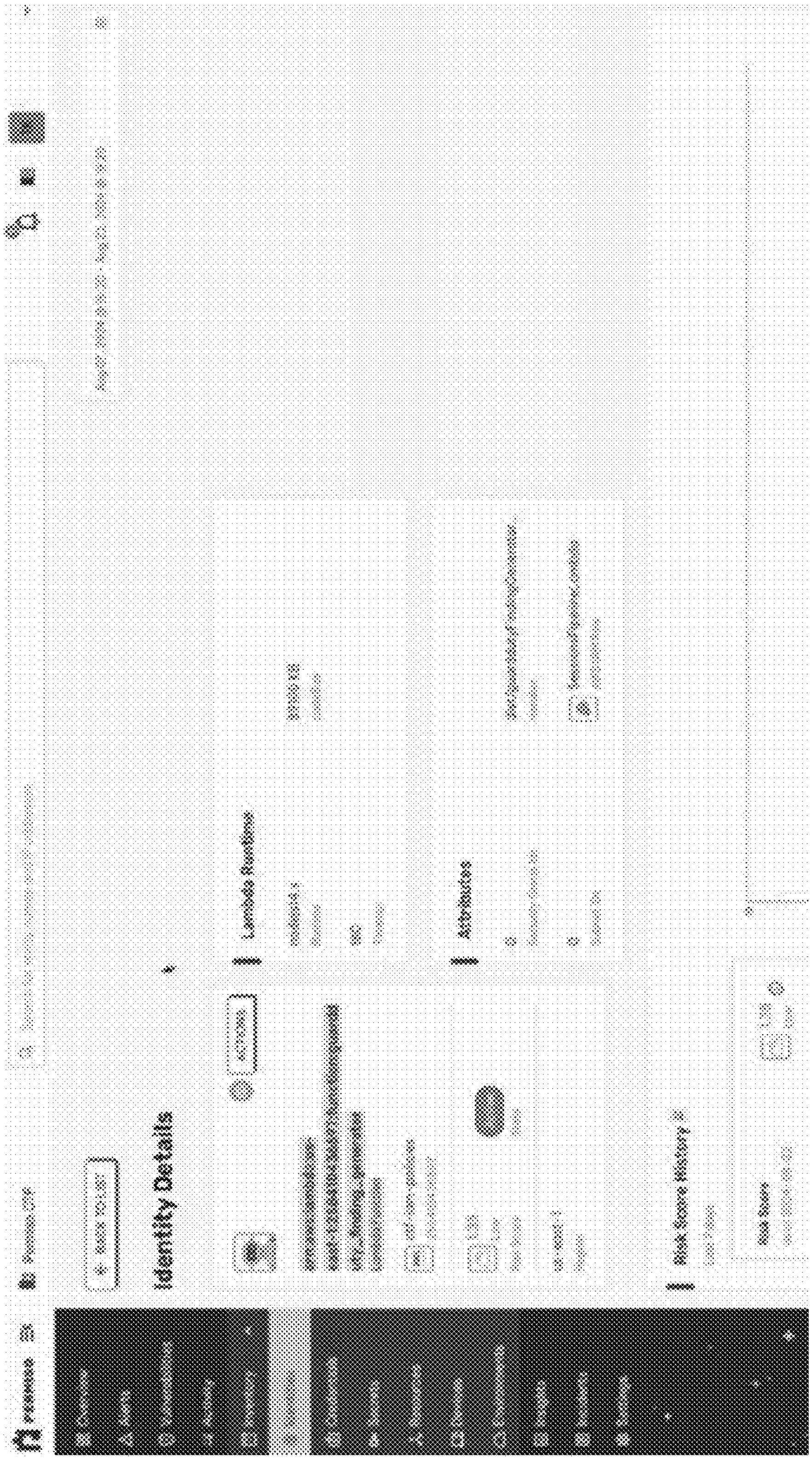

In some embodiments, as shown by way of example in FIGS. 16-18, S240 may function to implement an actor identity user interface that may enable one or more users (or subscribers) to access and/or receive data and metadata associated with a target user-selected actor identity or a target user-selected non-human actor (e.g., computer procedure, artificial intelligence (AI) agent, etc.). The actor identity user interface may differentiate between an actor (e.g., the human individual) and specific user accounts associated with the actor across different platforms. For instance, the actor identity user interface may display a first user account (e.g., Okta or the like) and a second user account (e.g., AWS or the like) both associated with a single human actor named "Actor Name." To provide a comprehensive view of the actor, system 100 may create a universal identity that links various user accounts, such as "Actor Name" in the first user account and "Actor Name" in the second user account, to an abstract entity representing the human actor. A universal identity aggregates all relevant account data under a single entity view, allowing the actor identity user interface to display interconnected account information, relationships, and activity chains associated with the human actor. Users may select a target actor identity, such as a universal identity or a specific account identity and view consolidated data reflecting the actor's activities across multiple platforms. That is, in such embodiments, a user may input a target actor identity via the actor identity user interface (e.g., an actor username, IP address, email, and/or other actor identifying attributes) and, in turn, the actor identity user interface may function to output or display data and metadata associated with that target actor identity. Additionally, or alternatively, in some embodiments, the actor identity user interface may include a list of one or more actor identities from which a user may select a target actor identity, as shown by way of example in FIG. 16.

In some embodiments, the actor identity user interface may include an actor identity overview region that may function to display or surface one or more actor identifying attributes of the target actor identity. As a non-limiting example, the actor identity overview region may include an email address of the target actor identity, an activity state (e.g., active or inactive) of the target actor identity, a risk score of the target actor identity (e.g., low risk, medium risk, high risk), and/or any other suitable actor identifying attributes of the target actor identity.

In one or more embodiments, the actor identity user interface may include an actor identity alert notification region that may function to display or surface one or more session alerts associated with one or more sessions of the target actor identity. In such embodiments, the actor identity alert notification region may function to notify a user of the actor identity user interface of any such session alerts. In one or more such embodiments, the actor identity alert notification region may include an alert label and/or an alert identifier for each session alert, the quantity of session alerts detected for the target actor identity across all sessions, as well as one or more pieces of alert-descriptive text (e.g., contextual text that describes each session alert).

Additionally, in some embodiments, the actor identity user interface may include an activity summary surfacing region that may function to display or surface a summary of the activity of the target actor identity. In such embodiments, the activity summary surfacing region may include a value for a quantity of environments associated with the target actor identity, a value for a quantity of alerts associated with the target actor identity, a value for a quantity of sessions associated with the target actor identity, a value for a quantity of credentials and/or access keys associated with the target actor identity, a value for a number of times the target actor identity has changed identities, a value for a number of times the target actor identity has changed credentials, and/or any other suitable values or data suitable for summarizing the activity of the target actor identity.

Additionally, in some embodiments, the actor identity user interface may include one or more activity visualization artifacts that may each visually represent, in the user interface, the activity of the target actor identity in one or more digital events in one or more sessions. In such embodiments, the activity visualization artifacts may include a chart or graph that may visually depict digital events performed or initiated by the target actor identity over a period of time. As a non-limiting example, an activity visualization artifact may comprise a stacked bar chart with an x-axis that may represent time, a y-axis that may represent the quantity or number of digital events, and vertical bars corresponding to different points in time, wherein the height of each vertical bar represents the number of digital events that the target actor identity performed or initiated at a distinct point in time. In such an example, each vertical bar may be shaded or colored to represent a distinct digital event category (e.g., low, medium, and high impact digital events). It shall be noted that the above example is non-limiting, and S240 may function to construct an activity visualization artifact in any suitable data visualization format.

In one or more embodiments, the system or service implementing method 200 may function to periodically (e.g., every twenty-four hours) obtain, using one or more application programming interfaces (APIs), all users, all application programming interface (API) tokens with names, all user account identifiers, and any other suitable identity data associated with a plurality of distinct computing environments (e.g., identity providers, cloud providers, and SaaS platforms) of a subscribing entity. For example, the system or service implementing method 200 may query APIs for Okta®, Microsoft Entra ID®, AWS Single Sign-On®, Google Workspace®, and Salesforce® to retrieve user directories, access tokens, and associated identity attributes. Accordingly, in one or more embodiments, in response to obtaining the above-mentioned identity data using the one or more application programming interfaces, the system or service implementing method 200 may function to create a data store for the subscribing entity that includes a plurality of unique identity clusters linking related "human-readable" identity terms.

In one or more embodiments, following the collection of identity data from the plurality of computing environments, the system or service implementing method 200 may function to extract and normalize metadata fields that provide correlation value for identifying and linking related identities. The system may, for example, extract human-readable and user-facing metadata such as given names, surnames, aliases, email addresses, usernames, directory handles, employee identifiers, and application token owners. Metadata that does not contribute to identity correlation, such as password policies, timestamps, or non-identity data, may be filtered out to reduce noise and improve the accuracy of subsequent linkage.

Each extracted metadata element may be parsed into smaller, comparable units. For example, the string "John-_Doe56" may be parsed into the subcomponents "John," "Doe," and "56," which are individually labeled according to their respective semantic types (e.g., given name, surname, etc.). The extracted and labeled metadata may then be normalized to a canonical format through operations such as case normalization, punctuation removal, abbreviation expansion (e.g., "Andy" to "Andrew"), and alias mapping. The result of such a normalization process may be a consistent, deduplicated corpus of normalized identity terms that may be stored within a structured intermediate data layer for use in subsequent graph construction.

Figure 20:
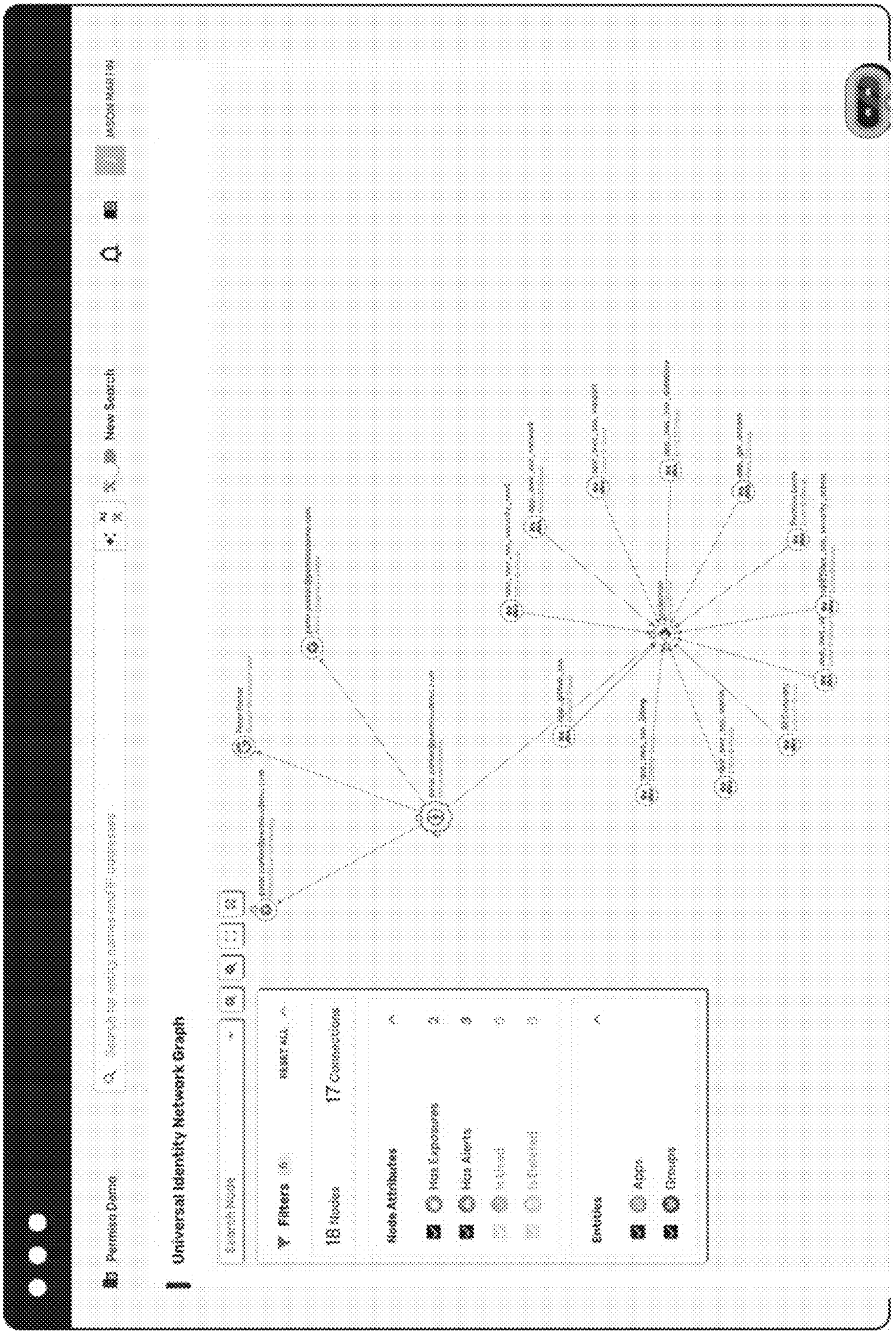
FIG. 20 illustrates a universal identity graph in accordance with one or more embodiments of the present application.

In one or more embodiments, the system or service implementing method 200 may function to construct a universal identity graph that models the identity relationships between the normalized "human-readable" identity terms. Each node in the universal identity graph may represent a unique normalized identity term—such as a name, alias, email address, or employee ID—and each edge may represent a detected or inferred relationship between two or more identity terms, derived from deterministic rules or shared metadata observed across distinct systems. A graph database algorithm, in some embodiments, may detect such identity relationships, for example, where two identity terms share a common employee identifier, where one term appears as an alias of another in a corporate directory, or where both appear as owners of the same API token or members of a common group. In this way, the universal identity graph may represent a continuously evolving network of relationships between "human-readable" identity terms, dynamically reflecting how users, accounts, and credentials interconnect across cloud, SaaS, and identity-provider environments. For instance, in a non-limiting example, the system or service implementing method 200 may, for example, create a universal identity graph that includes nodes such as peter. parker@permiso.io (Okta® user), peter.parker@permisodemo.com (Microsoft Entra ID® user), and Peter Parker (Google Workspace® user), along with group nodes such as app_aws_sso_billing, app_github_sec, and All Company, as shown generally by way of example in FIG. 20. These linked nodes collectively define a universal identity cluster, which may be represented by a higher-level universal identity node that acts as the canonical representation of the corresponding entity across all computing environments.

Stated another way, the system or service implementing method 200 may function to construct a graph database that encodes relationships among the normalized "human-readable" identity terms. By representing identities as a connected network of related identity terms, the graph database enables the system or service implementing method 200 to detect and unify relationships that would otherwise remain invisible in account-based or email-based correlation models.

Once the universal identity graph has been constructed, the system or service implementing method 200 may use it to connect session objects that would not otherwise have been connected. In some embodiments, session correlation may be limited to strict matching criteria such as identical email addresses or user account names, causing session objects from different domains or naming conventions to remain unlinked. By contrast, the universal identity graph allows the system or service implementing method 200 to resolve each session's associated identity data (e.g., human-readable identity terms, etc.) to a universal identity cluster. If two session objects—such as an Okta® login by peter.parker@permiso.io and an AWS® API activity by peter.parker@permisodemo.com—map to nodes within the same identity cluster, the system may connect both session objects together. That is, in some embodiments, the graph database may function as a translation and correlation layer between session objects. Rather than relying on a single common identifier to link session objects, the system or service implementing method 200 may detect that multiple session objects, credentials, or tokens originate from the same logical entity based on their connected relationships within the universal identity graph. This enables the system to build complete activity chains for users whose accounts differ across environments—bridging otherwise disconnected sessions, applications, and data sources into a unified behavioral artifact (e.g., cross-environment session artifact).

It shall be recognized that, in analogous ways, the universal identity graph may function to correlate identity terms corresponding to non-human actors as well, including computer-executed procedures, automated software agents, artificial intelligence (AI) agents, service accounts, background processes, or any other suitable type of non-human actor.

3. Computer-implemented Method and Computer Program Product

It shall also be noted that the system and methods of the embodiments and variations described herein can be embodied and/or implemented at least in part as a machine comprising a computer-readable medium storing computer-readable instructions. The instructions may be executed by computer-executable components integrated with the system and one or more portions of the processors and/or the controllers. The computer-readable medium can be stored on any suitable computer-readable media such as RAMs, ROMs, flash memory, EEPROMs, optical devices (CD or DVD), hard drives, floppy drives, memory sticks (e.g., SD cards, USB flash drives), cloud-based services (e.g., cloud storage), magnetic storage devices, Solid-State Drives (SSDs), or any suitable device. The computer-executable component is preferably a general or application-specific processor, but any suitable dedicated hardware or hardware/firmware combination device can alternatively or additionally execute the instructions.

It shall be noted that, in the method(s) described herein where one or more steps (e.g., processes) are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

The systems and methods of the preferred embodiments may additionally, or alternatively, be implemented on an integrated software application and/or software architecture such as those offered by Permiso Security Inc.

Although omitted for conciseness, the preferred embodiments include every combination and permutation of the implementations of the systems and methods described herein in real-time or near real-time, asynchronously (e.g., sequentially), concurrently (e.g., in parallel), or in any other suitable order by and/or using one or more instances of the systems, elements, and/or entities described herein. It shall be noted that "real-time" or "near real-time" as generally used herein may refer to generating an output or performing an action within strict time constraints. For example, in one or more embodiments, real-time may be understood to be instantaneous, on the order of milliseconds, or on the order of minutes. Of course, depending on the particular temporal nature of the system in which an embodiment is implemented, other appropriate timescales may be considered acceptable for real-time or near real-time processing.

Embodiments of the system and/or method can include every combination and permutation of the various system components and the various method processes, wherein one or more instances of the method and/or processes described herein can be performed in real-time or near real-time, asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the embodiments of the application without departing from the scope of the various described embodiments.

We claim:

1. A computer-implemented method comprising:
at an identity-based threat detection and response service implemented by a network of distributed computers:
obtaining, by the network of distributed computers, digital event data that occurred on a plurality of disparate computing environments of a subscribing entity;
in response to obtaining the digital event data, converting the digital event data into normalized digital event data that conforms to a target data schema specified by the identity-based threat detection and response service;
constructing, for the subscribing entity in real-time or near real-time, a plurality of individual session objects detected across the plurality of disparate computing environments in response to the network of distributed computers executing one or more session construction instructions against the normalized digital event data, wherein:
each individual session object of the plurality of individual session objects includes a distinct set of digital events performed in a respective computing environment of the plurality of disparate computing environments by a distinct digital account during a distinct time span;
in response to constructing the plurality of individual session objects, generating, in real-time or near real-time, a plurality of session correlation links that selectively connect a target set of individual session objects of the plurality of individual session objects;
generating, using the target set of individual session objects and the plurality of session correlation links, a cross-environment session artifact that graphically illustrates a directional access sequence associated with the target set of individual session objects;
detecting, using the cross-environment session artifact, a root actor responsible for the distinct set of digital events performed across the target set of individual session objects;
detecting that the root actor accessed the respective computing environment associated with one of the target set of individual session objects using multi-factor authentication (MFA); and
displaying, within the cross-environment session artifact, an MFA user interface element that indicates MFA was used by the root actor to access the respective computing environment associated with the one of the target set of individual session objects.

2. The computer-implemented method according to claim 1, further comprising:
in response to constructing a respective individual session object of the plurality of individual session objects:
providing the respective individual session object to an actor-type machine learning classification model;
computing, using the actor-type machine learning classification model, an actor-type classification inference comprising a confidence score indicating a probability of a machine actor using the distinct digital account of the respective individual session object to perform the distinct set of digital events included in the respective individual session object; and
assessing, in real-time or near real-time, a security threat of the respective individual session object using one of:
a first set of threat detection instructions operably configured to assess the distinct set of digital events of the respective individual session object as machine activity when the confidence score satisfies a predetermined confidence score threshold, and
a second set of threat detection instructions operably configured to assess the distinct set of digital events of the respective individual session object as human activity when the confidence score fails to satisfy the predetermined confidence score threshold.

3. The computer-implemented method according to claim 1, further comprising:
in response to constructing a respective individual session object of the plurality of individual session objects:
assessing the distinct set of digital events associated with the respective individual session object;
detecting, based on the assessment, that the respective individual session object corresponds to one of:
an application programming interface-type session when metadata included in the distinct set of digital events of the respective individual session object indicates that access to the respective computing environment of the respective individual session object was obtained using an application programming interface (API) key, and a console-type session when the distinct set of digital events of the respective individual session object is indicative of a human user using one or more graphical user interfaces of the respective computing environment of the respective individual session object to perform the distinct set of digital events associated with the respective individual session object; and attributing, using the network of distributed computers, one of:

an API session label to the respective individual session object when the respective individual session object is detected to be the application programming interface-type session, and a console session label to the respective individual session object when the respective individual session object is detected to be the console-type session.

4. The computer-implemented method according to claim 1, wherein:

executing the one or more session construction instructions causes the network of distributed computers to:

partition the normalized digital event data into a plurality of distinct sets of normalized digital event data based in part on actor metadata and time metadata included in the normalized digital event data, and construct the plurality of individual session objects based on the plurality of distinct sets of normalized digital event data, wherein:

each individual session object of the plurality of individual session objects corresponds to a single actor, and the single actor corresponding to a respective individual session object of the plurality of individual session objects performed the distinct set of digital events of the respective individual session object within an amount of time less than a maximum time duration permitted by the identity-based threat detection and response service.

5. The computer-implemented method according to claim 1, wherein:

executing the one or more session construction instructions causes the network of distributed computers to:

assess the normalized digital event data based in part on timestamp metadata and actor metadata included in the normalized digital event data;

identify, based on the normalized digital event data, a sequence of digital events performed by a single actor that occurred on one of the plurality of disparate computing environments;

construct a respective individual session object of the plurality of individual session objects based in part on the sequence of digital events performed by the single actor, wherein the respective individual session object includes:

a session start time corresponding to a timestamp of a first digital event included in the sequence of digital events, a session end time corresponding to a timestamp of a last digital event included in the sequence of digital events, a session time duration determined from a difference between the session end time and the session start time, a digital account identifier indicating the distinct digital account used by the single actor to perform the sequence of digital events, a representation of the one of the plurality of disparate computing environments where the sequence of digital events occurred, the sequence of digital events performed by the single actor on the one of the plurality of disparate computing environments, and identity and access data associated with the single actor.

6. The computer-implemented method according to claim 5, wherein the identity and access data included in the respective individual session object includes:

an internet protocol address from which the single actor accessed the one of the plurality of disparate computing environments, a geolocation derived from the internet protocol address, an autonomous system number identifying a network organization from which the internet protocol address originates, a user-agent identifying an interface or client application used by the single actor to perform the sequence of digital events.

7. The computer-implemented method according to claim 1, further comprising:

generating, using the network of distributed computers, a session information graphical user interface based on a target individual session object of the plurality of individual session objects, wherein a single actor used the distinct digital account of the target individual session object to perform the distinct set of digital events included in the target individual session object;

displaying, by the network of distributed computers, the session information graphical user interface to the subscribing entity, wherein:

a first portion of the session information graphical user interface includes at least a session start time of the target individual session object, a session end time of the target individual session object, a session time duration of the target individual session object, and identity and access data associated with the single actor, and a second portion of the session information graphical user interface includes an interactive data table that includes a plurality of distinct interactive data rows, wherein each distinct interactive data row of the plurality of distinct interactive data rows:

corresponds to a respective digital event of the distinct set of digital events included in the target individual session object, and includes a distinct column describing an event name of the respective digital event.

8. The computer-implemented method according to claim 7, further comprising:

detecting an input from the subscribing entity hovering over the event name of a target interactive data row of the plurality of distinct interactive data rows;

in response to detecting the input from the subscribing entity, displaying a digital event explainability user interface object in association with the target interactive data row, wherein the event explainability user interface object includes one or more text strings providing a natural-language explanation of the respective digital event corresponding to the target interactive data row.

9. The computer-implemented method according to claim 1, wherein:

executing the one or more session construction instructions against the normalized digital event data causes the network of distributed computers to:

detect a console login digital event that occurred within the normalized digital event data, wherein the console login digital event includes an account identifier indicating a subject computing environment where the console login digital event occurred; and commence the construction of a subject individual session object of the plurality of individual session objects in response to the detection of the console login digital event, wherein constructing the subject individual session object includes:

appending the console login digital event to the subject individual session object;

assigning a session start time to the subject individual session object that corresponds to a timestamp of the console login digital event;

appending, to the subject individual session object, one or more subsequent digital events included in the normalized digital event data that follow the console login digital event and correspond to the account identifier of the console login digital event; and assigning a session end time to the subject individual session object that corresponds to a timestamp of a respective subsequent digital event of the one or more subsequent digital events determined to occur last in time among the one or more subsequent digital events.

10. The computer-implemented method according to claim 9, further comprising:

obtaining, by the network of distributed computers, additional event data at a different time than the digital event data;

in response to obtaining the additional event data, converting the additional event data into normalized event data that conforms to the target data schema specified by the identity-based threat detection and response service;

detecting, by the identity-based threat detection and response service, that at least one event included in the normalized event data is associated with the console login digital event, wherein the at least one event occurred after the one or more subsequent digital events;

appending, to the subject individual session object, the at least one event included in the normalized event data that is associated with the console login digital event; and updating the session end time from the timestamp of the respective subsequent digital event determined to occur last in time to a new time value that corresponds to a timestamp of the at least one event.

11. The computer-implemented method according to claim 10, wherein:

a single actor performed the console login digital event on the subject computing environment, the subject computing environment is provided by a cloud service provider, and the identity-based threat detection and response service detects the at least one event included in the normalized event data is associated with the console login digital event based on detecting at least one of:

that a session identifier attributed to the at least one event by the cloud service provider is equivalent to a session identifier attributed to the console login digital event by the cloud service provider, the at least one event included in the normalized event data and the console login digital event originated from a same internet protocol address, and the at least one event included in the normalized event data and the console login digital event were performed using a same hardware device associated with the single actor.

12. The computer-implemented method according to claim 9, further comprising:

obtaining, by the network of distributed computers, additional event data at a different time than the digital event data;

in response to obtaining the additional event data, converting the additional event data into normalized event data that conforms to the target data schema specified by the identity-based threat detection and response service;

detecting, by the identity-based threat detection and response service, that at least one new event included in the normalized event data is not associated with the console login digital event and the one or more subsequent digital events, and constructing a new individual session object different from the plurality of individual session objects in response to detecting that the at least new one event included in the normalized event data is not associated with the console login digital event and the one or more subsequent digital events, wherein constructing the new individual session object includes appending the at least one new event to the new individual session object.

13. The computer-implemented method according to claim 12, wherein:

a single actor performed the console login digital event and the at least one new event on the subject computing environment;

the identity-based threat detection and response service detects the at least one new event included in the normalized event data is not associated with the console login digital event and the one or more subsequent digital events based on detecting at least one of:

an amount of time elapsed between the at least one new event and the one or more subsequent digital events is greater than a predetermined elapsed time threshold, and a change in access data associated with the single actor for the at least one new event relative to access data associated with the subject individual session object.

14. The computer-implemented method according to claim 12, wherein:

a same actor performed the console login digital event and the at least one new event;

the identity-based threat detection and response service detects the at least one new event included in the normalized event data is not associated with the console login digital event and the one or more subsequent digital events based on detecting at least one of:

an amount of time elapsed between the at least one new event and the one or more subsequent digital events is greater than a predetermined elapsed time threshold, and a change in access data associated with the same actor between the at least one new event and the subject individual session object.

15. The computer-implemented method according to claim 12, wherein:

a first user performed the console login digital event and the one or more subsequent digital events, a second user performed the least one new event, the first user is different from the second user, the identity-based threat detection and response service detects the at least one new event is not associated with the console login digital event and the one or more subsequent digital events based on detecting a difference between a digital account identifier corresponding to the at least one new event and the account identifier corresponding to the console login digital event and the one or more subsequent digital events.

16. A computer-implemented system comprising:

one or more processors;

a memory;

a computer-readable medium operably coupled to the one or more processors, the computer-readable medium having computer-readable instructions stored thereon that, when executed by the one or more processors, cause a computing device to perform operations comprising:

obtaining digital event data that occurred on a plurality of disparate computing environments of a subscribing entity;

in response to obtaining the digital event data, converting the digital event data into normalized digital event data that conforms to a target data schema specified by an identity-based threat detection and response service;

constructing, for the subscribing entity in real-time or near real-time, a plurality of individual session objects detected across the plurality of disparate computing environments in response to executing one or more session construction instructions against the normalized digital event data, wherein:

each individual session object of the plurality of individual session objects includes a distinct set of digital events performed in a respective computing environment of the plurality of disparate computing environments by a distinct digital account during a distinct time span;

in response to constructing the plurality of individual session objects, generating, in real-time or near real-time, a plurality of session correlation links that selectively connect a target set of individual session objects of the plurality of individual session objects;

generating, using the target set of individual session objects and the plurality of session correlation links, a cross-environment session artifact that graphically illustrates a directional access sequence associated with the target set of individual session objects;

detecting, using the cross-environment session artifact, a root actor responsible for the distinct set of digital events performed across the target set of individual session objects;

detecting that the root actor accessed the respective computing environment associated with one of the target set of individual session objects using multi-factor authentication (MFA); and displaying, within the cross-environment session artifact, an MFA user interface element that indicates MFA was used by the root actor to access the respective computing environment associated with the one of the target set of individual session objects.

17. The computer-implemented system according to claim 16, wherein generating the plurality of session correlation links includes:

generating a first session correlation link of the plurality of session correlation links that connects a first individual session object of the plurality of individual session objects to a second individual session object of the plurality of individual session objects based on detecting a chronological relationship between the first individual session object and the second individual session object, wherein the chronological relationship is detected based on identifying that an amount of time elapsed between a session end time of the first individual session object and a session start time of the second individual session object is less than a predetermined elapsed-time threshold, and generating a second session correlation link of the plurality of session correlation links that connects the second individual session object to a third individual session object of the plurality of individual session objects based on detecting a causal relationship between the second individual session object and the third individual session object, wherein the causal relationship is detected based on identifying that at least one digital event of the distinct set of digital events included in the second individual session object triggered or enabled the distinct set of digital events included in the third individual session object.

18. The computer-implemented system according to claim 16, wherein:

the target set of individual session objects includes:

a first individual session object of the plurality of individual session objects, wherein the distinct set of digital events of the first individual session object are performed on a first disparate computing environment of the plurality of disparate computing environments, a second individual session object of the plurality of individual session objects, wherein the distinct set of digital events of the second individual session object are performed on a second disparate computing environment of the plurality of disparate computing environments, and a third individual session object of the plurality of individual session objects, wherein the distinct set of digital events of the third individual session object are performed on a third disparate computing environment of the plurality of disparate computing environments, and the computer-readable instructions, when executed by the one or more processors, cause the computing device to perform operations further comprising:

displaying, via a user interface (UI), the cross-environment session artifact, wherein the cross-environment session artifact includes:

a first session UI card representing the first individual session object, a second session UI card representing the second individual session object, a third session UI card representing the third individual session object, a first directional graphical connector extending in a direction from the first session UI card to the second session UI card, and a second directional graphical connector extending in a direction from the second session UI card to the third session UI card, wherein:

the first directional graphical connector and the second directional graphical connector graphically illustrate the directional access sequence, and the directional access sequence indicates a directional flow of access by the root actor across the first disparate computing environment, the second disparate computing environment, and the third disparate computing environment.

19. The computer-implemented system according to claim 16, wherein generating the plurality of session correlation links includes:

generating a first session correlation link of the plurality of session correlation links that connects a first individual session object of the plurality of individual session objects to a second individual session object of the plurality of individual session objects based on detecting the first individual session object and the second individual session object share at least a common internet protocol address, generating a second session correlation link of the plurality of session correlation links that connects a third individual session object of the plurality of individual session objects to a fourth individual session object of the plurality of individual session objects based on detecting the third individual session object and the fourth individual session object share at least a common hardware device identifier, and generating a third session link of the plurality of session correlation links that connects a fifth individual session object of the plurality of individual session objects to a sixth individual session object of the plurality of individual session objects based on Hypertext Transfer Protocol (HTTP) cookie data.

20. The computer-implemented system according to claim 16, further comprising:

in response to constructing a respective individual session object of the plurality of individual session objects:

assessing the respective individual session object against a plurality of actor-type classification heuristics;

determining, in response to assessing the respective individual session object against the plurality of actor-type classification heuristics, the distinct set of digital events included in the respective individual session object was performed by a human actor or a non-human actor;

assessing, in real-time or near real-time, a security threat of the respective individual session object using-one of:

a first set of threat detection instructions operably configured to assess the distinct set of digital events of the respective individual session object as machine activity when the plurality of actor-type classification heuristics determines the distinct set of digital events included in the respective individual session object was performed by the non-human actor, and a second set of threat detection instructions operably configured to assess the distinct set of digital events of the respective individual session object as human activity when the plurality of actor-type classification heuristics determines the distinct set of digital events included in the respective individual session object was performed by the human actor.

21. A computer-implemented system comprising:

one or more processors;

a memory;

a computer-readable medium operably coupled to the one or more processors, the computer-readable medium having computer-readable instructions stored thereon that, when executed by the one or more processors, cause a computing device to perform operations comprising:

obtaining digital event data that occurred on a plurality of disparate computing environments of a subscribing entity;

in response to obtaining the digital event data, converting the digital event data into normalized digital event data that conforms to a target data schema specified by an identity-based threat detection and response service;

constructing, for the subscribing entity in real-time or near real-time, a plurality of individual session objects detected across the plurality of disparate computing environments in response to executing one or more session construction instructions against the normalized digital event data, wherein:

each individual session object of the plurality of individual session objects includes a distinct set of digital events performed in a respective computing environment of the plurality of disparate computing environments by a distinct digital account during a distinct time span;

in response to constructing the plurality of individual session objects, generating, in real-time or near real-time, a plurality of session correlation links that selectively connect a target set of individual session objects of the plurality of individual session objects, wherein the target set of individual session objects includes:

a first individual session object of the plurality of individual session objects, wherein the distinct set of digital events of the first individual session object are performed on a first disparate computing environment of the plurality of disparate computing environments, a second individual session object of the plurality of individual session objects, wherein the distinct set of digital events of the second individual session object are performed on a second disparate computing environment of the plurality of disparate computing environments, and a third individual session object of the plurality of individual session objects, wherein the distinct set of digital events of the third individual session object are performed on a third disparate computing environment of the plurality of disparate computing environments;

generating, using the target set of individual session objects and the plurality of session correlation links, a cross-environment session artifact that graphically illustrates a directional access sequence associated with the target set of individual session objects;

detecting, using the cross-environment session artifact, a root actor responsible for the distinct set of digital events performed across the target set of individual session objects; and displaying, via a user interface (UI), the cross-environment session artifact, wherein the cross-environment session artifact includes:

a first session UI card representing the first individual session object, a second session UI card representing the second individual session object, a third session UI card representing the third individual session object, a first directional graphical connector extending in a direction from the first session UI card to the second session UI card, and a second directional graphical connector extending in a direction from the second session UI card to the third session UI card, wherein:

the first directional graphical connector and the second directional graphical connector graphically illustrate the directional access sequence, and the directional access sequence indicates a directional flow of access by the root actor across the first disparate computing environment, the second disparate computing environment, and the third disparate computing environment.

* * * * *